United States Patent
Sawruk

(10) Patent No.: US 11,157,553 B2
(45) Date of Patent: Oct. 26, 2021

(54) SHEET MUSIC SEARCH AND DISCOVERY SYSTEM

(71) Applicant: J.W. Pepper & Son, Inc., Exton, PA (US)

(72) Inventor: Jeremy Sawruk, Exton, PA (US)

(73) Assignee: J.W. Pepper & Son, Inc., Exton, PA (US)

( * ) Notice: Subject to any disclaimer, the term of this patent is extended or adjusted under 35 U.S.C. 154(b) by 246 days.

(21) Appl. No.: 15/988,719

(22) Filed: May 24, 2018

(65) Prior Publication Data

US 2018/0341702 A1 Nov. 29, 2018

Related U.S. Application Data

(60) Provisional application No. 62/511,025, filed on May 25, 2017.

(51) Int. Cl.
*G06F 16/00* (2019.01)
*G06F 16/683* (2019.01)
(Continued)

(52) U.S. Cl.
CPC .......... *G06F 16/683* (2019.01); *G06F 16/638* (2019.01); *G06F 16/686* (2019.01);
(Continued)

(58) Field of Classification Search
CPC .... G06F 16/638; G06F 16/683; G06F 16/686; G06F 16/9535; G06N 3/0445;
(Continued)

(56) References Cited

U.S. PATENT DOCUMENTS

| 3,069,654 A | 12/1962 | Hough |
| 4,972,349 A | 11/1990 | Kleinberger |

(Continued)

OTHER PUBLICATIONS

Moorer, James A.; "On the Transcription of Musical Sound by Computer"; Computer Music Journal, vol. 1, No. 4; Nov. 1997; pp. 32-28.

(Continued)

*Primary Examiner* — Paul Kim
(74) *Attorney, Agent, or Firm* — Blank Rome LLP

(57) ABSTRACT

A sheet music search and discovery system is disclosed that uses specific mathematical rules to analyze and characterize sheet music and provides functionality for users to identify sheet music based on those characterizations. The system stores sheet music data and metadata characterizing each composition, provides a graphical user interface that provides functionality for users to search the sheet music data for compositions, and generates search results based at least in part on the metadata characterizing each composition. In one embodiment, metadata describing structured sheet music data is generated using a global vector space that includes semantic representations of elements extracted from a large corpus. In another embodiment, metadata describing unstructured sheet music data is generated using machine learning-based pattern recognition. In another embodiment, the interface provides functionality for users to identify instruments and a range for each of the instruments and identify compositions with similar instruments and ranges.

20 Claims, 27 Drawing Sheets

(51) Int. Cl.
  G06F 16/638    (2019.01)
  G06F 16/68     (2019.01)
  G06F 16/9535   (2019.01)
  G06N 5/00      (2006.01)
  G06N 5/04      (2006.01)
  G06N 3/04      (2006.01)
  G06N 3/08      (2006.01)

(52) U.S. Cl.
  CPC ....... *G06F 16/9535* (2019.01); *G06N 3/0454* (2013.01); *G06N 3/08* (2013.01); *G06N 5/003* (2013.01); *G06N 5/046* (2013.01); *G06N 3/0445* (2013.01)

(58) Field of Classification Search
  CPC ........ G06N 3/0454; G06N 3/08; G06N 5/003; G06N 5/046
  See application file for complete search history.

(56) References Cited

U.S. PATENT DOCUMENTS

| | | | |
|---|---|---|---|
| 4,996,642 | A | 2/1991 | Hey |
| 5,051,745 | A | 9/1991 | Katz |
| 5,454,106 | A | 9/1995 | Burns et al. |
| 5,726,435 | A | 3/1998 | Masahiro et al. |
| 5,835,905 | A | 11/1998 | Pirolli et al. |
| 6,272,467 | B1 | 8/2001 | Durand et al. |
| 6,360,215 | B1 | 3/2002 | Judd et al. |
| 6,990,453 | B2 | 1/2006 | Wang et al. |
| 7,233,937 | B2 | 6/2007 | Subramaniam et al. |
| 7,761,466 | B1 | 7/2010 | Eshghi |
| 7,838,755 | B2 | 11/2010 | Taub et al. |
| 8,494,257 | B2 | 7/2013 | Taub et al. |
| 9,037,464 | B1 | 5/2015 | Mikolov et al. |
| 2005/0065976 | A1 | 3/2005 | Holm et al. |
| 2007/0214941 | A1* | 9/2007 | Kourbatov ............... G10H 1/40 84/609 |
| 2008/0249644 | A1 | 10/2008 | Jehan |
| 2009/0202106 | A1* | 8/2009 | Hong ................. G06K 9/00449 382/100 |
| 2011/0225153 | A1 | 9/2011 | Haseyama |
| 2014/0056432 | A1* | 2/2014 | Loui ....................... G10L 25/51 381/56 |

OTHER PUBLICATIONS

Kassler, Michael; "Perspectives of New Music"; vol. 11, No. 1, Tenth Anniversary Issue (Autumn-Winter, 1972); pp. 250-254.
Jang, et al.; "Query by Tapping: A New Paradigm for Content-Based Music Retrieval from Acoustic Input"; Lecture Notes in Computer Science book series (LNCS, vol. 2195); pp. 590-597.
Hirata, et al.; "Query by visual example"; Lecture Notes in Computer Science book series (LNCS, vol. 580); pp. 56-71.
Chen et al.; "Detecting the Staff-Lines of Musical Score with Hough Transform and Mathematical Morphology"; 2010 International Conference on Multimedia Technology; ISBN: 978-1-4244-7871-2.
Anstice et al.; (1996). "The Design of a Pen-Based Musical Input System"; Department of Computer Science School of Music, University of Canterbury, Christchurch, New Zealand; 8 pages.
Beltramelli; Tony; (2017). "pix2code: Generating Code from a Graphical User Interface Screenshot"; Ulzard Technologies; Copehhagen, Denmark; 9 pages.
Blei et al.; "Latent Dirichlet Allocation"; Journal of Machine Learning Research 3 (2003); pp. 993-1022.
Celma, Oscar; "Music Recommendation and Discovery: The Long Tail, Long Fail, and Long Play in the Digital Music Space"; ISBN: 978-3-642-13286-5; Library of Congress Control No. 2010929848; 202 pages.
Colorado Professional Learning Network; (2017). "Music Difficulty Grade Level Correlations"; Colorado Department of Education; retrieved from Professional Learning Network:https://www.coloradoplc.org/files/archives/smartmusicdifficultycorrelations.pdf. pp. 1-23.
Deng et al.; (2017). "What You Get Is What You See: A Visual Markup DeCompiler"; Association for the Advancement of Artificial Intelligence; 7 pages.
Fujishima, Takuya; (1999). "Realtime Chord Recognition of Musical Sound: a System Using Common Lisp Music" CCRMA, Stanford University, Stanford, CA 94305; 4 pages.
Ghias et al.; (1995). "Query by Humming—Musical Information Retrieval in an Audio Database"; ACM Multimedia 95—Electronic Proceedings; Nov. 5-9; 7 pages.
Good, Michael; (2001). "MusicXML for Notation and Analysis"; MIT Press, Cambridge, MA; pp. 113-124.
Goodfellow et al.; (2016). "Deep Learning"; 43 pages.
Greet, Justin; "Improved Optical Music Recognition (OMR)"; Stanford University; 7 pages.
Herremans et al.; "Modeling Musical Context Using Word2ved"; Proceedings of the First International Workshop on Deep Learning and Music joint with IJCNN, Anchorage, US, May 2017; 8 pages.
Ingersoll et al.; "Taming Text: How to Find, Organize and Manipulate It"; Manning Publications Co., ISBN 9781933988382; 322 pages.
Jurafsky et al.; "Speech and Language Processing: An Introduction to Natural Language Processing, Computational Linguistics, and Speech Recognition"; 33 pages.
Karpathy et al.; (2015). "Deep Visual-Semantic Alignments for Generating Image Descriptions"; Department of Computer Science; Stanford University; 17 pages.
Kincaid et al.; "Derivation of New Readability Formulas (Automated Readability Index, Fog Count and Flesch Reading Ease Formula) for Navy Enlisted Personnel"; Institute for Simulation and Training; 49 pages.
Knees et al., "Music Similarity and Retrieval: An introduction to Audio-and Web-based Strategies"; The Information Retrieval Series, vol. 36; 313 pages.
Lau et al.; "Word Sense Induction for Novel Sense Detection"; Proceedings of the 13th conference of the European Chapter of the Association for Computational Linguistics; pp. 591-601.
Manning et al.; "An Introduction to Information Retrieval"; Online edition; 2009 Cambridge UP; Apr. 1, 2009; 37 pages.
Meredith, David; "Computational Music Analysis"; Department of Architecture, Design and Media Technology; 14 pages.
Padilla et al.; "Improving Optical Music Recognition by Combining Outputs From Multiple Sources"; Proceedings of the 16th ISMIR Conference, Malaga, Spain; Oct. 26-30, 2015; 7 pages.
Pardo et al.; "Algorithms for Chordal Analysis"; Artificial Intelligence Laboratory, Science Department, The University of Michigan; Computer Music Journal, 26:2, pp. 27-49, Summer 2002; 23 pages.
Ramirez et al.; "Symbol Classification Approach for OMR of Square Notation Manuscripts"; 11th International Society for Music Information Retrieval Conference (ISMIR 2010); 5 pages.
Sears et al.; "Modeling Harmony With Skip-Grams"; Department of Computational Perception, Johannes Kepler University, Linz, Austria; 7 pages.
Szeliski, Richard; "Image Alignment and Stitching: A Tutorial"; Foundations and Trends in Computer Graphics and Vision; vol. 2; No. 1 (2006); pp. 1-104.
Yu et al.; "Predicting Expressive Bow Controls for Violin and Viola"; A thesis submitted in partial fulfillment of the requirements for the Degree of Bachelor of Arts with Honors in Computer Science; Williams College, Williamstown, Massachusetts; May 23, 2016; 200 pages.
MakeMusic/musicxml.com: Website: https://www.musicxml.com; "What is MusicXML? The standard open format for exchanging digital sheet music" 1 page.
MakeMusic/musicxml.com: Website: https://www.musicxml.com/for-developers/standard-sounds; "Standard Sounds". 1 page.
MakeMusic/musicxml.com: Website: https://www.musicxml.com/tutorial/compressed-mxl-files/compressed-file-format; "Compressed Filed Format" 1 page.
MakeMusic/musicxml.com: Website: https://www.musicxml.com/for-developers/musicxml-xsd; "MusicXML XSD". 1 page.

(56) References Cited

OTHER PUBLICATIONS

MIDI Association: Website: https://www.midi.org; "The MIDI Association"; The global community of people who work, play and created with MIDI. 10 pages.
Music Encoding Initiative: Website: music-encoding.org; "Music Encoding Initiative". 2 pages.
W3C SVG: Website: https://www.w3.org/TR/SVG11/struct.html#UseElement' "5.6 The 'use' element". 38 pages.
Mints Patent Summary Addendum; Works Cited; 66 pages.
Aho et al.; (2006). "Compilers: Principles, Techniques, and Tools"; (2nd Edition ed.). Prentice Hall. Abstract. 1 page.
Brunelli, R. (2009). "Template Matching Techniques in Computer Vision: Theory and Practice"; Wiley. Abstract. 1 page.
Gould, E. (2011). "Behind Bars".; London, UK: Faber Music Ltd. Abstract. 1 page.
Hoos, et al. (2001). "Representing Score-Level Music Using the GUIDO Music-Notation Format"; Computing in Musicology (pp. 88-89) Stanford, CA: Center for Computer Assisted Research in the Humanities. Abstract. 1 page.
Parsons, D. (1975). "The Directory of Tunes and Musical Themes"; Cambridge, UK: Spencer Brown and Co. Abstract. 1 page.
Singer, J. (2001). "Defining the Features of Monophonic Vocal Melodies"; Computing in Musicology (pp. 188-200). Stanford, CA: Center for Computer Assisted Research in the Humanities. Abstract. 1 page.
Steyn, J. (2013). "Structuring Music Through Markup Language: Design and Architectures"; Hershey, PA, USA: Information Science Reference (IGI Global). Abstract. 1 page.
Temperley, D. (2007). "Music and Probability"; Cambridge, MA, USA: MIT Press. Abstract. 1 page.
Church et al., (2014). "Improving Rhythmic Transcriptions via Probability Models"; Applied Post-OMR, ISMIR, (pp. 643-648).
Huron, D., (2017). "humdrum-tools". Retrieved from Humdrum:http://www.humdrum.org/.
International Search Report dated Sep. 6, 2018; International Application No. PCT/US2018/034411; International Filing Date May 24, 2018; 4 pages.
Written Opinion dated Sep. 6, 2018; International Application No. PCT/US2018/034411; International Filing Date May 24, 2018; 4 pages.

* cited by examiner

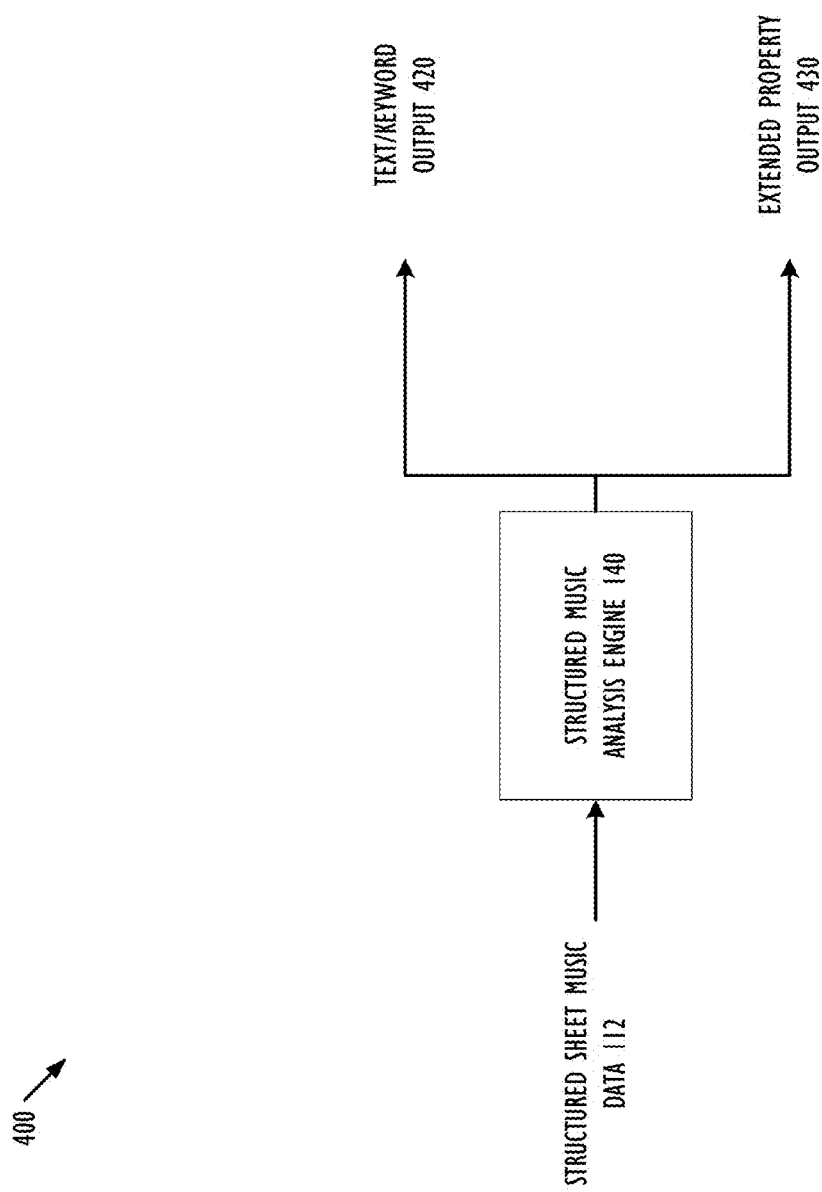

SHEET MUSIC SEARCH AND DISCOVERY SYSTEM

CROSS REFERENCE TO RELATED APPLICATIONS

This applications claims priority to U.S. Prov. Pat. No. 62/511,025, filed May 25, 2017, which is hereby incorporated by reference.

BACKGROUND

Searching for and selecting sheet music, particularly for an ensemble, is an imprecise and challenging process because the buyer needs to understand both the musical abilities of the ensemble and how well the printed music matches those abilities. With extensive music training and experience, a buyer (or a seller making a recommendation) can manually review sheet music and make a subjective determination as to the suitability of each work over the others. With thousands of pages of sheet music available, however, such a manual review is so inefficient that a comprehensive review of all available options is unrealistic. Furthermore, such subjective interpretations are often error prone, as even an experienced buyer can incorrectly assess the suitability of a piece or the abilities of an ensemble, which may change over time.

Online sheet music retailers have dedicated search engines. However, conventional search engines are configured to only provide functionality for users to search for and filter by textual data such as title, composer, arranger, short text description of the composition, keywords, and possibly lyrics). Conventional sheet music search engines are incapable of providing functionality to search or filter by other musically relevant information, such as range or difficulty. Even manually viewing each composition in search results in order to make a subjective determination is difficult, as retailers generally do not provide the entire document because of piracy concerns.

In the field of natural language processing, vector representations of words that carry syntactic and semantic information (word embeddings) have proven powerful in various natural language processing tasks, in particular in sentiment analysis. Meanwhile, machine learning algorithms have also been used to detect patterns in data and generalize those patterns in order to adapt to data that it has not previously seen. For example, sequence labeling has been used to algorithmically assign categorical labels to observed values.

However, processes have not been developed for generating vector representations of sheet music data to analyze and characterize sheet music and provide functionality for a user to search and/or filter sheet music based on musically-relevant characterizations of the underlying sheet music. Furthermore, machine learning algorithms have not been developed for analyzing and characterizing sheet music to provide functionality for a user to search and/or filter sheet music based on those characterizations.

Accordingly, there is a need for a system that uses specific mathematical rules to analyze and characterize sheet music and provides functionality for a user to leverage those characterizations while searching for and selecting sheet music. Furthermore, there is a need for a search engine and graphical user interface that provides functionality for a user to search and/or filter sheet music based on musically-relevant characterizations of the underlying sheet music, such as the instrumentation and range of the compositions.

Some sheet music may be available in structured formats (such as MusicXML) that contains musical data (e.g., pitches, rhythms, clefs, articulations, etc.) in a musically semantic structure. Other sheet music, however, may only be available as (unstructured) image data (such as PDFs). Unstructured sheet music data can be converted to structured music data and analyzed using the same mathematical rules mentioned above. However, a two-step process of converting image data to structured sheet music data and then using mathematical rules developed for analyzing structured sheet music data may be computationally inefficient. Furthermore, the conversion process may not be precise, particularly if the image data is unclear.

Accordingly, there is an additional need for a system that uses mathematical rules specifically developed to analyze and characterize unstructured sheet music images along with the functionality for a user to search and/or filter sheet music based on those characterizations.

SUMMARY

In order to overcome those and other drawbacks in the prior art, there is provided a sheet music search and discovery system.

In some embodiments, the system analyzes compositions stored as structured sheet music data to generate metadata characterizing each composition (or part within the composition). To do so, the system stores a global vector space of semantic representations of elements extracted from a corpus of structured music data, where semantically similar elements extracted from the corpus are clustered together in the global vector space, generates semantic representations of each composition, and generates metadata characterizing each composition in part by comparing the semantic representations. The system may also generate metadata characterizing each composition or part through deterministic functions, rules and/or heuristics, extracting and labeling phrases, or machine learning. In particular, machine learning may be used to predict the difficulty of each composition or part.

In some embodiments, the system analyzes compositions stored as image data using machine learning-based pattern recognition. For example, the system may use algorithms pretrained to determine a range of a composition, extract and describe phrases, extract and analyze measures, determine the difficulty of each composition (by comparing image patterns to image patterns in a corpus of known compositions). In some embodiments, the algorithms may generate metadata without recognizing individual notes. In other embodiments, musically-relevant objects (e.g., staves, measures, clefs, or notes) may be detected using object detection algorithms or by analyzing drawing commands in vector image data.

The metadata generated by the system allows the system to provide search and recommendation functionality unlike anything currently available. For example, the system may provide functionality for users to identify instruments and a range for each instrument and identify compositions with similar instruments and ranges. Additionally, the system may provide functionality for the user to input a search query that includes keywords or audio (input, e.g., by singing or humming). The system may also identify recommendations for the user and/or provide functionality to automatically generate a concert program by comparing the instruments and ranges of each of the compositions.

Using the specific mathematical rules to analyze and characterize sheet music as described herein is distinct from the subjective determinations previously performed by the buyers of sheet music (and sellers making recommendations).

Unlike conventional sheet music search engines, which simply select from available sheet music based on existing textual information to provide a humanly comprehensible number of search results, the disclosed system generates new data; specifically, a new kind of metadata characterizing the underlying sheet music. The metadata generated by disclosed system enables the disclosed search engine to do things that conventional sheet music search engines cannot. Specifically, the metadata generated by disclosed system enables the disclosed system to provide functionality for a user to search and/or filter sheet music based on musically-relevant characterizations of the underlying sheet music, such as range or difficulty.

Furthermore, since the disclosed system analyzes the underlying sheet music data (rather than just the textual data indexed by conventional sheet music search engines), the disclosed search engine can provide functionality for a user to search the underlying sheet music, for example by singing or humming a melodic fragment.

BRIEF DESCRIPTION OF THE DRAWINGS

A preferred embodiment of the present invention will be set forth in detail with reference to the drawings, in which:

FIG. 4 is a flowchart illustrating the inputs and outputs of an example structured sheet music analysis engine according to an exemplary embodiment of the present invention;

DETAILED DESCRIPTION

Figure 1:
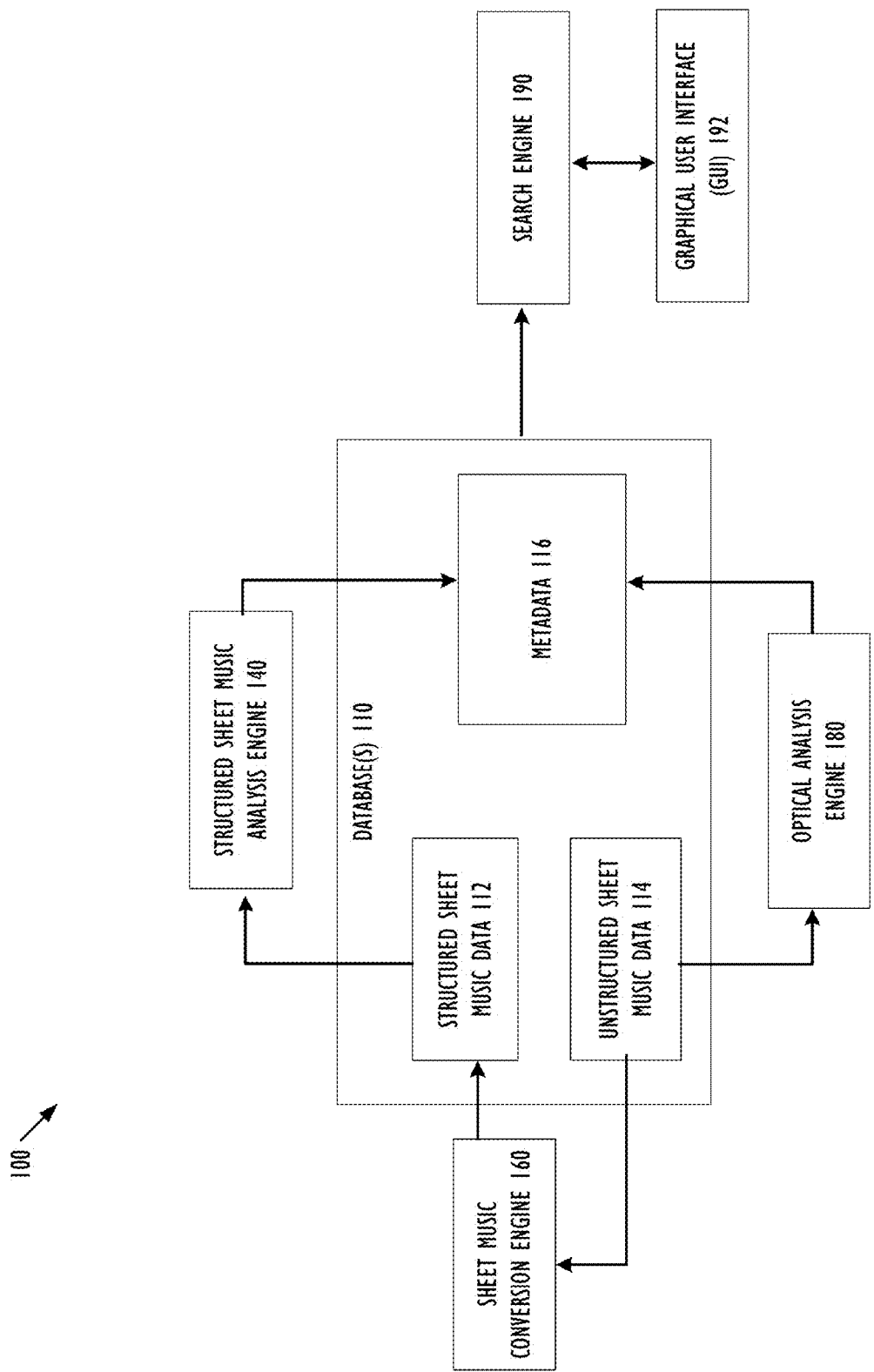
FIG. 1 is a block diagram of a sheet music search and discovery system according to an exemplary embodiment of the present invention.

Preferred embodiments of the present invention will be set forth in detail with reference to the drawings, in which like reference numerals refer to like elements or steps throughout.

FIG. 1 is a block diagram of a sheet music search and discovery system 100 according to an exemplary embodiment of the present invention.

As shown in FIG. 1, the sheet music search and discovery system 100 includes one or more databases 110, a structured sheet music analysis engine (SMAE) 140, a sheet music conversion engine 160, an optical analysis engine 180, a search engine 190, and a graphical user interface 192. The one or more databases 110 store structured sheet music data 112, unstructured sheet music data 114, and metadata 116 identified by the system 100 based on the structured sheet music data 112 and the unstructured sheet music data 114.

The structured sheet music data 112 may be sheet music (i.e., compositions) that contains musical data (e.g., pitches, rhythms, clefs, articulations, etc.) in a musically semantic structure (e.g., MusicXML). MusicXML is a common encoding of structured musical data in Extensible Markup Language (XML) format. XML is a generic encoding of hierarchical data stored in a flat text file. An XML file consists of set of nodes, also called elements. An XML document consists of a root node which contains zero or more child nodes, each of which may contain zero or more child nodes and so forth. A node which contains no child nodes is called an empty node. A node which contains one or more child nodes is called the parent of the child nodes it contains. Note that while a parent node may contain multiple child nodes, a child node cannot be contained by more than one parent, and therefore cannot have more than one parent node. More detail regarding XML may be found in the World Wide Web Consortium (W3C) documentation (http://www.w3c.org/XML), which is incorporated herein by reference. More detail regarding MusicXML may be found in the MusicXML documentation (http://usermanuals.musicxml.com/MusicXML/MusicXML.htm), which is incorporated herein by reference. Additionally or alternatively, the structured sheet music data 112 may be encoded in another format, such as Music Encoding Initiative (MEI) (see http://music-encoding.org/), MNX (see https://www.w3.org/community/music-notation/2016/05/19/introducing-mnx/), ABC (see http://abcnotation.com), MuseData (see http://www.musedata.org/about/), etc.

The unstructured sheet music data 114 may be sheet music (i.e., compositions) in a graphical format (e.g., bitmap, vector etc.). The unstructured sheet music data 114 lacks the musical semantics included in the structured sheet music data 112 described above, and therefore requires additional processing to identify musical semantics as described below. Both the structured sheet music data 112 and the unstructured sheet music data 114 may be stored in computer readable formats. As described in detail below, the metadata 116 includes data that describes the (structured and unstructured) sheet music data 112 and 114.

Figure 2:
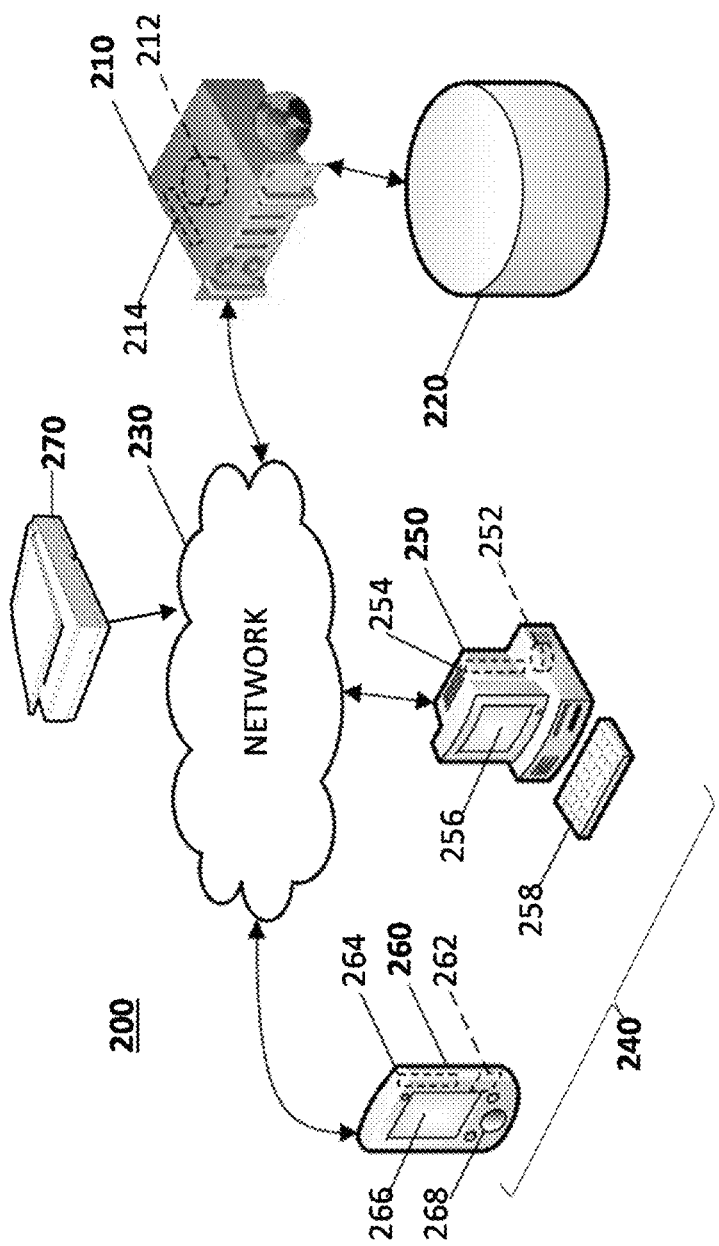
FIG. 2 is a drawing illustrating an overview of the architecture of a sheet music search and discovery system according to an exemplary embodiment of the present invention.

FIG. 2 is a drawing illustrating an overview of the architecture 200 of the sheet music search and discovery system 100 according to an exemplary embodiment of the present invention.

As shown in FIG. 2, the architecture 200 may include one or more servers 210 and one or more storage devices 220 connected to a plurality of remote computer systems 240, such as one or more personal systems 250 and one or more mobile computer systems 260, via one or more networks 230. The architecture 200 may also include one or more document scanners 270 that communicate with the one or more servers 210 and output data for storage in the one or more storage devices 220 either directly (via wired or wireless communication) or via the one or more networks 230.

The one or more servers 210 may include an internal storage device 212 and a processor 214. The one or more servers 210 may be any suitable computing device including, for example, an application server and a web server which hosts websites accessible by the remote computer systems 240. The one or more storage devices 220 may include external storage devices and/or the internal storage device 212 of the one or more servers 210. The one or more storage devices 220 may also include any non-transitory computer-readable storage medium, such as an external hard disk array or solid-state memory. The networks 230 may include any combination of the internet, cellular networks, wide area networks (WAN), local area networks (LAN), etc. Communication via the networks 230 may be realized by wired and/or wireless connections. A remote computer system 240 may be any suitable electronic device configured to send and/or receive data via the networks 230. A remote computer system 240 may be, for example, a network-connected computing device such as a personal computer, a notebook computer, a smartphone, a personal digital assistant (PDA), a tablet, a portable weather detector, a global positioning satellite (GPS) receiver, network-connected vehicle, a wearable device, etc. A personal computer system 250 may include an internal storage device 252, a processor 254, output devices 256 and input devices 258. The one or more mobile computer systems 260 may include an internal storage device 262, a processor 264, output devices 266 and input devices 268. An internal storage device 212, 252, and/or 262 may include one or more non-transitory computer-readable storage mediums, such as hard disks or solid-state memory, for storing software instructions that, when executed by a processor 214, 254, or 264, carry out relevant portions of the features described herein. A processor 214, 254, and/or 264 may include a central processing unit (CPU), a graphics processing unit (GPU), etc. A processor 214, 254, and/or 264 may be realized as a single semiconductor chip or more than one chip. An output device 256 and/or 266 may include a display, speakers, external ports, etc. A display may be any suitable device configured to output visible light, such as a liquid crystal display (LCD), a light emitting polymer display (LPD), a light emitting diode (LED), an organic light emitting diode (OLED), etc. The input devices 258 and/or 268 may include keyboards, mice, trackballs, still or video cameras, touchpads, etc. A touchpad may be overlaid or integrated with a display to form a touch-sensitive display or touchscreen.

Referring back to FIG. 1, the structured sheet music data 112, the unstructured sheet music data 114, and the metadata 116 may be any organized collection of information, whether stored on a single tangible device or multiple tangible devices, and may be stored, for example, in the one or more storage devices 220. The metadata 116 describing each composition is associated with that composition such that the metadata 116 can be used to discover compositions from the structured sheet music data 112 that are relevant to users. As described above, the structured sheet music data 112 may be in computer readable format that contains musical data such as pitches, rhythms, clefs, articulations, etc. in a musically semantic structure (e.g., MusicXML). The structured sheet music analysis engine (SMAE) 140, the sheet music conversion engine 160, the optical analysis engine 180, and the search engine 190 may be realized by software instructions stored on one or more of the internal storage devices 212, 252, and/or 262 and executed by one or more of the processors 214, 254, or 264. The graphical user interface 192 may be any interface that allows a user to input information for transmittal to the sheet music search and discovery system 100 and/or outputs information received from the sheet music search and discovery system 100 to a user. The graphical user interface 192 may be realized by software instructions stored on one or more of the internal storage devices 212, 252, and/or 262 executed by one or more of the processors 214, 254, or 264.

The metadata 116 describes the compositions stored as structured sheet music data 112 or unstructured sheet music data 114.

Analyzing Structured Sheet Music Data

Figure 3:
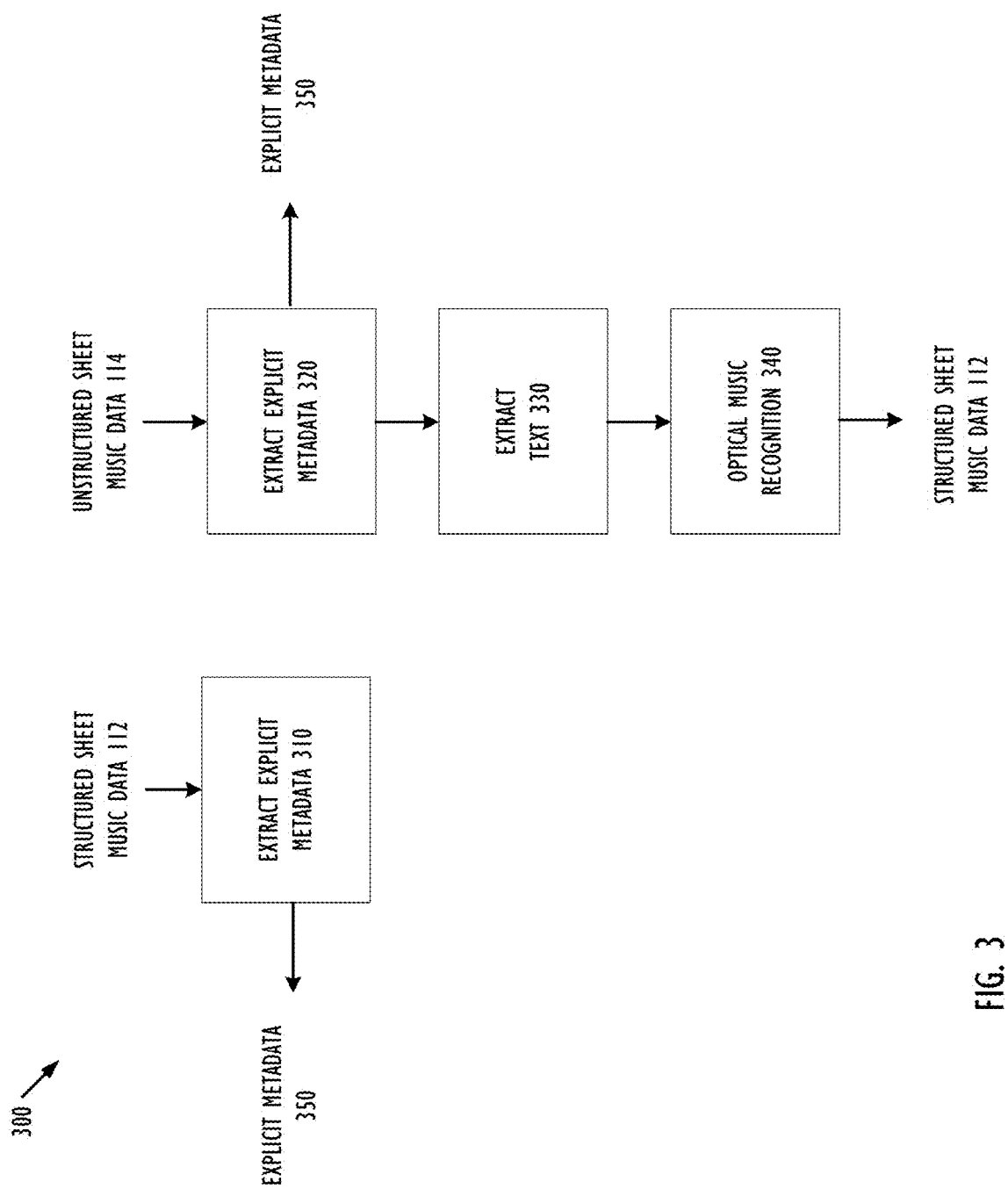
FIG. 3 is a flowchart illustrating a process for extracting explicit metadata from structured sheet music data and unstructured sheet music data and converting unstructured sheet music data into structured sheet music data according to an exemplary embodiment of the present invention.

FIG. 3 is a flowchart illustrating a process 300 for extracting explicit metadata 350 from structured sheet music data 112 and unstructured sheet music data 114 and converting unstructured sheet music data 114 into structured sheet music data 112 according to an exemplary embodiment of the present invention.

Explicit metadata 350 is extracted from the structured sheet music data 112 by the SMAE 140 at 310. Explicit metadata 350 refers to metadata 116 directly encoded in the structured sheet music data 112 or unstructured sheet music data 114. Often, structured sheet music data 112 includes low-level semantics such as notes, rhythms, etc. and lacks higher-level semantics such as range or difficulty. (This is analogous to text documents which encode characters, words, and sentences, but do not encode higher-level semantics like subject matter or syntax.) Therefore, as described below, the SMAE 140 analyzes the structured sheet music data 112 to calculate or determine mid-level and/or higher-level semantic metadata 116 describing each composition. In the context of sheet music data, explicit metadata 350 includes title, composer, instrumentation, etc. Explicit metadata 350 is extracted from structured sheet music data 112 by reading the structured fields of the data. If any expected explicit metadata 350 is missing, the field is marked as missing.

Explicit metadata 350 is extracted from the unstructured sheet music data 114 by the SMAE 140 at 320. Because unstructured sheet music data 114 does not include structured fields like structured sheet music data 112, it is more likely unstructured sheet music data 114 is missing musically-relevant explicit metadata 350 while including musically irrelevant explicit metadata 350 such as colorspace, bit resolution, dots per inch, etc. Explicit metadata 350 missing from unstructured sheet music data 114 is marked as missing.

The unstructured sheet music data 114 is converted into structured sheet music data 112 by the sheet music conversion engine 160 at 330 and 340. Optical character recognition (OCR) is used to extract text data (e.g., title, composer, etc.) and stores the extracted text data as metadata 116 at 330. Optical music recognition (OMR) is used to extract musical notations at 340. The text data and musical notations extracted from the unstructured sheet music data 114 are formatted into structured sheet music data 112. Accordingly, as used for the remainder of this description, structured sheet music data 112 refers to both structured sheet music data 112 and unstructured sheet music data 114 that has been converted into structured sheet music data 112.

FIG. 4 is a flowchart 400 illustrating the inputs and outputs of the SMAE 140 according to an exemplary embodiment of the present invention.

As shown in FIG. 4, structured sheet music 112 is input to the SMAE 140 and the SMAE 140 outputs text/keyword output 420 and extended property output 430. The text/keyword output 420 may include individual words, phrases, or sentences that describe the musical content of the document using musical terminology. The text/keyword output 420 may be fed into a keyword-based search engine, used in evaluating natural language queries, etc. The extended property output 430 may include statistics or other numerical features (e.g., range, difficulty, etc.) that provide additional information about the document in formats other than plain text. The extended property output 430 may be queried through a specialized user interface such as that described in FIGS. 16-19.

Figure 5A:
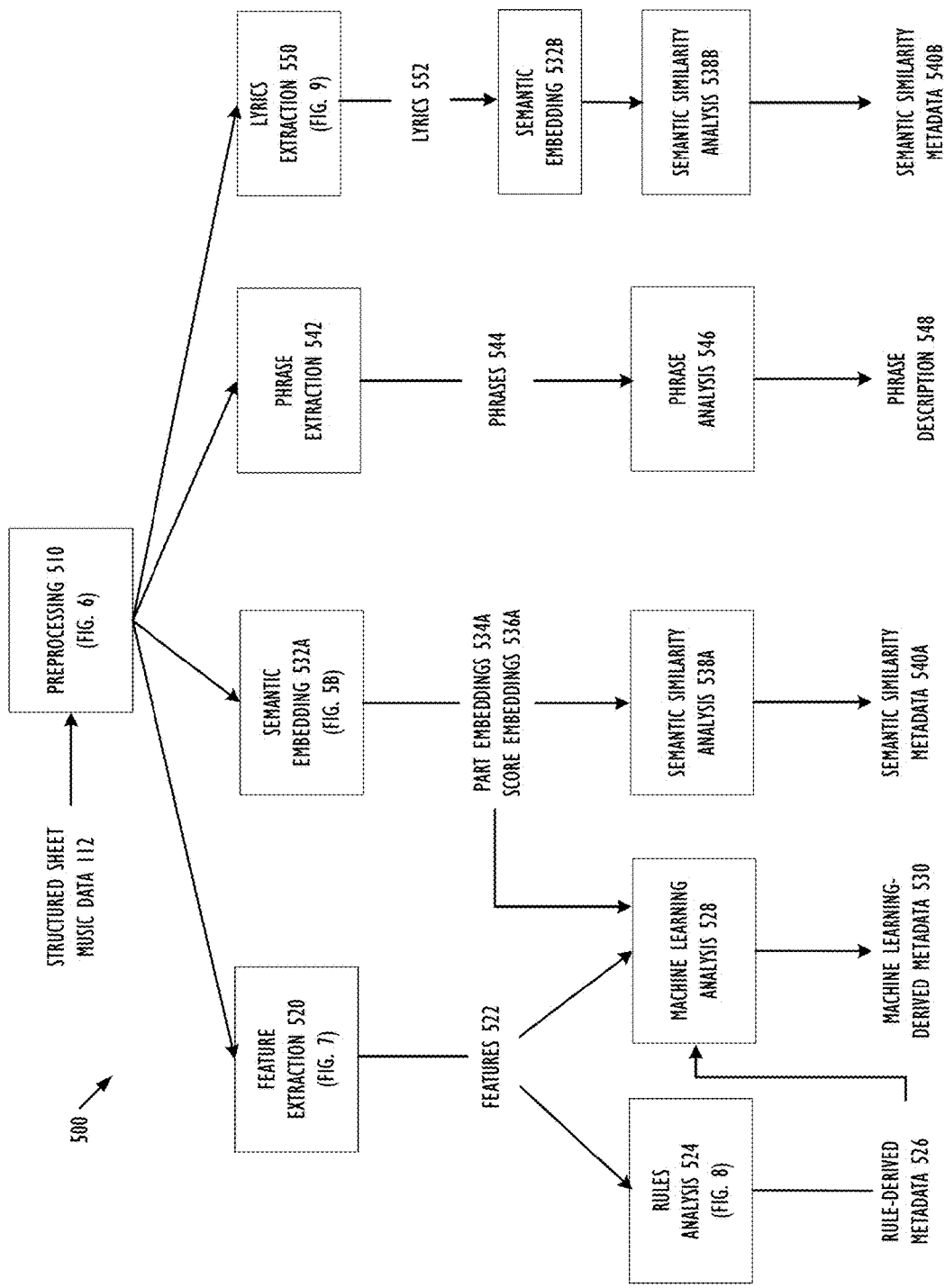
FIG. 5A is a flowchart illustrating a workflow of an example structured sheet music analysis engine according to an exemplary embodiment of the present invention.

FIG. 5A is a flowchart illustrating a workflow 500 of the structured sheet music analysis engine (SMAE) 140 according to the present invention.

The structured sheet music 112 is preprocessed at 510. Preprocessing allows music from different sources such as different publishers or notation format to be analyzed using the same procedures. (The publisher, notation format, etc. may be identified in the explicit metadata 350.) Further, because the SMAE 112 may analyze a complete score, individual parts, or both, the structured sheet music 112 must be preprocessed into a normalized format. If a complete score is provided, individual parts must be extracted. If individual parts are provided, a score must be compiled. This is necessary because some features are specific to individual parts, such as the range of individual instruments, while other features require knowledge of the entire score, such as when individual instruments have solos. Preprocessing 510 will be discussed further in FIG. 6. The preprocessed structured sheet music 112 may be used by the SMAE 140 to perform feature extraction 520, semantic embedding 532A, phrase extraction 542, and lyrics extraction 550 as described below.

Feature extraction 520 is a process for analyzing structured music data 112 to calculate features 522 that can be directly computed by a deterministic mathematical function or algorithm. (Deterministic means the same inputs always produce the same outputs.) Features 522 include relevant musical data, statistical features (e.g., the average number of notes in a measure), features derived from lookup tables, range, pitch histograms, etc. Some or all of the features 522 may be used to calculate the higher level semantic metadata at 526 and 530, as described below. Feature extraction 520 is discussed further in reference to FIG. 7.

The SMAE 140 may perform rules analysis 524. The rules analysis 524 is the use of rules and/or heuristics to determine higher-level semantic metadata, referred to herein as rule-derived metadata 526. As used herein, a "heuristic" is a rule without a theoretical or pedagogical foundation (as opposed to a "rule," which, as used herein, is explicitly defined based on information from musicology or music education literature.) Examples of heuristics that may be used by the SMAE 140 to generate rule-derived metadata 526 are shown in Table 1:

TABLE 1

| Heuristic | Implies |
| --- | --- |
| Number of characters/bytes | A larger file size implies a more difficult composition |
| Number of notes | More notes implies a more difficult composition |
| Average number of notes per measure | A higher average number of notes per measure implies a more difficult composition, while a lower average number of notes per measure implies a less difficult composition |
| Average number of child nodes of the <measure> element | If a <measure> element contains more children, it indicates a more difficult measure because the child nodes include more notes, dynamics, etc. |
| Average number of child nodes of the <note> element | If a <note> element contains more children, it indicates a more difficult note because the child nodes includes more articulations, dynamics, etc. Averaging over all of the <note> elements implies a more difficult composition. |

TABLE 1-continued

| Heuristic | Implies |
|---|---|
| Pitch Histogram | A pitch histogram with a wide standard deviation implies a more difficult composition (more notes and greater range), while a narrow standard deviation implies an easier composition (fewer notes and narrower range). Similarly, skew distributions may imply more difficult compositions because the central tendency may emphasize or focus on a particular high or low range of the instrument. |

As used herein, a "rule" is explicitly defined based on information from musicology or music education literature (as opposed to a "heuristic," which is rule without a theoretical or pedagogical foundation). Examples of rules that may be used by the SMAE 140 to generate rule-derived metadata 526 are shown in Table 2:

TABLE 2

| Rule | Description |
|---|---|
| Range | Iterate over all the notes to find the minimum and maximum notes of a given part. Musicians refer to this as either the range or ambitus. |
| Lyrics | Lyrics are encoded on a per-note basis in MusicXML, and must be extracted from each note into a separate entity of lyrics. Additional processing must be done for multiple/alternate verses, as well as melismas (single syllables that span more than one note). |
| Key Signatures | The key signature of a composition may indicate the difficulty of a composition. Similarly, the number of key signature changes, and the rate of key signature changes also imply difficulty. A composition that changes keys frequently is more difficult than a composition in a single key or with only one key change. |
| Meter | The meter of a composition is an extremely important part of determining the difficulty of a composition. "Simple meters" and "compound meters" are relatively easy, while "irregular meters" can be extremely difficult. Also, the lack of meter ("senza misura") may indicate a cadenza, which would greatly increase the difficulty of the composition. ("Simple meters" and "compound meters" are precise terms in music theory with specific meanings.) |
| Rhythmic Vocabulary | Rhythmic vocabulary is the number of distinct note durations and the number of times each occurs in a composition. An example of rhythmic vocabulary is "Whole, Half, Quarter", indicating that the composition uses notes and rests with durations of whole notes, half notes, and quarter notes. A larger rhythmic vocabulary implies a more difficult composition. Additionally, a specific vocabulary item (such as an augmentation dot appearing inside of a tuplet) implies a greater level of difficulty. Rhythmic vocabulary may also include counts of how often the rhythmic item appears (e.g., 10 whole notes, 30 quarter notes, 24 eighth notes) referred to below as "duration type frequency." |
| Rhythmic Onset Density | Rhythmic onset density is the number of notes occurring in a measure that are neither a) rests nor b) the continuation or end of a tie. Such notes are referred to as onsets. The more onsets in a measure, the more difficult it is to play. For example, a measure consisting of a single whole note contains one onset, and is easy to perform, while a measure of all $16^{th}$ notes in 4/4 time (16 onsets) is much more difficult. Averaging the rhythmic density of onsets over all the measures implies overall difficulty of a composition. |
| Relations among Meter, Rhythm, and Tempo | A $16^{th}$ note in a slow 6/8 meter is relatively easy to perform while a $16^{th}$ note in a fast 2/2 meter is much more difficult. Rules can be written to capture the relation among meter, rhythm, and tempo to further imply the difficulty of a composition. |
| Idiomatic Instrumental Techniques | The same passage played on different instruments can have varying degrees of difficulty. For example, $16^{th}$ note flourishes are relatively easy to perform on flute and piccolo, but extremely difficult on tuba. Additionally, there may be difficulties peculiar to individual instruments. For example, it is difficult for clarinets to play around the "break", and it is also difficult for trombones to play between B natural in $7^{th}$ position and Bb in $1^{st}$ position without the use of an F attachment. |

TABLE 2-continued

| Rule | Description |
|---|---|
| | These idiomatic issues imply difficulty on a per-instrument basis. |
| Instrument Changes | Some compositions require a single player to change instruments at some point during the composition. For example, an oboist may also be required to perform on an English horn within the same part. Any instrument change implies a more difficult part because most performers generally only perform on one instrument. Changing instruments is generally limited only to advanced and professional musicians. |
| Aggregate Difficulty Measure (Grade/Level) | The above may be combined into an aggregate metric, known as the grade or difficulty level. |

Figure 8:
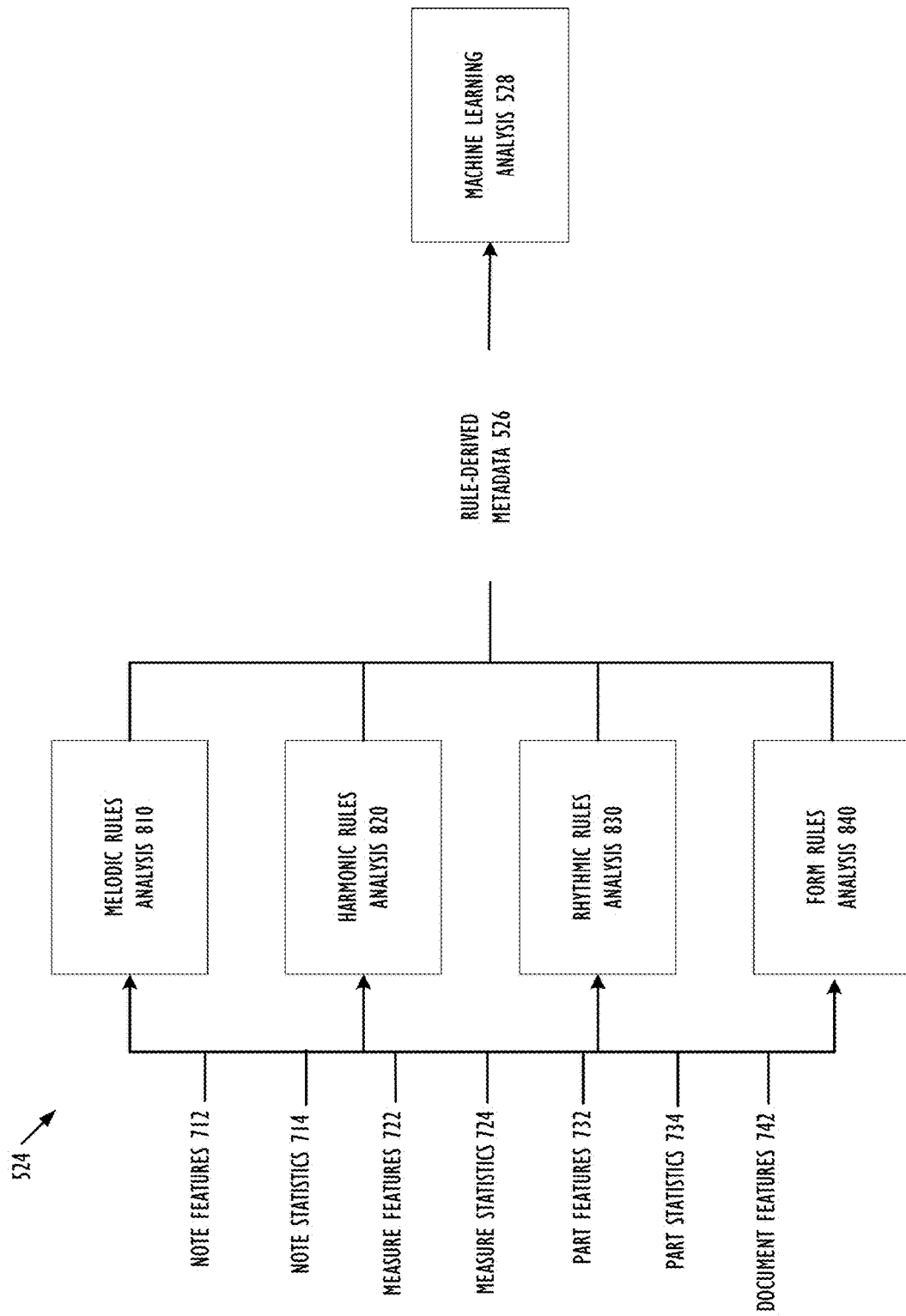
FIG. 8 is a flowchart illustrating a rules analysis process according to an exemplary embodiment of the present invention.

The rules analysis process 524 includes a number of subroutines, each specializing in a particular analysis method, which are discussed further with reference to FIG. 8.

Music-based rules and heuristics, such as those described above, can provide a multitude of musically-relevant information from structured sheet music data 112. However, some musical idioms are highly subjective and no clear rule or heuristic exists. Therefore, machine learning analysis 528 may be used to analyze the structured sheet music data 112 (as well as the rule-derived metadata 526 and/or the features 522) to generate higher-level semantic metadata 116, referred to herein as machine-learning derived metadata 530.

Machine learning is a subfield of computer science that studies a class of algorithms that can detect patterns in data and generalize those patterns in order to adapt to data that it has not previously seen.

In some embodiments, the machine learning analysis 528 may include ensemble learning. Ensemble learning uses multiple machine learning algorithms to obtain better predictive performance than could be achieved from any one constituent learning algorithm. The machine learning algorithms may include a k-nearest neighbors algorithm, support vector machines, neural networks, etc. Multiple machine learning algorithms of the same kind may be used where each algorithm varies with respect to their hyperparameters. For example, multiple neural networks may be used where the number of nodes in the hidden layer of each neural network varies.

Examples of subjective musical characteristics that may be identified in the structured sheet music data 112 by performing the machine learning analysis 528 are shown in Table 3:

TABLE 3

| Subjective Musical Characteristic | Description |
|---|---|
| Syncopation | Syncopation is loosely defined as an uneven or irregular rhythm. Syncopated rhythms are more difficult to perform, and imply a more difficult composition. No agreed upon rule exists as to what constitutes a syncopated rhythm, so a machine learning algorithm appears to be an appropriate solution. Both supervised and unsupervised approaches may be useful in determining an algorithm for identifying syncopation. |
| Form | Form is a higher level of syntactic musical organization. Linguistic analogues include rhyming schemes, poetic forms, or even larger forms like literary arcs. Musical forms include low level forms like periods, or higher level forms like rondo and sonata-allegro. Phrasing is a pre-requisite for form, and given that phrasing does not have a clear set of rules, neither does form. Possible approaches to identifying form include recursive neural networks and convolutional neural networks similar to those used in sentence parsing in natural language processing. Co-occurrence matrices may also be used. |
| Style/Time Period | Style is an extremely subjective musical characteristic. Some research has already been done on style classification using statistics, but machine learning techniques are likely to provide more accurate and relevant results. |
| Harmonic Progression | Although the notes and key are explicitly defined in structured data, harmonic analysis information (while specified in the MusicXML specification) is optional and often omitted from the structured data. Harmonic information is included in Piano/Vocal/Guitar (PVG) arrangements and Lead Sheets, but rarely included in other formats. Harmonic information may be extracted by performing a reduction of all the parts (transposed to sounding pitch), and then performing a harmonic analysis. Such a harmonic analysis may use a hidden Markov model (HMM), or one of the syntactic approaches described above. A reduction is necessary because while harmonic analysis is relatively easy on homophonic music, a single melody, it is often difficult to determine the harmonic progression in polyphonic music, two or more melodies. |

TABLE 3-continued

| Subjective Musical Characteristic | Description |
| --- | --- |
| Tonal Centricity | Tonal centricity is related to harmonic progression described above. While key signatures appear in the structured data, a composition may modulate temporarily, either to create musical interest, or to develop musical material such as during the development section of a sonata-allegro form. Compositions that temporarily and/or frequently modulate without changing key signatures, or lack a key signature altogether, are more difficult to perform. |
| Exposed Parts | A part is considered exposed if it is playing solo, soli, or a distinct musical figure. It remains unclear whether a rules-based or machine learning based approach will work better to identify exposed parts. However, current research into a rules-based system indicates that such a system may be insufficient and that determining exposed parts may be more subjective than originally thought. |

In particular, the machine learning analysis 528 can be used to predict the difficulty of each composition (or each part within each composition). The structured sheet music data 112 may include a corpus of compositions or parts that are labeled (e.g., manually labeled) as having a certain difficulty level (e.g., on a 1-5 scale, a 1-10 scale, etc.). A supervised learning process can then be used to learn a function for determining a probability that another composition or part has those difficulty levels (e.g., a 0.5 percent probability of grade 1, an 85.5 percent probability of grade 2, etc.). The surprised learning process may compare the compositions in structured sheet music data 112 (and the metadata 116 describing those compositions) to the compositions in the corpus (and metadata 116 describing those compositions). Additionally or alternatively, the supervised learning process may compare semantic representations of the compositions in structured sheet music data 112 (e.g., the part embeddings 534A and score embeddings 536A discussed below) to semantic representations of the compositions in the corpus.

Examples of rule-derived metadata 526 and machine learning-derived metadata 530 that may be generated by performing rules analysis 524 and/or the machine learning analysis 528 are shown in Table 4:

TABLE 4

Figures 21A, 21B, 21C:
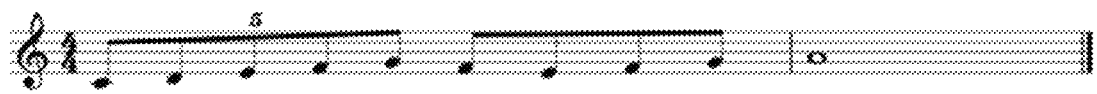
FIG. 21A is an example passage that is rhythmically difficult but not very syncopated.
FIG. 21B is a musical excerpt.
FIG. 21C illustrates each note being represented by an index from a vocabulary.

| Output | Description |
| --- | --- |
| Part Doubling | Two or more instruments playing similar musical material, as well as the measures and intervals at which the doubling occurs. |
| Exposed Solos | The instruments and measure numbers of any exposed solos. |
| Independence of Parts | The instruments and measure numbers of any independent parts. This does not include exposed solos, but may include lead lines (non-exposed solos), solis, descants, etc. |
| Degree of Syncopation by Part | A grade of the syncopation level of each part on a scale (e.g., from 1-5) with a higher number indicating greater syncopation. |
| Rhythmic Difficulty by Part | A grade of the overall rhythmic difficulty of each part on a scale (e.g., from 1-5) with a higher number indicating greater rhythmic difficulty. While syncopation and rhythmic difficulty both refer to the rhythmic character of the composition, they are somewhat independent. FIG. 21A is an example passage that is rhythmically difficult but not very syncopated |
| Difficulty Grade by Part | The difficulty is computed last in the Rules Engine because it is the culmination of several features and the output of the other submodules |
| Cumulative Grade of Entire Composition | The cumulative grade of the composition computed by aggregating the grades across all parts. This includes the average grade across all parts, as well as the mode, median, minimum, and maximum part grades. |
| Harmonic Language | A list of the harmonic languages that appear in the composition. This is distinct from the chord progression, which only represents a sequence of chords. A harmonic language describes the overall harmonic vocabulary. Examples of harmonic language include pentatonic, diatonic, chromatic, modal, pandiatonic, etc. |
| Parsons Code | The Parsons code of each voice in each part. This represents the overall melodic contour of the voice and can be used for query by humming. Parsons code is only computed for monophonic voices that are not percussive. |
| Melodic Contour | The melodic contour is a descriptive term for the overall contour of the voice in each part. Melodic contour is one of three values: conjunct (smooth), disjunct (jagged), or static. The melodic contour is computed from the intervallic content of the voice as follows: Compute the histogram for all melodic intervals If the unison is the most frequent interval and is greater than the sum of all other interval frequencies, the melodic contour is static If the unison, minor 2nd, or major 2nd is the most frequent interval and the sum of all three of those intervals is greater than the sum of the other interval frequencies, the melodic contour is conjunct Otherwise, the melodic contour is disjunct |
| Form | The formal structure of the composition. This is computed from the repeating note and/or measure structure. A set of rules and/or heuristics is then used to compute the form from common known forms, such as song, rondo, sonata-allegro, 12-bar blues, etc. |
| Style | The musical style of the composition, such as march, bebop, etc. The style is computed from several of the above factors. |

Semantic embedding 532A creates a numerical representation (embedding) of each element (e.g., note, chord, rest, measure, etc.), part, and score within a vector space so that it may be analyzed within a larger context. For example, an embedding algorithm 532A analyzes a large corpus of structured music data to produce a global vector space containing semantic representations of each element in the corpus. As described in detail below, the global vector space is a map of each element where similar elements are represented closer than dissimilar ones. Once the global vector space is produced, each element (e.g., note, chord, rest, measure, etc.) in the structured music data 112 is given the semantic representation (embedding) from the global vector space. Element embeddings are averaged to create part embeddings 534A and part embeddings 534A are averaged to create a score embedding 536A. The part embeddings 534A and the score embeddings 536A are compared for semantic similarity at 538A as described in detail below.

Figure 5B:
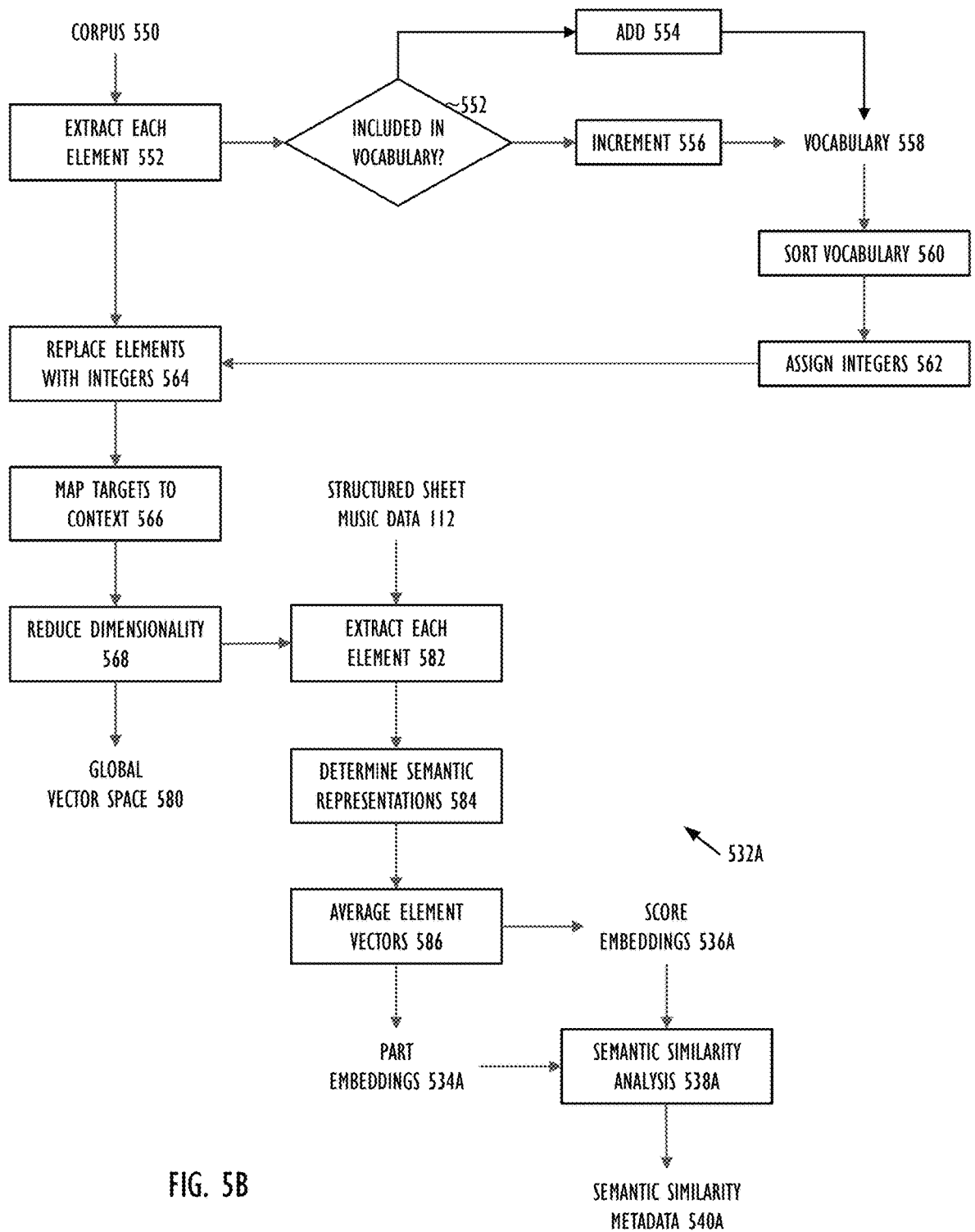
FIG. 5B is a flowchart illustrating a semantic embedding process and a semantic similarity analysis process according to an exemplary embodiment of the present invention.

FIG. 5B is a flowchart illustrating the semantic embedding 532A and semantic similarity analysis 538A in detail.

As shown in in FIG. 5B, a large corpus 550 of structured music documents (e.g., MusicXML documents) is used to create a global vector space 560. For example, each element (e.g., note, chord, rest, measure, etc.) is extracted at 552 and added to a vocabulary 558 at 554. If the extracted element is already included in the vocabulary (552: Yes), the count of that element is incremented at 556. Different embodiments may make different determinations regarding equivalent elements. For example, one embodiment may be programmed such that an "A4 quarter" is equivalent to an "A4 quarter staccato". Other embodiments may be programmed such that those elements are distinct. After all of the elements in the corpus 550 have been added to the vocabulary 558, the vocabulary 558 is sorted from the most common element to the least common element at 560. (In some embodiments, the number of elements included in the vocabulary 558 may be trimmed to include only the N most common elements.) Each element in the vocabulary 558 is then assigned a unique integer at 562. (The integer assignments can be random, for example the position of the element within the sorted vocabulary 558.)

The elements extracted from the corpus 550 are then replaced with the integers at 564. (If an extracted element is no longer in trimmed vocabulary 558, the extracted element may be replaced with a special integer value specifying "unknown".) Each document in the corpus 550 is then represented by a set of integers.

A neural network is then used to map targets and context at 566. In one embodiment, an element (target) may be fed to a skip-gram model, which is used to predict the elements around it (context). In other words, the skip-gram model may be used to predict the context of a given element. In another embodiment, the elements around a target element may be fed to a continuous bag of words (CBOW) model, which is used to predict the target element. In other words, CBOW model may be used to predict an element in a given context. In yet another embodiment, a next word algorithm is given an element (context) and trained to predict the next element (target). Accordingly, the neural network (e.g., skip-gram model, CBOW model, etc.) is trained to map the target to the context or vice versa. The input to the neural network is a combination of the integer values, defined in the vocabulary, for each element. (The vectors may be added or stacked, depending on representation.) The output is also the integers defined in the vocabulary. Consider an example from natural language processing: the phrase "the black cat slept on" is defined by the vocabulary shown in Table 5:

TABLE 5

| Word | Index |
|---|---|
| Black | 789 |
| Cat | 342 |

TABLE 5-continued

| Word | Index |
|---|---|
| On | 48 |
| Slept | 1208 |
| The | 2 |

If "cat" is the target, then [2, 789, 1208, 48] (The black slept on) is input to a CBOW model, which outputs [342] (Cat). Alternatively, using a skip-gram model, the input and output are reversed such that [342] (Cat) is input and [2, 789, 1208, 48] (The black slept on) is output by the skip-gram model.

Dimensionality of the vocabulary 558 is reduced at 568. Any dimensionality may be used. However, the target dimensionality is typically much lower than the number of items in the vocabulary 558. For example, for a vocabulary of 10,000 elements, a target dimensionality of 300 may be used.

Figure 5C:
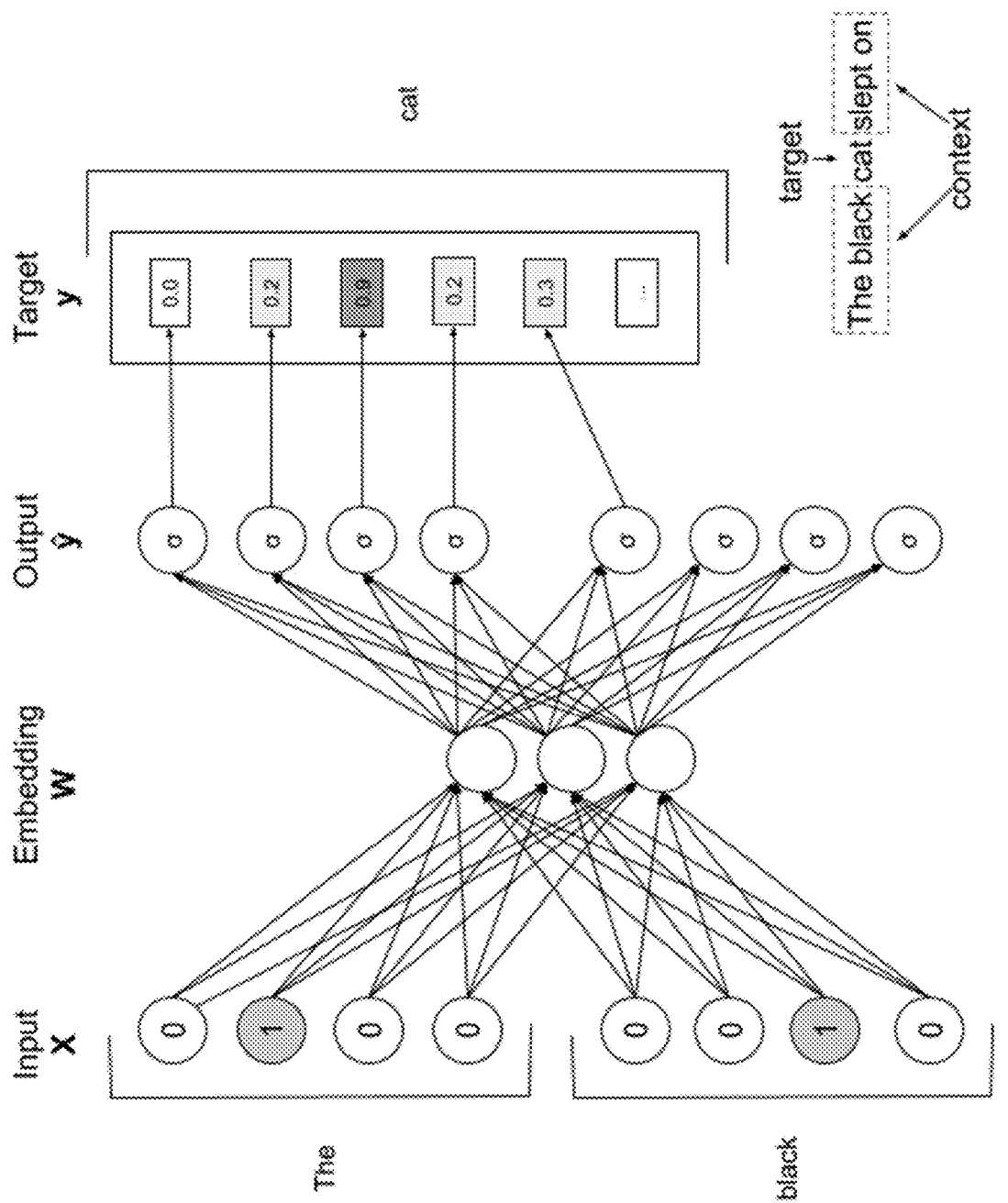
FIG. 5C is a diagram illustrating a context encoder (ConEc) NN architecture corresponding to a continuous bag of words (CBOW) Word2Vec model.
Figure 5D:
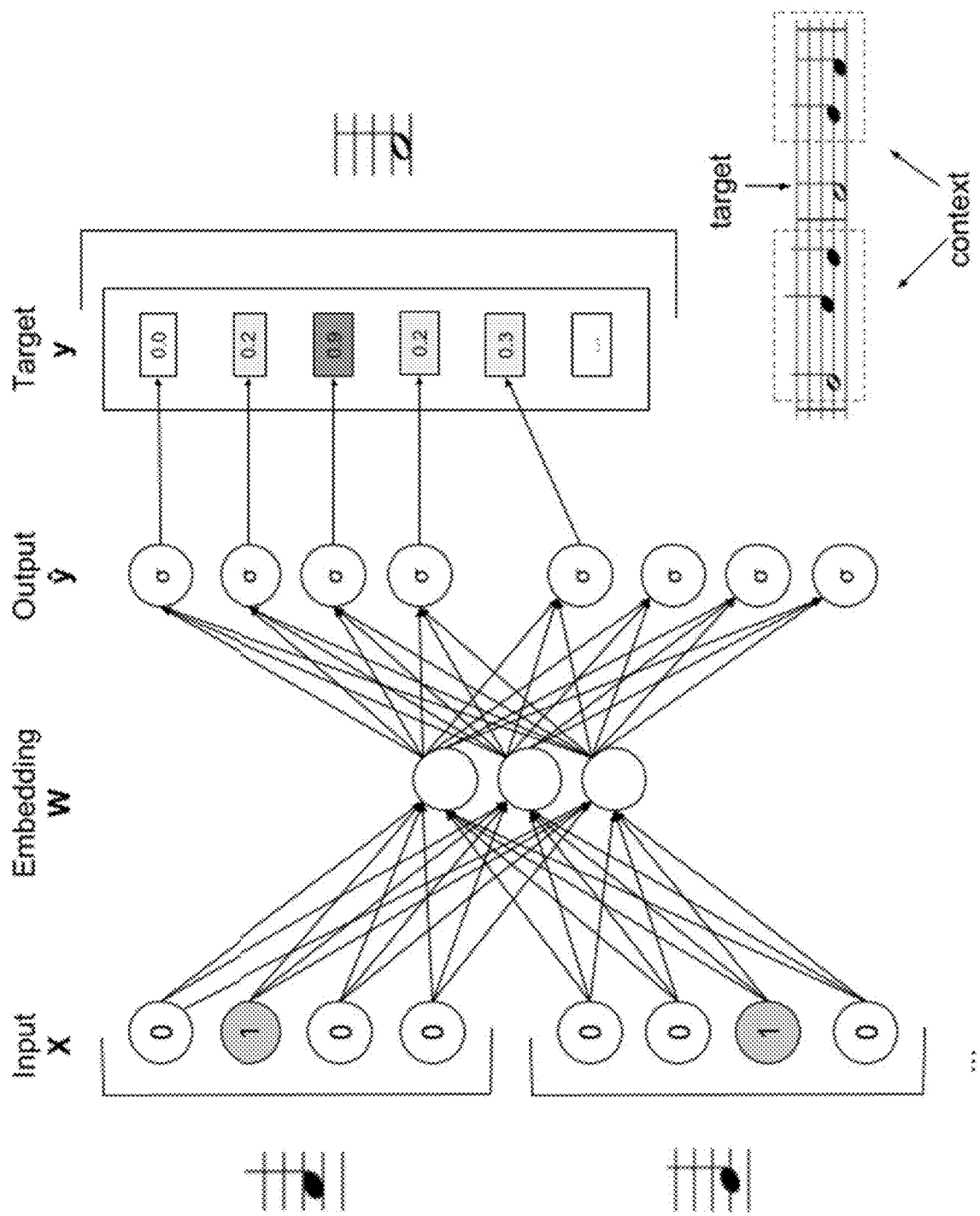
FIG. 5D is a diagram illustrating a similar model trained to identify a musical element in context to an exemplary embodiment of the present invention.
Figure 5E:
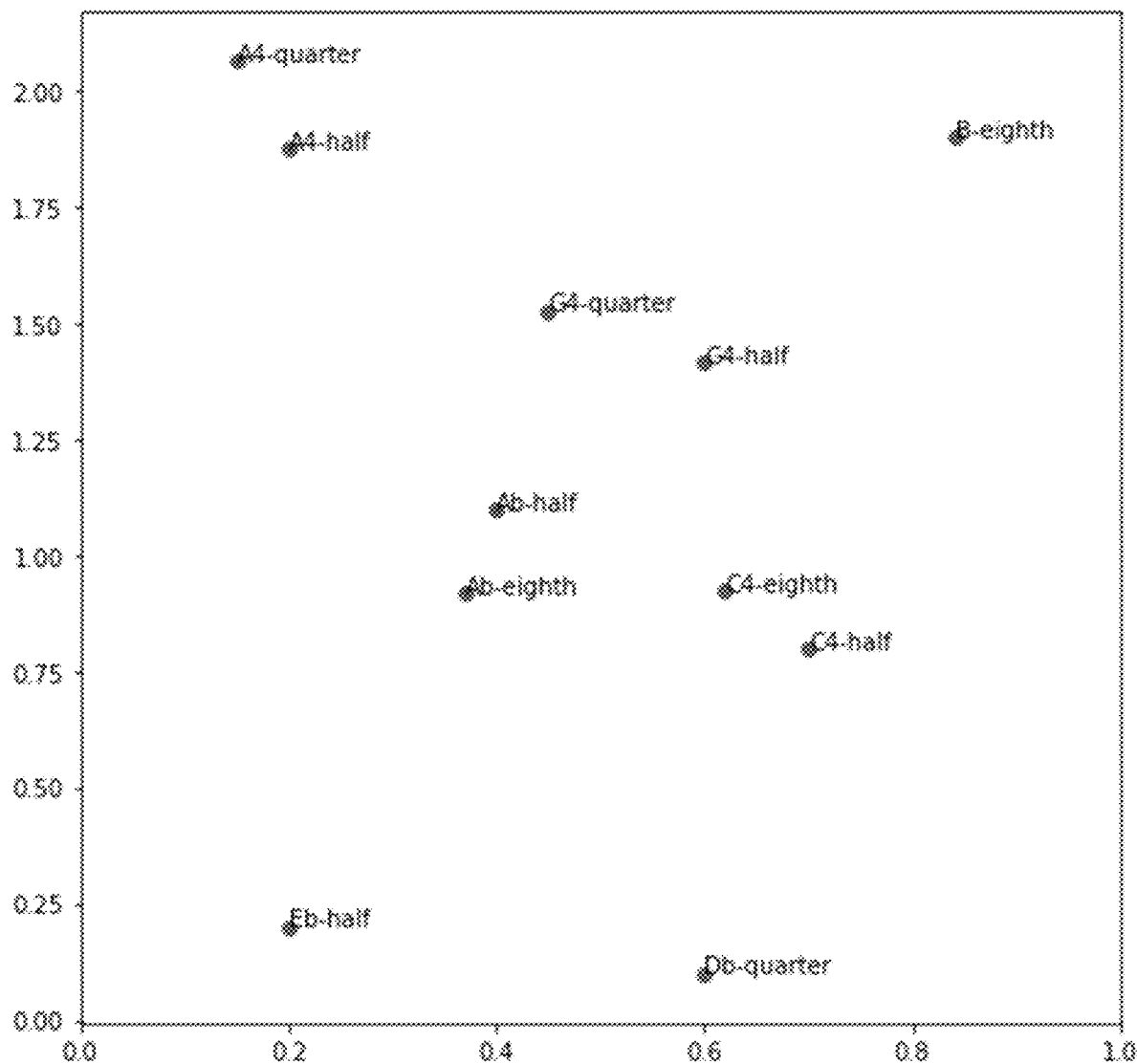
FIG. 5E is a graph illustrating an example global vector space projected down to two dimensions according to an exemplary embodiment of the present invention.

After the neural network is trained, a weight matrix is extracted where each row (or column) of the weight matrix corresponds to each element in the vocabulary 558. These are called the embeddings. Collectively, these vocabulary embeddings form the global vector space 560 that represents the data in the corpus 550. Using the natural language processing example above, FIG. 5C is a diagram illustrating a context encoder (ConEc) NN architecture corresponding to a CBOW Word2Vec model. FIG. 5D is a diagram illustrating a similar model trained to predict a target musical element from the context. In the global vector space 560, each element is represented by a vector. Because similar elements appear in similar contexts in the corpus 550, the neural network clusters similar elements. In other words, the semantic similarity of the elements is proportional to the distance between those elements in the global vector space 560. Accordingly, semantically meaningful contextual information is encoded in each vector. FIG. 5E is a graph showing an example global vector space 560 projected down to two dimensions. For example, "A4-half" and "A4-quarter" are very close to each other (because both represent the pitch A4 with different durations).

Referring back to FIG. 5B, the global vector space 560 described above is used analyze the structured sheet music data 112 to generate part embeddings 534A and score embeddings 536A. Each element (e.g., note, chord, rest, measure, etc.) is extracted from the structured sheet music data 112 at 562. For each extracted element, the semantic representation (vector) of each element is identified at 564 by looking it up in the global vector space 560. For example, if an "A4 quarter" has been mapped in the global vector space 560 to [0.4, 0.99, 0.05], then any "A4 quarter" in any document in the structured sheet music data 112 is replaced with that vector. Element vectors are averaged at 566. For example, note vectors within each measure are averaged to create a measure vector. Measure vectors with each part are averaged to create a part embedding 534A for that part. Part embeddings 534A within each score are averaged to create a score embedding 536A for that score.

Similar items (e.g., elements, measures, parts, scores, etc.) are identified by comparing the vectors representing each item at 538A. Vectors may be compared using a distance function (metric), such as the L2-norm (Euclidean distance) or cosine similarity. Vectors that are "close" (e.g., separated by a small distance in the global vector space 560) are labeled as semantically related, and vectors that are far apart (e.g., separated by a large distance in the global vector space 560) are labeled as semantically unrelated. Semantically related items may be grouped together using another machine learning algorithm, such as k-means clustering, support vector machines (SVMs), or another neural network.

For example, consider the musical excerpt shown in FIG. 21B.

Each note is added to the vocabulary 558 shown in Table 6, where C4 is middle C:

TABLE 6

| Index | Vocabulary Item | Frequency Count |
|---|---|---|
| 1 | C4-quarter | 2 |
| 2 | D4-quarter | 2 |
| 3 | E4-quarter | 2 |
| 4 | F4-quarter | 3 |
| 5 | G4-half | 2 |
| 6 | A4-quarter | 6 |
| 7 | G4-quarter | 6 |
| 8 | F4-half | 1 |
| 9 | E4-half | 1 |
| 10 | D4-half | 1 |
| 11 | A4-half | 2 |
| 12 | B4-half | 2 |
| 13 | B4-quarter | 3 |
| 14 | C5-whole | 2 |
| 15 | D5-half | 1 |
| 16 | C5-half | 2 |
| 17 | A4-eighth | 5 |
| 18 | B4-eighth | 1 |
| 19 | G4-eighth | 4 |
| 20 | B4-dotted-quarter | 1 |
| 21 | C5-eighth | 1 |
| 22 | B4-dotted-half | 1 |
| 23 | F4-eighth | 1 |
| 24 | G4-dotted-quarter | 1 |

(The vocabulary 558 shown in Table 6 may be sorted by frequency and all but the N most frequently occurring entries may be kept. Entries that are removed would be replaced with a single symbol "UNK" (unknown). In this example, that step is omitted.) Each note is represented by the index from the vocabulary 558 as shown in FIG. 21C.

In this example, the indexes above are converted to one-hot vectors, which are fed into the neural network. (One-hot vectors are used in this example because every component of the vector is only either a one or a zero, the target probability can be interpreted as 0 percent or 100 precent, cross-entropy loss can be used to train the network, and all of the one-hot vectors are mutually orthogonal.) To convert an index value x to a one-hot vector, a vector of all zeros is created and then the number at position x is changed to 1. For example, the one-hot vector for index value 1 is [1, 0, 0, 0, . . . ], the one-hot vector for index value 2 is [0, 1, 0, 0, . . . ], the one-hot vector for index value 2 is [0, 0, 1, 0, . . . ], etc.

To create the training data in this example, a next word algorithm is given the current element and used to predict the next element. Here are some example pairs (where the second item comes after the first):

['C4-quarter', 'D4-quarter']

['C4-quarter', 'E4-quarter']

['D4-quarter', 'C4-quarter']

To create the training data, the first element in the pair is added to set X and the expected output of the pair is added to the set y.

Because the purpose of this process is to reduce dimensionality and find compact representations, an embedding size less than the size of the vocabulary (24 elements) is selected. In this instance, an embedding size of 5 is selected. A neural network is created:

$$y = \text{softmax}[g_2(W_2 * g_1(W_1 * x + b_1) + b_2]$$

where W elements are weight matrices, b elements are biases that provide an additive factor to the model, and g are non-linear functions such as a tan h, sigmoid, or ReLU, known as an activation function, that models non-linear relationships between the inputs and outputs.

The softmax function is a standard mathematical function that normalizes a value to a probability.

$$P(y=j|x) = \frac{e^{x^T w_j}}{\sum_{k=1}^{K} e^{x^T w_k}}$$

The softmax function computes the probability that y belongs to class j given input vector x by computing the exponent of $x*w_j$ (the input to the activation function) over the sum of all the exponents $x*w_k$ for all K distinct classes. By using the softmax function, we guarantee the range of the output values to be between 0 and 1 inclusive. The output from the softmax is compared to the one-hot of the expected output. The cross-entropy loss function is used to determine the difference between the output and the expected value. This difference (the loss) is then backpropagated through the network to adjust the weight matrices and biases. The cross-entropy loss function is:

$$-[y \log(p) + (1-y)\log(1-p)]$$

where p is the actual output and y is the expected output.

The model is updated using gradient descent, an optimization algorithm that numerically tries to find the minimum of a function. The function in this case is the neural network itself. The neural network is then trained for several iterations. The inner matrix $W_1$ now holds the embedding vectors. This is called the embedding matrix. The column is the index of the vocabulary item, and the row is the 5-dimensional embedding vector (or the column is the vector and the row is the index). An example 5-dimensional embedding vector, derived in the process is above, is shown below:
[0.53852046 −0.15422869 2.3443408 −0.02002307 −0.11357132]

Because similar items appear in similar contexts in the data, the process described above causes similar items to cluster together in the 5-dimensional space. Accordingly, the embedding vectors encode contextual information and the vector shown above represents a semantically meaningful encoding. An example plot projected down to 2 dimensions is shown in FIG. 5E. The semantic similarity between two vectors can then be determined by measuring their distance from each other in the domain space. Two example vectors and the Euclidean distance (L2 norm) computed between them are shown below:
[−6.81328893e−01 1.76126170e+00 1.10498583e+00 1.66290998e−03 −3.98039997e−01]
[2.12125826 0.02730192 0.66247171 0.16639504− 0.38257411] 3.32931

These two embeddings are "3.32" units apart from each other, which represents the relative proximity of those vectors. A smaller distance implies a stronger semantic relationship among the vectors.

The semantic similarity metadata 540A from semantic similarity analysis 538A may include the outputs described in Table 7:

TABLE 7

| Output | Description |
|---|---|
| Similar Measures Within Part | For each part, identify similar measures within the part. Similar measures may then be further analyzed to determine features such as repeated measures, ostinatos, and form. |
| Similar Measures Across Parts | For each measure, identify similar measures within any other part. Measures that are similar but occur in different parts suggest that either the parts are coupled/doubled, or that the parts may be interchanged (e.g. substitute a trombone for a bassoon). |
| Similar Parts | For each part, identify any other part that is similar. Similar parts may then be used to identify coupled/doubled parts or parts that are interchangeable. |
| Similar Documents | Compare this document to all other documents in the database and assign a similarity score to them. Pre-computing and then indexing these similarity scores improves performance of searching for similar documents. |

As described above, embedding vectors for each part allow individual part embeddings 534A to be compared within the same structured sheet music data 112 or against other structured sheet music data 112. For example, where a music director finds a clarinetist performs a certain clarinet part extremely well, the music director may search for similar clarinet parts by having a computer search for other pieces of music that contain semantically similar clarinet parts (i.e., the distance between the embeddings is minimized). The computer will then be able to rank all clarinet parts in order of closeness to the original part. Similarly, a separate score embedding 536A allows compositions to be holistically compared. For example, where a choir director finds the choir enjoys a particular composition, the search engine 190 provides functionality for a choir director to search for semantically similar compositions. The sheet music search and discovery system 100 compares the score embeddings 536A as described above and the search engine 190 returns search results ranked by semantic similarity.

Additionally, the part embeddings 534A and the score embeddings 536A may be used in the machine learning analysis 528 described above, for example to predict the difficulty of each part and score.

Referring back to FIG. 5A, phrase extraction 542 is a process for identifying smaller musical passages known as phrases from a larger musical selection. A phrase 544 may be identified using rules derived from music theory, heuristics, analysis of individual measures obtained via rules analysis 524, machine learning analysis 528, or both, etc. Once phrases 544 are extracted, phrase analysis 546 may be used to generate phrase descriptions 548 that describe each phrase using keywords or sentences which in turn may be stored in a database to augment the data available for querying. An example input to phrase extraction 542 is shown in FIG. 21D and example phrase descriptions 548 are described in Table 8:

TABLE 8

Figure 21D:
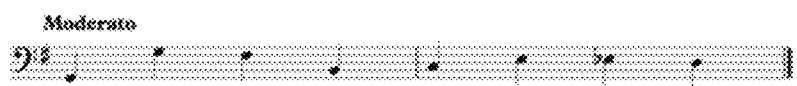
FIG. 21D is an example input to phrase extraction.

| Music | Output |
|---|---|
| See FIG. 21D | G major, walking bass, moderate tempo, blue notes |

The phrase description 548 may be generated using sequence labeling. Sequence labeling is similar to the machine learning task of image captioning. In some embodiments, the sequence labeling may be performed by two neural networks trained together to understand structured music documents. This model is known as neural machine translation (NMT). The first neural network is called the encoder and transforms each input phrase into a numerical representation. The second neural network is called the decoder and transforms the numerical representation into output text, such as keywords describing the phrase. The two neural networks of the NMT model are trained used parallel corpora. The input to the training algorithm includes a set of passages and a separate set of descriptive texts such that each passage is described by one or more corresponding descriptive texts. An example of parallel corpora for use in training the two neural networks is shown in FIGS. 21E and 21F and described in Table 9:

TABLE 9

Figure 21E:
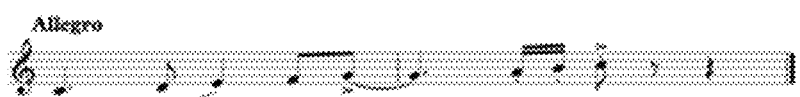
FIGS. 21E and 21F are an example of parallel corpora.
Figure 21F:
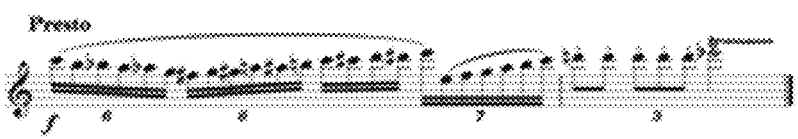

| Music | Description |
|---|---|
| See FIG. 21E | C major scale, ascending, fast, syncopated |
| See FIG. 21F | Very fast, chromatic, tuplets, trill, very high |

Lyrics extraction 550 is a process for extracting lyrics 552 from preprocessed structured sheet music data 112 in order to generate semantic similarity metadata 540B pertaining to the lyrics 552. Certain elements of lyrical metadata, such as the number of verses, may be obtained directly from the preprocessed structured sheet music data while other lyrical metadata must be inferred. Lyrics extraction 550 is described further in FIG. 9. When the lyrics 552 appear in structured sheet music data 112, those lyrics 552 are fragmented at syllable boundaries. The lyrics extraction process 550 combines those syllables to form words. For example, "to night" is combined to form "tonight" and "el-e-va-tion" is combined to form "elevation." The lyrics extraction process 550 also parses out verses. A single note may be associated with text from the first verse and the second verse. The lyrics extraction process 550 puts this all together into a single document so that all of verse 1 is together, all of verse 2 is together, etc.

The lyrics 552 are input to semantic embedding 532B and semantic similarity analysis 538B. The semantic embedding 532B and semantic similarity analysis 538B are similar processes performed on text data (the lyrics 552) as the semantic embedding 532A and semantic similarity analysis 538A performed on musical data (the part embeddings 534A and 536A) described above. Recall that semantic embedding 532A and 532B create numerical representation (embedding) of data within a vector space by analyzing it within a larger context. The semantic embedding 532B similarly processes each word, phrase, verse, etc. within the extracted lyrics 552, adds each unique element to a list, and assigns each unique element a unique value. The list of unique elements (i.e., "vocabulary"), along with frequency, context, etc., are input to an algorithm, neural network, etc., to create a probabilistic model that a set of elements occur together.

Semantic similarity analysis 538B is performed to generate semantic similarity metadata 540B. An embedding vector for each part allows different individual parts to be compared within the same structured sheet music data 112 or against other structured sheet music data 112. For example, where a choir has enjoyed the theme and language of a particular piece of choral music, the choir director may search for other choral works with similar themes and language. Note that harmonic and lyric similarity are independent and a user may search for music based on either. Semantic similarity metadata 540B from semantic similarity analysis 538B may include the outputs described above in Table 7.

Figure 6:
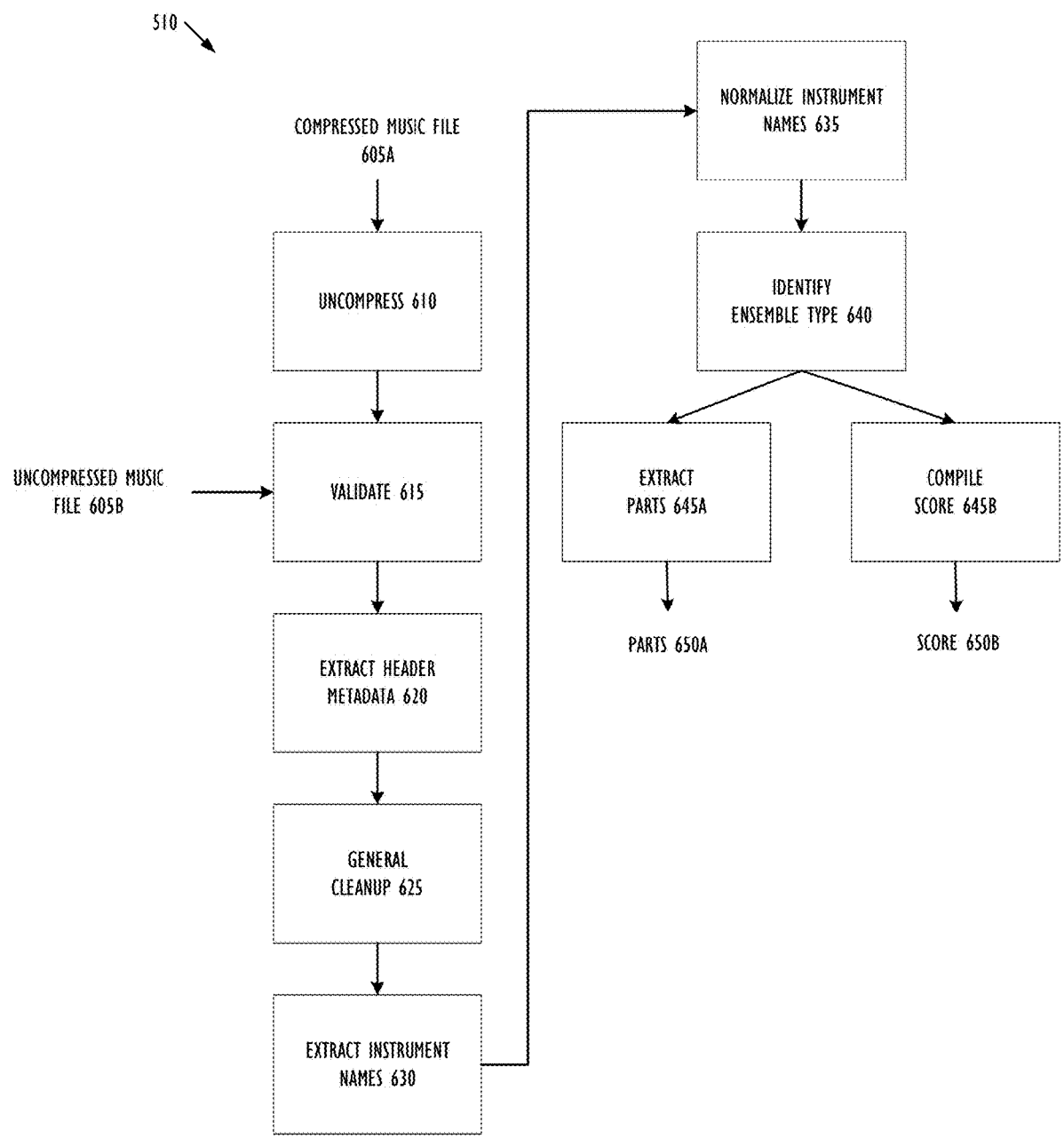
FIG. 6 is a flowchart illustrating a preprocessing technique according to an exemplary embodiment of the present invention.

FIG. 6 is a flowchart illustrating the preprocessing 510 performed by the SMAE 140 according to an exemplary embodiment of the present invention.

As discussed above, structured sheet music data 112 is preprocessed to normalize the data into a consistent format before analysis, allowing music from different publishers, different notation structures, etc. to be analyzed using the same process. Structured sheet music data 112 may be compressed music file 605A or uncompressed music file 605B. Compressed music files 605A are uncompressed at 610. Both uncompressed music files 605B and newly uncompressed music files 605B are validated at 615. The files are validated using a predefined schema for the given format. For example, the MusicXML schema are available in Document Type Definition (DTD) and XML Schema Definition (XSD) formats, and validation is performed by a standard XML validator. If the music file is invalid, an error is generated and preprocessing technique 510 is halted until the invalid music file is corrected. If the music file is valid, header metadata is extracted at 620. Header metadata may include the fields described in Table 10:

TABLE 10

Header Metadata Fields

Document Format and Version
Work Title
Work Number
Movement Title
Movement Number
Composer
Arranger
Lyricist
Copyright
Encoding Software Header metadata may be used to inform the rules analysis process 524 and machine learning process 528 by adjusting the weight of certain features. For example, a known arranger may be considered "easier," so music files arranged by this arranger may be weighted less (multiplicative factor <1). Similarly, a known arranger may be considered "difficult," so music files arranged by this arranger may be weighted more (multiplicative factor >1). These relative weights may be stored in and retrieved from a lookup table. If no corresponding entry is found, the music file is not weighted (multiplicative factor=–1). The publisher of the music file may also be extracted, usually from the copyright field, in order to optimize the performance of the rules analysis 524 and machine learning analysis 528 according to any common patterns or peculiarities specific to the particular publisher, known as "house style." The publisher name informs other features, so it is advantageous to extract the publisher name early in the feature extraction process. Other features may be extracted at any time because they do not influence later extracted features. The music file undergoes general cleanup at 625 to remove information useful for visual display but not useful for semantic analysis, such as color. Additionally, any specific encoding errors or conventions dependent on the software used to produce the encoding are corrected at 625. The instrument names are extracted from the music file at 630. The instrument names are normalized at 635. Instrument names are converted into their base instrument names in a process that may be similar to stemming in computational linguistics. For example, instrument names Trumpet 1, Trumpet II, $2^{nd}$ Trumpet, 4 Trumpets, and Trumpet in C would be converted to the base instrument name Trumpet. If more than one instrument name appears on a given part, separated by a space, new line, slash, etc. or there is a "change instrument" instruction within the part, the part is marked as having multiple instruments. This informs extraction of parts at 645A. If an instrument name appears in a language other than English, a lookup table may be used to translate the instrument name into English. For example, the German equivalent of "$2^{nd}$ Flute" ("2. Flöte") is normalized to "Flute." An instrument that cannot be identified is designated as "unknown." After the instrument names are normalized, the instruments are identified with a standard sound. In addition, a max polyphony property describing the number of pitches the instrument can play simultaneously is assigned to each instrument through the use of a lookup table. For example, a clarinet has a max polyphony of one, a guitar has a max polyphony of six, and a piano has a max polyphony of eighty-eight. This information is used in extraction of parts 645A as well as the analysis described herein. Once the instrument names are normalized at 635, the ensemble type is identified at 640. The normalized instrument names are compared to a lookup table of predefined ensemble types and a percent match found. The percent match may be found using Jaccard similarity or other similarity metrics. The type of ensemble is then identified based on the percent match. For example, a string quartet must be an exact match while a marching band may vary in instrumentation. Information about the ensemble type can be used to further clean up the score, as well as provide additional information used in the analysis described herein. If the ensemble type cannot be identified, the ensemble type is left empty. Last, either parts are extracted at 645A or a score is compiled at 645B depending on the input music file. If the input music file includes a score, individual parts are extracted at 645A. If the input music file includes only individual parts, a score is compiled at 645B. Extraction of individual parts 650A generates a separate output for each part or voice. A part usually corresponds to a single instrument while a voice is a subdivision of instruments occurring within the same part. For example, a part labelled "2 Trumpets" may have two voices because the two trumpets may play different notes at the same time. In this case, the parts extracted at 645A may be labeled "2 Trumpets A" and "2 Trumpets B." Where the input music file includes only individual parts, a score 650B is compiled into a single file to be used in conjunction with the parts files during analysis. Each instrument in the compiled score 650B consists of only one voice.

Figure 7:
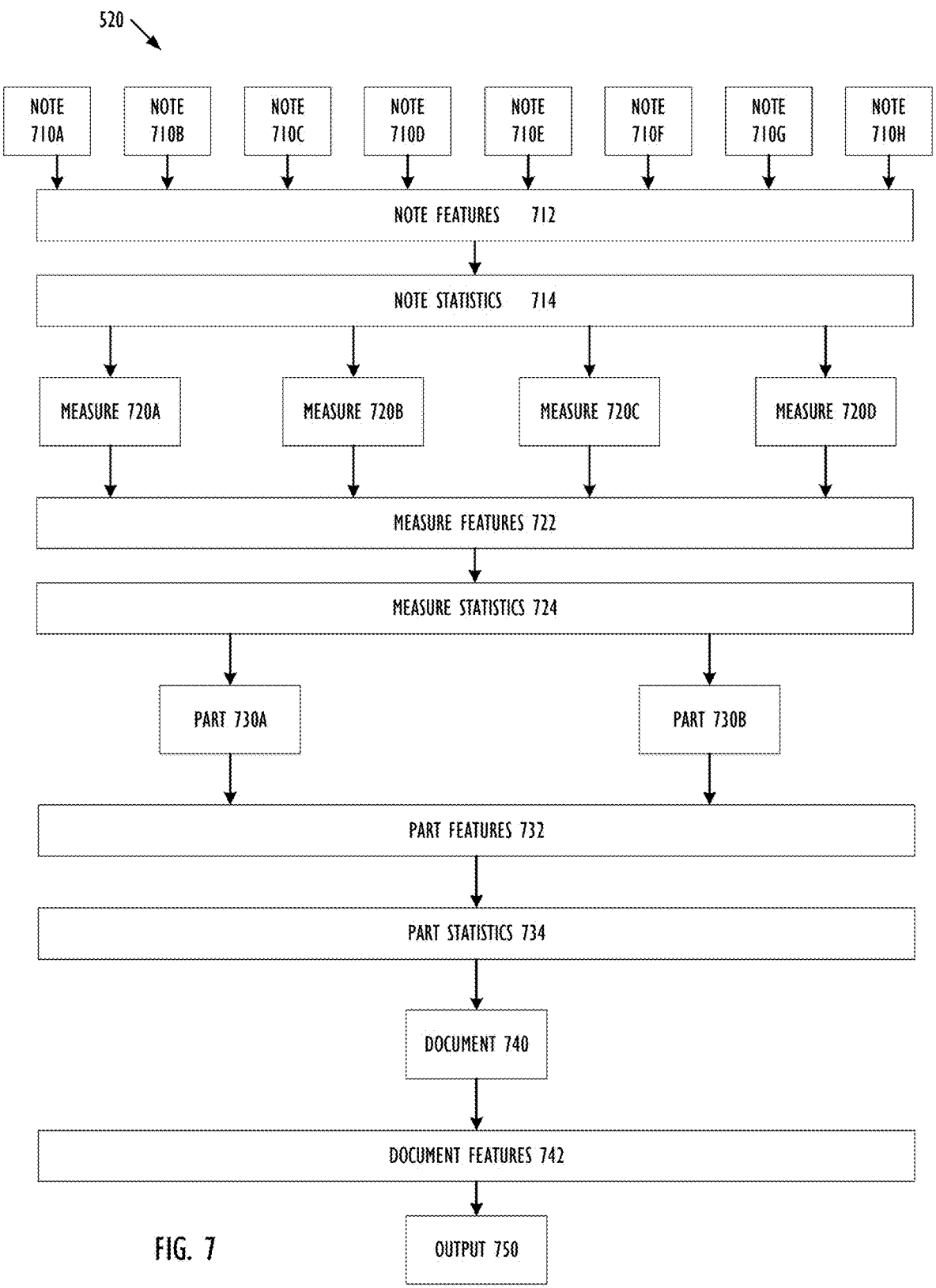
FIG. 7 is a flowchart illustrating a feature extraction technique according to an exemplary embodiment of the present invention.

FIG. 7 is a flowchart illustrating the feature extraction process 520 performed by the SMAE 140 according to an exemplary embodiment of the present invention.

The feature extraction process 520 analyzes the preprocessed structured music data 112 and returns features 522 that are then used during the rules analysis process 524 and machine learning process 528. Features 522 extracted include relevant musical data, statistical features such as the average number of notes in a measure, and features derived from lookup tables. Lookup tables return simple semantic features which may be input for more complex rules analysis 524 and machine learning analysis 528. In one embodiment, a lookup table may associate a time signature to a measure of difficulty. For example, a 4/4 time signature may be labeled as easy while a 17/32 time signature may be labeled as difficult. The time signatures and associated difficulty levels may be used during the rules analysis 524 and machine learning analysis 528, which may change the difficulty level. For example, a music file with frequent time signature changes may be considered difficult even though each individual time signature is associated with an easy difficulty level. Feature extraction is a bottom up process: features are first extracted from individual notes 710A-710H, then from measures 720A-720D, then from parts 730A-730B, and lastly from document 740. Note features 712 include features and subfeatures described in Table 11:

TABLE 11

| Feature | Sub-Feature | Data Type |
|---|---|---|
| Pitch | | |
| | Pitch Step/Pitch Class | Alphanumeric (A - G) |
| | Octave | Integer |
| | Alteration (sharp, flat, natural) | Floating point (to support microtones) |
| Unpitched | | Boolean |
| Duration | | Alphanumeric (Whole, Half, Quarter, 16$^{th}$ etc.) |
| Rest | | Boolean |
| Augmentation Dots | | Integer |
| Accidental | | |
| | Accidental Type | Alphabetic (Sharp, Natural, Flat, Double Sharp, etc.) |
| | Cautionary | Boolean |
| Part of a Chord | | Boolean |
| Articulation | | |
| | Accent | Boolean |
| | Detached Legato | Boolean |
| | Doit | Boolean |
| | Falloff | Boolean |
| | Plop | Boolean |
| | Scoop | Boolean |
| | Spiccato | Boolean |
| | Staccatissimo | Boolean |
| | Staccato | Boolean |
| | Strong Accent | Boolean |
| | Tenuto | Boolean |
| Ornament | | |
| | Delayed Inverted Turn | Boolean |
| | Delayed Turn | Boolean |
| | Inverted Mordent | Boolean |
| | Inverted Turn | Boolean |
| | Mordent | Boolean |
| | Shake | Boolean |
| | Tremolo | Integer |
| | Trill | Boolean |
| | Turn | Boolean |
| | Vertical Turn | Boolean |
| | Wavy Line | Boolean |
| Technique | | |
| | Bend | (See following) |
| | Bend-Semitones | Floating Point |
| | Bend-Prebend | Boolean |
| | Bend-Release | Boolean |
| | Bend-With Bar | Boolean |
| | Double Tongue | Boolean |
| | Down Bow | Boolean |
| | Fingering | Array of Integers |
| | Fingernails | Boolean |
| | Fret | Integer |
| | Hammer On | Boolean |
| | Pull Off | Boolean |
| | Handbell | (See following) |
| | Handbell-Damp | Boolean |
| | Handbell-Echo | Boolean |
| | Handbell-Gyro | Boolean |
| | Handbell-Hand Martellato | Boolean |
| | Handbell-Mallet Lift | Boolean |
| | Handbell-Mallet Table | Boolean |
| | Handbell-Martellato | Boolean |
| | Handbell-Martellato Lift | Boolean |
| | Handbell-Muted Martellato | Boolean |
| | Handbell-Pluck Lift | Boolean |
| | Handbell-Swing | Boolean |
| | Harmonic | (See Following) |
| | Harmonic-Artificial | Boolean |
| | Harmonic-Natural | Boolean |
| | Harmonic-Base Pitch | Pitch type (see above) |
| | Harmonic-Sounding Pitch | Pitch type (see above) |
| | Harmonic-Touching Pitch | Pitch type (see above) |
| | Heel | Boolean |
| | Hole | Alphabetic (one of: closed, open, half-open) |
| | Open String | Boolean |
| | Pluck | Alphabetic (one of: p, i, m, a) |
| | Snap Pizzicato | Boolean |
| | Stopped | Boolean |
| | String | Integer |
| | Tap | Boolean |
| | Thumb Position | Boolean |
| | Toe | Boolean |
| | Triple Tongue | Boolean |
| | Up Bow | Boolean |
| Arpeggio | | |
| | Part of Arpeggio | Boolean |
| | Non-Arpeggio- This is a technique specific to instruments that are normally played arpeggio (e.g., a harp) to specifically not play using an arpeggio. | Boolean |
| Cue | | Boolean |
| Dynamics | | Alphabetic |
| Fermata | | |
| | Normal | Boolean |
| | Angled | Boolean |
| | Square | Boolean |
| Glissando | | Alphabetic (one of: start, stop) |
| Grace | | Boolean |
| Grace-Slash | | Boolean |
| Tie | | Alphabetic (one of: start, stop, continue) |
| Slur | | Alphabetic (one of: start, stop, continue) |
| Tuplet | | |
| | Ratio Numerator | Integer |
| | Ratio Denominator | Integer |
| | Duration | Alphanumeric (see above) |

Note features 712 may be used to determine note statistics 714. Note statistics 714 may include features described in Table 12:

TABLE 12

| Feature | Description |
|---|---|
| Pitch Range | The lowest pitch and the highest pitch within the voice. |
| Pitch Histogram | A frequency distribution of all of the pitches within the voice. |
| Tessitura | The range of all pitches within the first standard deviation of the mean pitch within the voice (known as "a truncated |

TABLE 12-continued

| Feature | Description |
|---|---|
| | distribution"). This serves as an indicator of what notes commonly occur. A range includes the extremes, while the tessitura excludes the extremes and focuses on notes near the mean. |
| Polyphony per voice | The number of notes sounding simultaneously within the voice. This is used to find multiple stops or implicit divisi within a voice. Multiple stops are a technique for performing multiple simultaneous pitches on bowed instruments. |
| Duration Type Frequency | A frequency distribution of all the duration types within the voice. Example: 2 quarter notes, 3 eighth notes, 2 $16^{th}$ notes, etc. |
| Number of Onsets | Count of notes that are neither rests nor the continuation or end of a tie within the voice across all measures. |
| Average Number of Onsets Per Measure | The Number of Onsets divided by the number of measures. |
| Note n-grams | N-grams of all notes within a voice. N-grams can cross barlines. |
| Repeated Identical Notes Within Measure | Find any repeated notes (same pitch and duration) within the voice. This is useful for finding ostinatos. |

Once the note features 712 and note statistics 714 are extracted from notes 710A-710H, measure features 722 are extracted from measures 720A-720D. Measure features 722 may include features described in Table 13:

TABLE 13

| Feature | Data Type | Description |
|---|---|---|
| Clefs | Associative Array of Clef type and count | |
| Time Signature | Alphanumeric tuple (Numerator, Denominator) | |
| Key Signature | Alphanumeric | |
| Number of Voices | Integer | Number of unique voices in this measure |
| Starts Repeat | Boolean | |
| Ends Repeat | Boolean | |
| Repeated Measure | Boolean | Indicates that this measure is identical or very nearly identical to the previous measure |
| Begins Ending | Boolean | |
| Continues Ending | Boolean | This measure is part of an ending but neither starts nor ends it |
| Ends Ending | Boolean | |
| Begins Coda | Boolean | The first measure in a coda |
| Jump to Coda | Boolean | This measure includes the instruction "To Coda" |
| Da Capo | Boolean | This measure includes the instruction "Da Capo" or "D.C.", directing the player to go to the first measure of the composition |
| Segno | Boolean | This measure includes a segno glyph, indicating a jump back point in the composition |
| Dal Segno | Boolean | Indicates that this measure includes the instruction "Dal Segno" or "D.S.", directing the player to go back to the segno earlier in the composition |
| Whole Measure Rest | Boolean | Indicates that this measure contains a whole measure rest in voice 1 and all other voices are either a) whole measure rests or b) cue notes. |

TABLE 13-continued

| Feature | Data Type | Description |
|---|---|---|
| Part of a Multi-measure Rest | Boolean | Indicates that this measure is part of a multi-measure rest (i.e. the measure(s) before and/or after it are whole measure rests according to the criteria above) |
| Tuning Change | Boolean | Indicates that this measure includes a tuning change, scordatura, or capo |
| Cross Staff Beaming | Boolean | Indicates that this measure uses cross staff beaming that appears on parts that use a grand staff. |

Once measure features 722 are extracted, measure statistics 724 are extracted. Measure statistics 724 include features described in Table 14:

TABLE 14

| Feature | Description |
|---|---|
| Measure n-grams | N-grams of all measures within a part |
| Repeated Measures | Find all passages of repeated measures, either explicitly marked (repeat measure mark, single measure repeat/vamp) or implicit (identical content) |

Once measure statistics 724 are extracted, part features 732 are extracted from parts 730A-730B. As described previously, parts 730A-730B generally correspond to a single instrument, although may refer to more than one instrument if the parts are doubled, for example where a flute and an oboe play the same part, or if the performer changes instruments within the same part, such as where a flute player switches to a piccolo. Part features 732 include the features described in Table 15:

TABLE 15

| Feature | Data Type | Description |
|---|---|---|
| Instrument Name(s) | Alphanumeric | |
| Number of Staves | Integer | Number of staves for this part (1, 2, or 3) |

Once part features 732 are extracted, part statistics 734 are extracted. Part statistics 734 may be extracted from individual parts or a collection of parts and include the features described in Table 16:

TABLE 16

| Feature | Description |
|---|---|
| Chord Progression | Determine the large-scale chord progression of the overall composition. In this case, all parts must first be transposed to the sounding key. Next, a harmonic reduction is performed, from which the chord progression is estimated using a sequence model such as a hidden Markov model, chord n-grams, or Word2Vec-style chord embeddings. This output is then filtered to remove uncommon or infrequently occurring chords. After the chord progression has been extracted, a further analysis is used to compare the overall chord progression to common harmonic patterns, such as 12-bar blues or rhythm changes. This analysis uses |

TABLE 16-continued

| Feature | Description |
| --- | --- |
| | chord n-grams to find repeated patterns and then measure the similarity to known chord progressions using Jaccard similarity or other similarity metric. |
| Part Doubling | All parts are compared across all measures to find doubled parts. All parts must first be transposed to the sounding key. Next, parts are compared to other parts with similar ranges or to known common doubles to find doublings. For example, Piccolo frequently doubles Flute, but an octave higher. In order to filter out any transient doublings, the system may ignore a doubling that only occurs for a short duration. Exact doublings (identical pitch and rhythm) are then marked and used to suggest potential substitutions. For example, if the bassoon and trombone parts frequently double exactly, the user will be informed that the bassoon and trombone parts could be interchanged if the ensemble lacks one of those instruments. Inexact doublings (identical rhythm but different pitch) are only computed for common intervals, such as the minor $3^{rd}$, major $3^{rd}$, perfect $5^{th}$, octave, and common compound intervals such as the octave + major $3^{rd}$ etc. This information informs the user of the use of orchestration throughout the composition. |
| Exposed Solo | All parts are compared across all measures to find exposed solos. An exposed solo is defined to be any part in which all other parts are either whole measure rests or playing sustained notes for the entirety of the measure(s). |

Once part statistics 734 are extracted, document features 742 are extracted from document 740. The document features 742 include the duration of the music, which may be extracted or estimated. If the duration of the music is included in document 740, it is often preceded by the word "duration" and in a format such as the formats described in Table 17:

TABLE 17

| Format | Example |
| --- | --- |
| mm:ss | 3:45, 18:25 |
| mm'ss" | 4'33" |
| mm[m]ss[s], where [m] is either of the literals "m" or "min" and [s] is either of the literals "s" or "sec" | 2 m 30 s, 5 min 41 sec |

If the duration of the music is not included in document 740, the duration is estimated. In one embodiment, the duration of the music is estimated using at least the number of measures, the meters, the tempo markings, and any repeats, endings, codas, segnos, or other text indicating a repeated section. If the tempo marking does not contain a number indicating a number of beats per minute, the text of the tempo marking is compared to a lookup table of common tempos and, if a match is found, the lookup table's corresponding beats per minute is used. If no match is found, the duration is calculated using a substitute tempo. In some embodiments, the substitute tempo is 120 beats per minute. If a tempo marking indicates a range of numbers, for example "Allegro (116-120 bpm)", the average of the specified range is used.

FIG. 8 is a flowchart illustrating the rules analysis process 524 performed by the SMAE 140 according to an exemplary embodiment of the present invention.

During rules analysis 524, note features 712, note statistics 714, measure features 722, measure statistics 724, part features 732, part statistics 734, and document features 742 may be used to perform melodic rules analysis 810, harmonic rules analysis 820, rhythmic rules analysis 830, and form rules analysis 840. The melodic rules analysis 810 applies rules to interpret and analyze the melody, the sequence of notes one after another. Harmonic rules analysis 820 applies rules to interpret and analyze the harmony, which includes chords (notes occurring at the same time) and chord progressions (how the harmony changes over time). Rhythmic rules analysis 830 applies rules to interpret and analyze the rhythm, the duration and timing of each note. Form rules analysis 840 applies rules to interpret and analyze the music as a whole to determine musical form. Each of the melodic rules analysis 810, the harmonic rules analysis 820, the rhythmic rules analysis 830, and the form rules analysis 840 generate the rule-derived metadata 526 described above. The rule-derived metadata 526 may be used during the machine learning analysis 528 described above.

Figure 9:
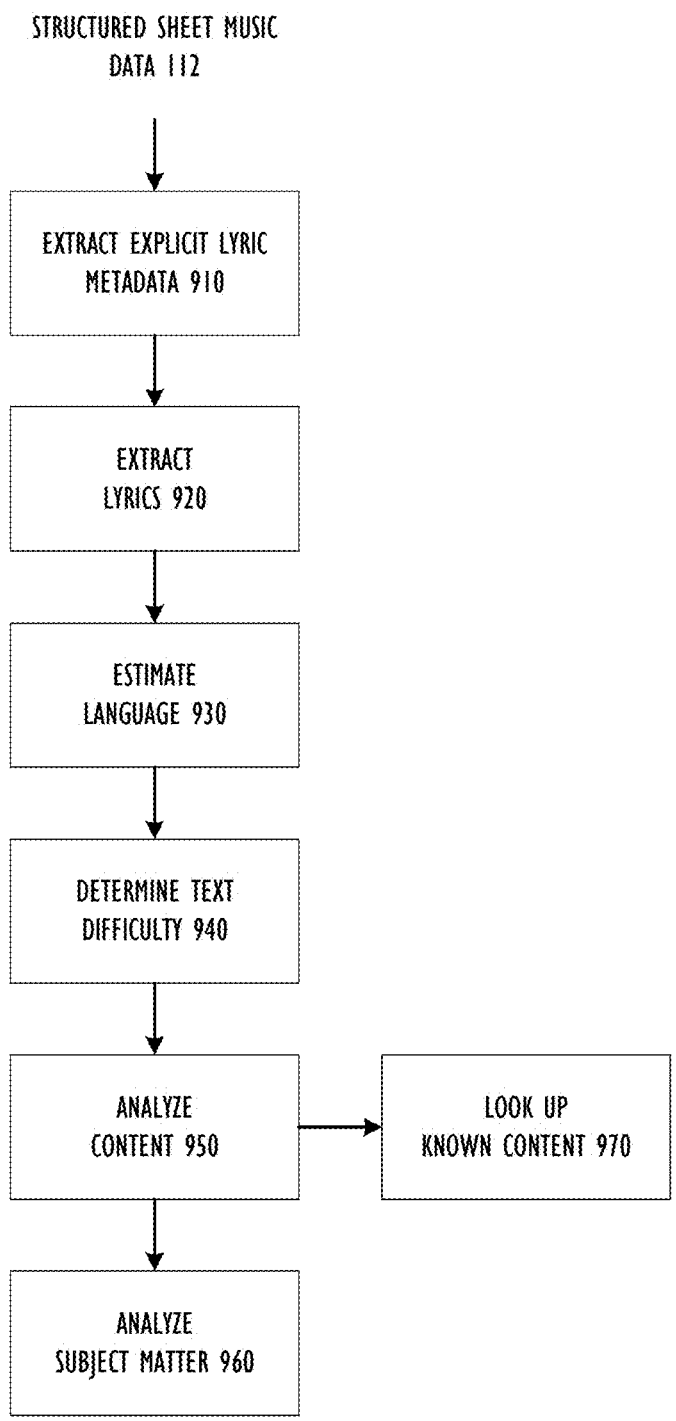
FIG. 9 is a flowchart illustrating a lyrics extraction process according to an exemplary embodiment of the present invention.

FIG. 9 is a flowchart illustrating the lyrics extraction 550 process performed by the SMAE 140 according to an exemplary embodiment of the present invention.

The preprocessed structured sheet music data 112 is input to lyrics extraction 550 and explicit lyric metadata is extracted at 910. Explicit lyric metadata includes the data described in

TABLE 18

| Explicit Lyrical Metadata | Description |
| --- | --- |
| Number of Verses | The number of verses appearing in the music. |
| Humming | Indicates whether the lyrics include humming |
| Laughing | Indicates whether the lyrics include laughter |
| Non-English Characters | Indicates that the text uses characters not found in the English alphabet. This is helpful in identifying a text that may be in a language other than English, in the event that the lyric language cannot be identified. For example, the lyrics might use a constructed language or International Phonetic Alphabet (IPA). A constructed language is one specifically created (rather than a natural evolution), for example Esperanto or languages that occur in science fiction or fantasy literature. |

Once the explicit lyric metadata is extracted at 910, the lyrics are extracted from the structured sheet music data 112 into a separate text file 920. The separate text file combines all syllables into words and includes all verses. All further lyrical analysis uses this separate text file as input. At 930, the language of the lyrics is estimated using language identification techniques from the field of natural language processing. In some embodiments, a combination of writing system and statistical analysis such as letter frequency and n-gram frequency is used to estimate the language. If the lyrics include a passing phrase in another language, the dominant language is identified. If the lyrics include equal parts of multiple languages such as translated lyrics or a macaronic text, the language is identified as "multiple languages." If no match is determined, the language is marked as unknown. If the language cannot be determined and the text contains non-English characters, the language label may include a note regarding the non-English characters. In one embodiment, the language label may be "unknown (contains letters other than A-Z)." Next, the text difficulty is determined at 940. The text difficulty may be determined using readability metrics such as the Flesch-Kincaid grade level, which uses the number of words per sentence and the number of syllables per word to compute an estimated difficulty level. Next, the content of the lyrics is analyzed at 950. In some embodiments, known content is looked up at 970 and compared against the text of the lyrics. The known content may include scripture, quotations, poems, literary text, etc. In some embodiments, the subject matter of the text of the lyrics is analyzed at 960 to classify the meaning of the lyrics. In some embodiments, this may include comparing the lyrics 552 (or the embeddings generated during the semantic embedding process 532B or the semantic similarity metadata 540B generated by the semantic similarity analysis 538B) to the text of other compositions with known subject matter, including love songs, holiday songs, religious or spiritual songs, novelty songs, etc. Mature or objectionable content may be identified at 960 as well.

Analyzing Unstructured Sheet Music Images

Figure 10:
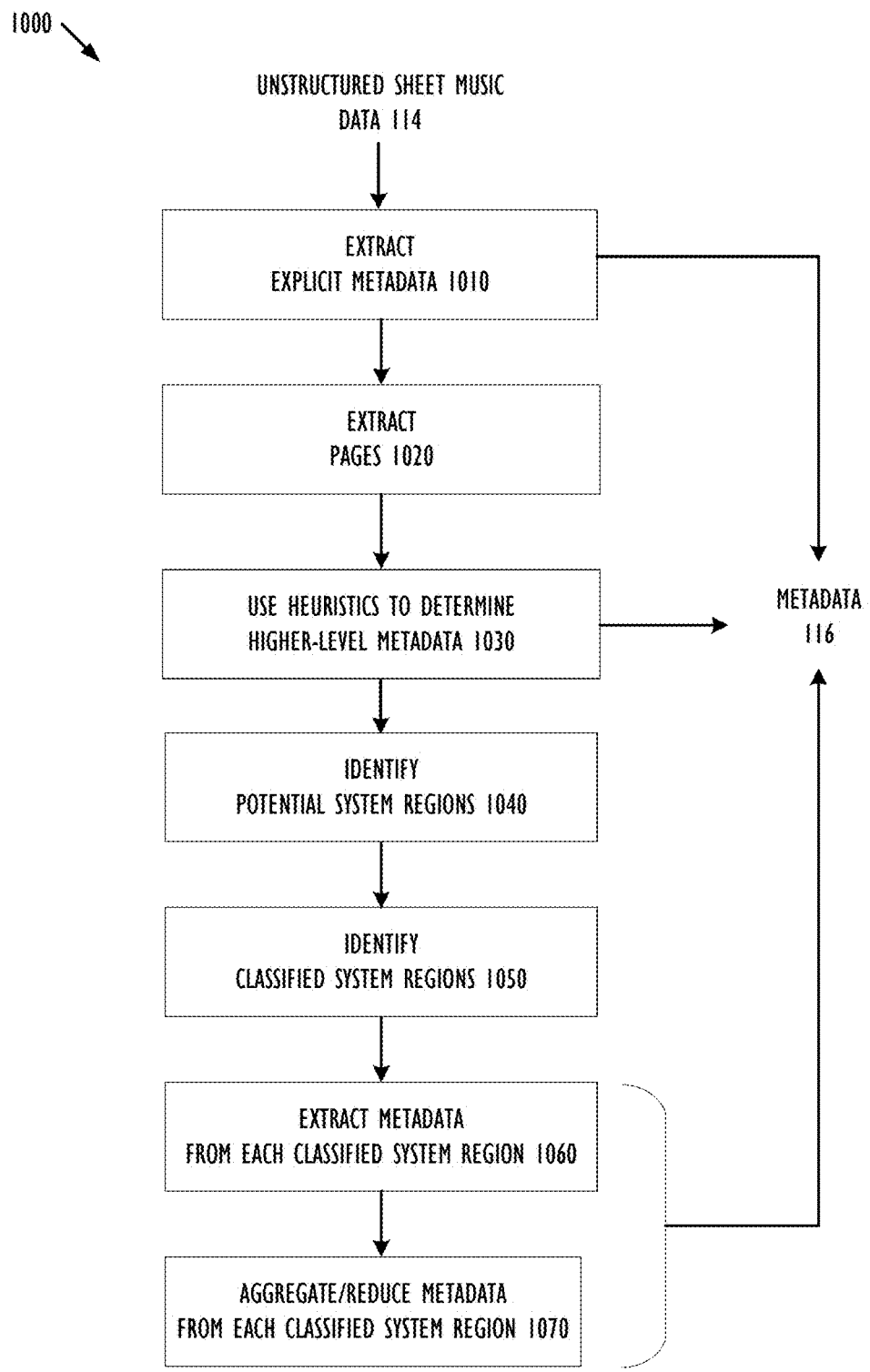
FIG. 10 is a flowchart illustrating a data ingestion process for analyzing unstructured sheet music data and determining metadata that describes each composition stored as unstructured sheet music data according to an exemplary embodiment of the present invention.

FIG. 10 is a flowchart illustrating a data ingestion process 1000 for analyzing unstructured sheet music data 114 and determining metadata 116 that describes each composition stored as unstructured sheet music data 114 according to an exemplary embodiment of the present invention.

As discussed previously, the structured sheet music analysis engine 140 operates on structured sheet music data 112, not unstructured sheet music data 114, because all explicit information stored in structured sheet music data 112 (e.g., pitch, duration, etc.) must be inferred from unstructured sheet music data 114. As such, unstructured sheet music data 114 undergoes analysis performed by the optical analysis engine 180 using heuristics, optical character recognition (OCR), traditional optical music recognition (OMR), machine learning-based pattern recognition ("fuzzy OMR"), etc., instead of the structured sheet music analysis engine 140.

The unstructured sheet music 114 may be multi-page digital image files (such as PDFs). Sheet music that is not printed (such as an engraving plate) is printed. Sheet music that is printed but not computer readable is converted to a computer readable format by scanning the printed sheet music (for example, by the optical scanner 270). If the conversion from a printed format to a computer readable format fails (e.g., printed documents that have been damaged, marked, or destroyed, handwritten manuscripts that produce poor quality OMR results) the music may be restored and re-converted. Explicit metadata 350 is extracted at 1010 (using a similar process as 320 above). Each page is extracted at 1020.

Heuristics may be used to determine higher-level semantic metadata 116 at 1030. Examples of heuristics that may be used to determine metadata 116 include the heuristics described in Table 19:

TABLE 19

| Heuristic | Description |
| --- | --- |
| Ink Density (number of dark pixels as a percentage of all pixels) | A higher ink density suggests the use of more musical notation, such as dynamics, articulations, etc. A high ink density therefore implies a more difficult composition. Counting the number of consecutive dark pixels in every horizontal row helps determine potential system regions. |
| System detection by measuring the run-length of dark pixels over each horizontal row | 1. Count the number of dark pixels in a row<br>2. Find the longest run of consecutive dark pixels in the row (maximum run-length).<br>3. If the maximum run-length exceeds a threshold, add it to the current potential region. Otherwise, do not consider this row as part of a potential system region. A threshold is used to filter out any potential noise in the digital image.<br>The output from this process is a set of potential system regions, which are then used for further processing. This algorithm is common within OMR software for finding systems and staves within a piece. |

Potential system regions on each page may be identified at 1040. For example, the system 100 may count the amount, and maximum run-length, of dark pixels in every horizontal row to identify potential system regions (e.g. areas of the page containing staves) to be used for further processing. Classified system regions may be identified at 1050. For example, a classifier (e.g., a machine learning classifier) may analyze each potential system region to positively identify which of the potential system regions are classified system regions. Machine learning may be used to determine higher-level semantic metadata 116 describing sheet music stored as unstructured sheet music data 114 at 1060. For example, a machine learning algorithm may be used to determine the range of unstructured sheet music data 114 by using a convolutional neural network pretrained for this task. Because unstructured sheet music data 114 is encoded as a digital image, the optical analysis engine 180 uses image classification methods to determine musically-relevant metadata 116 describing the sheet music stored as unstructured sheet music data 114. By using transfer learning, machine learning-based classifiers based on existing image recognition models (e.g., AlexNet, VGG, Inception, ResNet, etc.) can be quickly retrained to extract range, motifs, playing techniques (double stop, cross staff beaming, etc.), etc. For each (potentially multi-page) composition, the metadata 116 extracted from each classified system may be aggregated and reduced at 1070. For example, a composition with two classified system regions, A and B, may be mapped to two implicit metadata extraction functions, topNote(x) and bottomNote(x). as follows:

Compute the functions directly:
        topNote(A)='C5'
        bottomNote(A)='D4'
        topNote(B)='F5'
        bottomNote(B)='E4'
    Group the results together by algorithm
        topNote(A, B)=['C5', 'F5']
        bottomNote(A, B)=['D4', 'E4']
    Compute the aggregates for each page. Given the example above, the aggregate function for topNote(x) is max(x), and the aggregate function for bottomNote(x) is min(x)

topNote(Page)=max(topNote(A, B))=max(['C5', 'F5'])='F5' bottomNote(Page)=min(bottomNote(A, B))=min(['D4', 'E4'])='D4' Repeat the aggregation over all of the pages to give the final results for each metadata extraction function Store the final result of each metadata extraction function in the one or more databases 110.

Figure 11A:
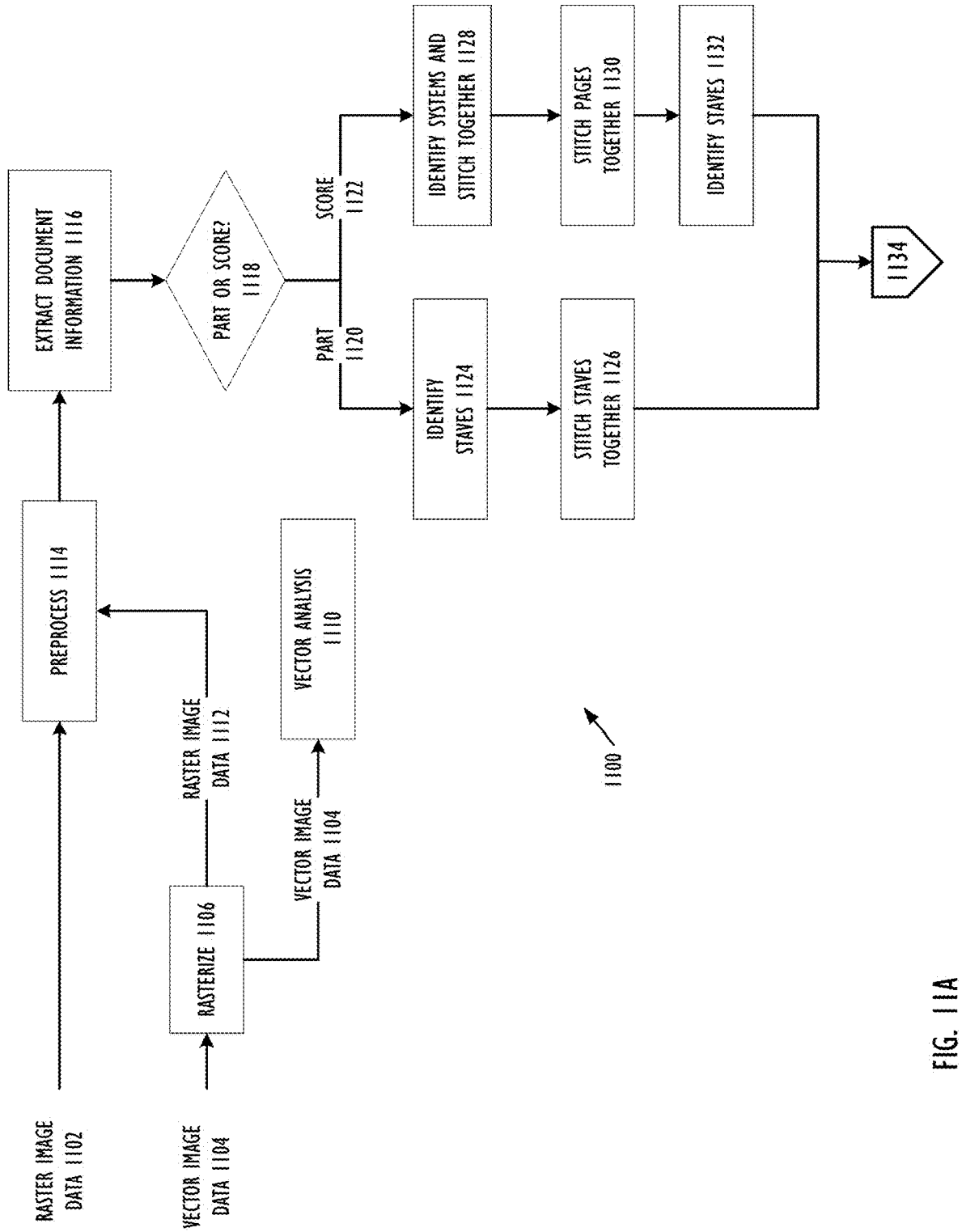
FIG. 11A and FIG. 11B is a flowchart illustrating a workflow of an optical analysis engine according to an exemplary embodiment of the present invention.
Figure 11B:
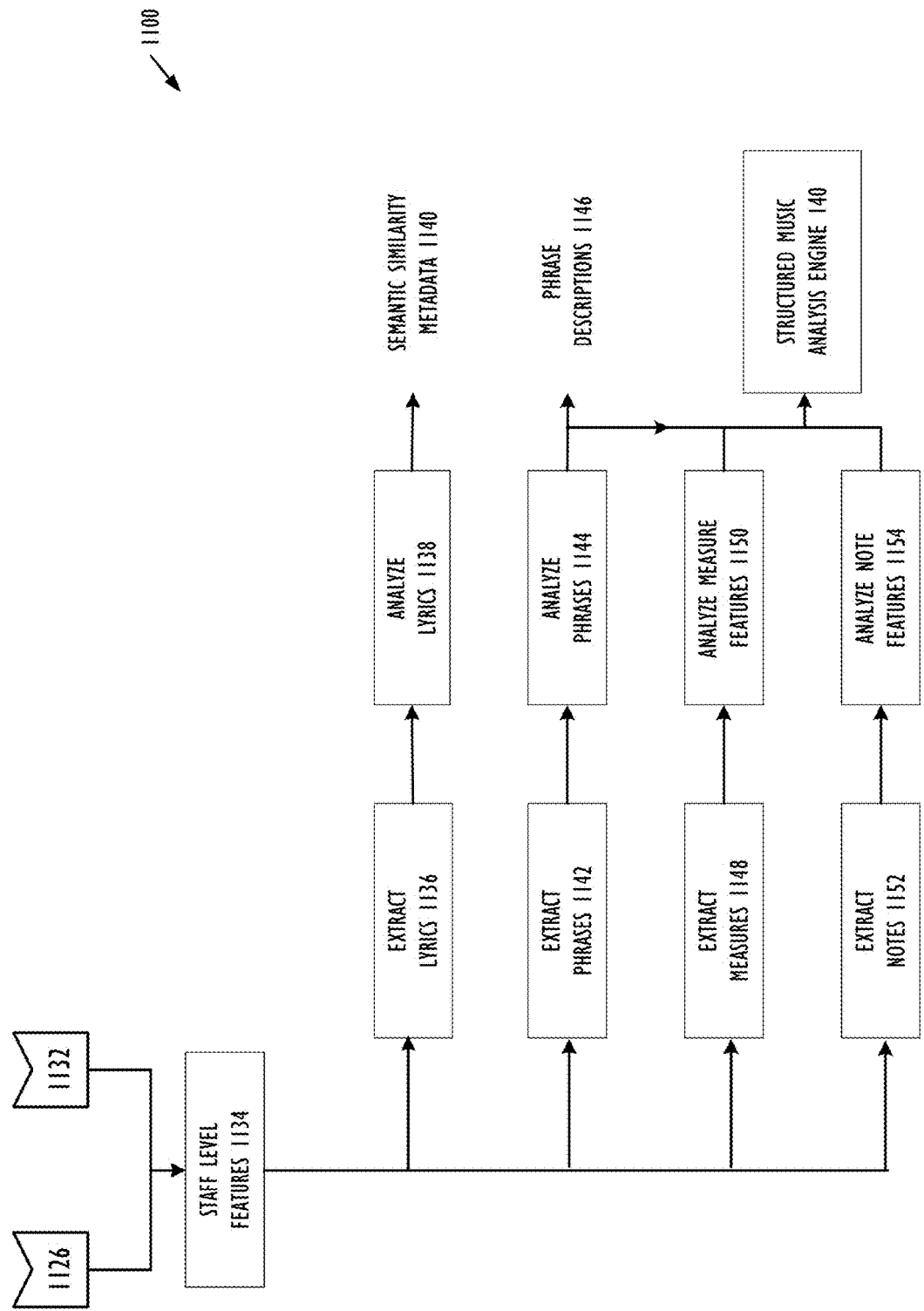

FIGS. 11A and 11B is a flowchart illustrating the workflow 1100 of the optical analysis engine 180 according to an exemplary embodiment of the present invention.

As discussed previously, the optical analysis engine 180 uses heuristics, OCR, OMR, fuzzy OMR, etc. to infer information from images of sheet music. Ideally, the output of the optical analysis engine 180 is the same as the output of the structured sheet music analysis engine 140. However, because images of sheet music vary enormously (e.g., in color, resolution, skew, etc.), oftentimes the optical analysis engine 180 provides results that approximate the output of the structured sheet music analysis engine 140.

A large number of processes performed by the optical analysis engine 180 are based on object detection. Object detection algorithms identify certain areas of an image as belonging to a particular object class. In some embodiments, the object detection algorithms return a bounding region around a detected object or the set of pixels representing the detected object, the likely class of detected object, and a probability the detected object belongs to the object class. Within the context of the optical analysis engine, object classes include text, staves, measures, clefs, notes, etc. In some embodiments, a single object detector is trained to identify all object classes in a monolithic fashion, while in other embodiments, several specialized object detectors are trained to detect similar classes in a modular fashion. Any object detection algorithm may be used, including single-shot detection (SSD), you only look once (YOLO), common objects in context (COCO), etc. In some embodiments, a combination of object detection algorithms is used.

The optical analysis engine 180 works with images of sheet music that is either typeset or handwritten and is impervious to features such as scale and font. The optical analysis engine 180 follows a general pattern of identifying segments, analyzing the segments, then further segmenting into smaller segments in a top-down approach (that differs from the bottom-up approach of the structured sheet music analysis engine 140). For example, a staff is segmented into measure, which is then segmented into notes. The output from the optical analysis engine 180 may be directly fed into a keyword based search engine, used in evaluating natural language queries, or both. In some embodiments, the output from the optical analysis engine 180 may be further processed by the structured sheet music analysis engine 140. For example, the optical analysis engine 180 may extract lyrics from the images of sheet music but the structured sheet music analysis engine 140 may analyze the lyrics using the process described above at 532B and 538B.

Data may be input to the optical analysis engine 180 as either raster image data 1102 (e.g., PNG, JPEG, etc.), vector image data 1104 (e.g., SVG), etc. Raster formats encode information about every pixel while vector formats store instructions on how the content is drawn. If vector information is available as well as raster data, accuracy may be improved by analyzing both raster and vector data. Where vector image data 1104 is input to optical analysis engine 180, the vector image data 1104 is rasterized at 1106 by selecting a resolution and rendering the vector image data 1104 at that resolution. The newly generated raster image data 1112 undergoes preprocessing at 1114 just as raster image data 1102 does. A copy of the original vector image data 1104 is used for vector analysis 1110.

Since vector image data 1104 encodes graphics as a set of drawing commands, it is sometimes possible to identify when two drawing commands are similar through a vector analysis 1110 process known as template matching. Each command in the vector image file 1104 is either stored in a dictionary within the file that is referenced at later points in the file or is used inline. These commands may be compared to a set of known templates that identify that command as belonging to a particular glyph within a particular typeface. A vector command consists of one or more instructions that tell the computer what type of graphic primitive to draw (such as a line, circle, or Bezier curve), where to draw it, and its relative proportions. The use of relative proportions means that the commands may appear at different scales, even though the commands draw the same figure. For example, a vector command on a 1× scale may be M 2.578125 2.984375 C 1.835938 2.984375 1.222656 2.8125 0.734375 2.46875 whereas the same vector command on a 2× scale may be M 5.15625 5.96875 C 3.67188 5.96875 2.44531 5.625 1.46875 4.9375. The same commands can be compared after they are normalized to the same scale (for example, by dividing every coordinate by the maximum coordinate so that the largest coordinate is now equal to 1).

Once the commands have been identified with known glyphs and/or shapes, a structured music document 112 may be reconstructed. For example, barline glyphs may be identified to isolate individual measure regions. Additionally, duration may be computed for all note, rest, and chord objects, and their position in time is determined using a time cursor within each measure region. The reconstructed structured music document 112 may then be analyzed by the structured sheet music analysis engine 140 as described above. In some embodiments, the outputs of both vector analysis 1110 and other analysis performed by the optical analysis engine 1100 may be aggregated for greater accuracy. Where raster image data 1102 is the input to optical analysis engine 1100, the raster image data 1102 is preprocessed at 1114.

Preprocessing 1114 is intended to improve the accuracy of the image analysis by straightening, denoising, whitening, etc. Scanned images skewed during the scanning process are straightened during preprocessing 1114. In one embodiment, the images of sheet music are straightened using a Hough transform to identify staff lines, measure their angles, and rotate the image until the staff lines are straight. Denoising identifies and removes random variations in pixel intensities and may be done by any number of processes, including smoothing, which averages the intensities around a pixel, non-local means, which averages similar patches within the image, etc. Whitening changes the statistical proprieties of the pixel values such that all pixels are uncorrelated and have a variance of one. This makes it easier for the analysis algorithms to identify statistically significant features, improving overall accuracy. After preprocessing at 1114, document information is extracted at 1116. Document header information, if available, provides the document information. If not, the information is extracted using OCR. Document information includes the fields described in Table 20:

TABLE 20

| Document Info Fields |
| --- |
| Work Title |
| Work Number |
| Movement Title |
| Movement Number |
| Composer |
| Arranger |
| Lyricist |
| Copyright |

The output of the OCR may contain recognition errors which are corrected in a post-processing step. The post-processing step may include one or more of (1) collating any header information contained in the original document, (2) collating any text, (3) identifying and fixing common recognition errors through the use of a lookup table, (4) identifying known entities (such as composers, arrangers, etc.) through the use of a lookup table, (5) identifying common patterns using a template, (6) spell-checking, and (7) using named entity recognition to identify names. At 1118, it is determined whether the document is a score containing multiple instruments or a part which contains only a single instrument. If the document is identified as a part 1120, staves are identified at 1124. Staves are stitched together at 1126 to simplify feature extraction by minimizing discontinuities at system and page boundaries.

Figure 21G:
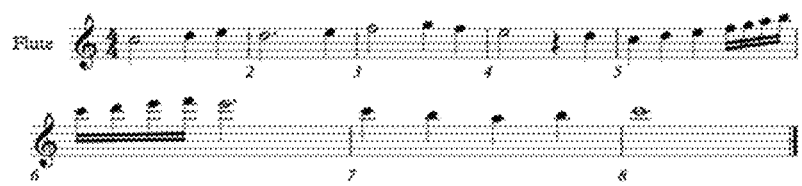
FIG. 21G is a part before stitching.
Figure 21H:
FIG. 21H is an uninterrupted scale run after stitching.

For example, consider the part before stitching shown in FIG. 21G. That part includes a scale run that begins in measure 5 and ends in measure 6, but is interrupted by a system break. After stitching, the scale run is uninterrupted as shown in FIG. 21H.

If the document is identified as a score 1122, systems are identified and stitched together at 1128. Pages are stitched together at 1130. Staves are identified at 1132. Staff level features of the pages and staves are identified at 1134.

In some embodiments, the unstructured sheet music data 114 may be converted (e.g., using OMR) to structured sheet music data 112 (e.g., a MusicXML file) by the sheet music conversion engine 160 and then passed to the SMAE 140, which determines metadata 116 by analyzing the data 112 down to each note 710 as described above. In other embodiments, however, the optical analysis engine 180 includes one or more image recognition algorithms (described above) that have been trained to recognize musical metadata 116 without having to analyze every single note 710. For example, lyrics may be extracted from the staff level features at 1136 (using a similar process as 550 above) and analyzed at 1138 (by the SMAE 140 a similar process as 532B-540B above) to generate semantic similarity metadata 1140. Phrases may be extracted from the staff level features at 1142 and analyzed at 1144 using image recognition algorithm(s) trained to generate phrase descriptions 1146 (similar to phrase descriptions 548). Those one or more image recognition algorithms may extract measures from the staff level features at 1148 and analyze measure features at 1150, and extract notes from the staff level features at 1152 and analyze note features at 1154. The results of phrase, measure, and note analysis may be analyzed by the structured sheet music analysis engine 140.

The results of the machine learning-based pattern recognition processes described above may be analyzed by the structured sheet music analysis engine 140. In particular, the machine learning analysis 528 described above can be used to predict the difficulty of each composition (or each part within each composition) stored as image data. For example, a corpus of compositions or parts stored as images may have known difficulty levels. A supervised learning process can then be used to learn a function for determining a probability that another composition or part stored as image data has those difficulty levels based on the patterns recognized in the image data.

As described above, the structured sheet music analysis engine 140 analyzes structured sheet music data 112 as well as unstructured sheet music data 114 that has been converted to structured sheet music data 112 by the sheet music conversion engine 160 to determine musically relevant metadata 116 describing the sheet music. Meanwhile, the optical analysis engine 180 analyzes unstructured sheet music data 114 to determine musically relevant metadata 116 describing the sheet music. The metadata 116 describing each composition is stored in the one or more databases 110. As described in detail below, the sheet music search and discovery system 100 also includes a search engine 190 that enables user to determine compositions that are relevant to users based on the metadata 116 extracted, calculated, and generated by the sheet music search and discovery system 100.

Search and Recommendations

Figure 12:
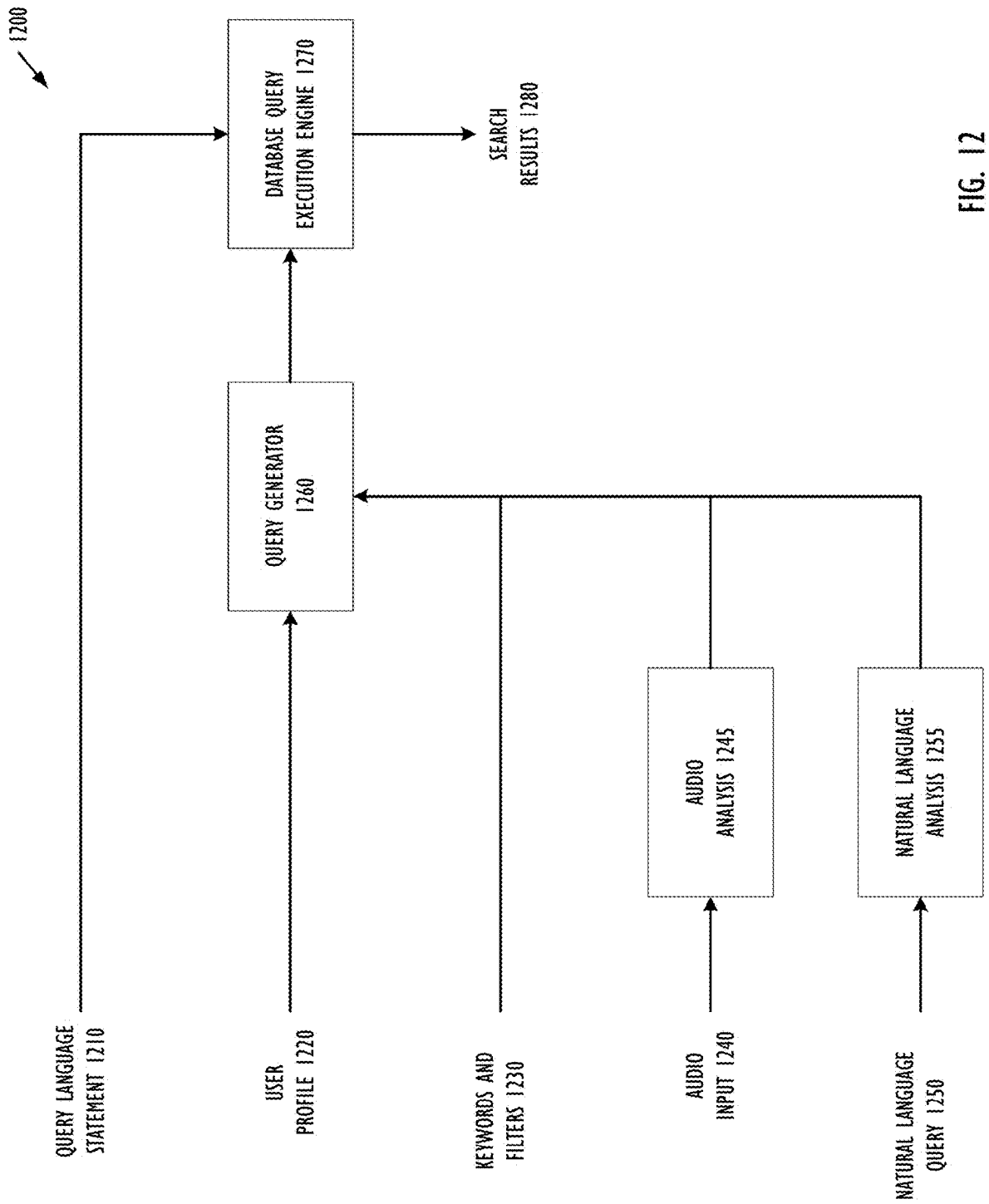
FIG. 12 is a flowchart illustrating a query process according to an exemplary embodiment of the present invention.

FIG. 12 is a flowchart illustrating a query process 1200 executed by the search engine 190 to search sheet music data according to an exemplary embodiment of the present invention.

Once the metadata 116 describing structured sheet music data 112 and unstructured sheet music data 114 has been generated using the structured sheet music analysis engine 140 or the optical analysis engine 180, the metadata 116 is stored in a database and available for search. A query language statement 1210 may be directly input to database query execution engine 1270 to generate search results 1280. The query language statement 1210 may be constructed using structured query language (SQL). Examples of SQL query pseudocode are shown in Table 21, where composition-related data is stored in a table called Compositions and part-related data is stored in a table called Parts. There is a 1:n relationship between Compositions and Parts (because each composition may include multiple parts), such that an entry in the composition table may link to one or more entries in the Part table via a foreign key called compositionId.

TABLE 20

| SQL Query Pseudocode | Description |
| --- | --- |
| SELECT * FROM Compositions<br>INNER JOIN Parts ON Part.compositionId = Composition.compositionID<br>WHERE Composition.tempo BETWEEN 80 AND 120<br>AND Composition.gradeLevel = 2 AND<br>Composition.ensembleType = 'Marching Band'<br>AND Composition.duration < 180<br>AND (Part.featured = True<br>WHERE Part.instrument = 'Flute'<br>AND Part.featured = True<br>WHERE Part.instrument = 'Trumpet'<br>) | Find all Grade 2 Marching Band titles where Flute and Trumpet are featured instruments with a moderate tempo between 80 and 120 beats per minute under 3 minutes (180 seconds) in length. |
| SELECT TOP 5 * FROM Compositions<br>INNER JOIN Parts ON Part.compositionId = Composition.compositionID<br>WHERE Composition.ensembleType = 'SAB'<br>AND Composition.LyricLanguage = 'Latin' | Find the top 5 compositions for SAB chorus with a Latin text where the highest |

TABLE 20-continued

| SQL Query Pseudocode | Description |
| --- | --- |
| AND (Part.highestNote = 'F5' WHERE Part.instrument = 'Soprano') | note in the Soprano part is F5. |

Where the query language statement 1210 is not available, query generator 1260 may create a query based on user profile 1220, keywords and filters 1230, audio input 1240 analyzed at 1245, natural language query 1250 analyzed at 1255, audio fingerprint, QR code, unstructured sheet music data, etc.

The search engine 190 provides functionality for users to input the keywords 1230 via the graphical user interface 192. The graphical user interface 192 may provide functionality for users to input keywords 1230 in an unstructured manner. For example, the graphical user interface 192 may simply allow the user to enter keywords 1230 and the search engine 190 may be able to determine whether any of the metadata 116 matches or is similar to those keywords 1230. In some embodiments, the graphical user interface 192 may provide functionality for users to input keywords 1230 in a structured manner. For example, the graphical user interface 192 may provide functionality for the user to input keywords 1230 in one or more categories of musical attributes (e.g., composer, range, etc.) and the search engine 190 may determine whether any of the metadata 116 in those categories matches or is similar to those keywords 1230. The search engine 190 may also provide functionality for users to augment a keyword search by selecting a filter 1230 via the graphical user interface 192. For example, the graphical user interface 192 may allow the user to select a category (e.g., key signature, meter, lyric language, etc.) and input a value or range of values. The search engine 190 then determines whether any of the metadata 116 matches that value or is within that range of values. The search engine 190 may also search the metadata 116 to identify sheet music matching user profiles 1220. User profiles 1220 will be discussed further in reference to FIG. 16. The database query execution engine 1270 compares the query generated by query generator 1260 to the metadata 116 describing structured and unstructured sheet music data to generate search results 1280.

The query generator 1260 may also construct a query based on audio input 1240. For example, the search engine 190 may provide functionality for a user to submit a query by humming or singing a melodic fragment (audio input 1240) and have the search engine 190 return the compositions with the highest similarity. The search engine 190 may search for similar compositions using Parsons code, dynamic time warping, audio fingerprint and/or a neural network. Parsons code describes the melodic contour of a composition. In order to convert an audio input 1240 to Parsons code, audio analysis at 1245 determines an approximate pitch using standard pitch detection, such as autocorrelation, fast Fourier transform (FFT), or the Yin algorithm. The audio analysis at 1245 then determines whether subsequent pitches are higher, lower, or the same as the previous pitch, within a certain error threshold. Converting the audio input 1240 to Parsons code has certain advantages. For example, the user's pitch does not have to be exact, the user's rhythm does not have to be exact, and the approach can easily search structured data. However, converting the audio input 1240 to Parsons code also has certain disadvantages. For example, the audio input 1240 must be monophonic, the audio input 1240 must start at the beginning of the composition, and, due to a lack of rhythmic information, it is difficult to distinguish between compositions that have the same melodic contour but different rhythms.

Dynamic time warping is a process of comparing two waveforms and determining how similar they are under time altering transforms. Dynamic time warping has certain advantages. For example, the user's pitch does not have to be exact (as a stretched waveform will have a lower pitch and a time-compressed waveform will have a higher pitch), the user's rhythm does not have to be exact, the audio input 1240 may be polyphonic (e.g. searching for a piano composition by playing a piano as the audio input 1240), and the audio input 1240 does not have to start at the beginning of the composition. However, dynamic time warping also has certain disadvantages. For example, because this approach involves waveform comparison, the search engine 190 must store at least one audio version of every composition that is searched in audio format.

The search engine 190 may also utilize a neural network trained against several queries and known ground truth structured data, such as the Multimedia Information Retrieval Query By Singing/Humming (MIR-QBSH) corpus, the Institute Of Acoustics Chinese Academy Of Sciences (IOACAS) corpus, etc. Utilizing a neural network has certain advantages. For example, it allows for a direct query of structured data from an audio waveform, the pitch and rhythm of the audio input 1240 do not need to be exact (as the convolutional layers of the network should capture the time and pitch variation), and audio input 1240 does not have to start at the beginning of the composition. However, utilizing a neural network has certain disadvantages. For example, training the neural network may take a long time and the query may be limited only to the primary melodic motifs of the compositions (whereas other methods may search the entire composition for a match). However, this may also be an advantage as people are more likely to search for common, memorable motifs.

The query generator 1260 may also construct a query based on natural language query 1250 (e.g., "What concertos feature the clarinet?" "Are there any SAB choral works based on the poems of Robert Frost?" "Is there a trumpet solo that features triple-tonguing?" etc.). For example, the search engine 190 may analyze the natural language query at 1255 and use that analysis to perform natural language querying against natural language descriptions of the compositions stored in the one or more databases 110. Natural language descriptions of musical compositions may include information from the metadata 116 (in particular the text/keyboard output 420) described above—including, for example, the explicit metadata 350 (e.g., composer, lyricist, etc.), the implicit metadata (e.g., range, meters, etc.), the rule-derived metadata 526, the machine learning derived metadata 530, the semantic similarity metadata 540A, 540B, and 1140, the phrase descriptions 548 and 1146, etc.—as well as the publisher's description of a composition, other advertising copy of the composition, other sources of information pertaining to the composition (e.g., electronic sources such as Wikipedia), crowd-sourced information about the composition, etc.

Figure 13:
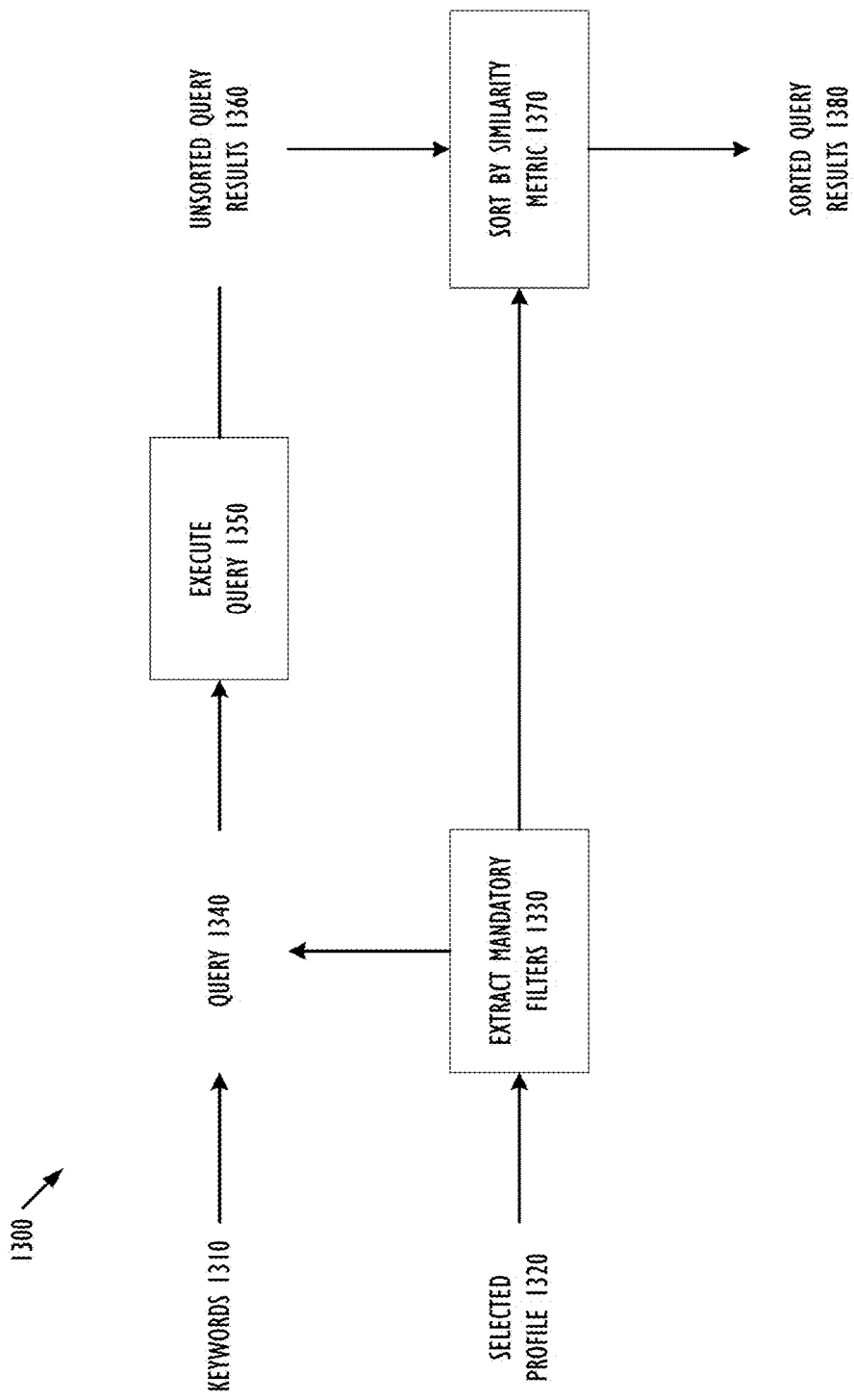
FIG. 13 is a flowchart illustrating a process for querying sheet music data using a user profile according to an exemplary embodiment of the present invention.

FIG. 13 is a flowchart illustrating a process 1300 for querying sheet music data using a user profile according to an exemplary embodiment of the present invention.

Keywords 1310 are transformed into a query 1340 (e.g., an SQL query) by the query generator 1260. A selected user profile 1320 is considered and any mandatory filters are extracted at 1330 and appended to the query 1340 before query 1340 is executed at 1350. A mandatory filter may include, for example, an ensemble type, a requirement that a specific instrument be included in the search results, etc. Extracting and appending mandatory filters 1330 to the query 1340 limits the results returned. For example, if the user selects a user profile 1320 for a choir, all non-choir literature is automatically excluded. Similarly, if the user selects a user profile 1320 for wind ensemble and requires that the English horn be in the instrumentation, then all wind ensemble compositions not having an English horn are automatically excluded. Extracting mandatory filters at 1330 before the query 1340 is executed at 1350 limits the number of records that the query 1340 runs over, resulting in faster execution.

The execution of the query 1340 at 1350 results in unsorted query results 1360, which are sorted at 1370 by comparing each composition in the unsorted query results 1360 to the selected user profile 1320 by using similarity metrics. Potential metrics include, for example, Manhattan (L1) distance or Jaccard similarity. After the similarity metric is computed for each composition in the unsorted query results 1360, the unsorted query results 1360 are then sorted at 1370 from highest scoring (i.e., most similar) to lowest scoring (least similar). The sorted query results 1380 are then displayed to the user. Sorting allows the most relevant compositions to appear at the top of the page. In order for the search engine 190 to find items that match a selected user profile 1320, the search engine 190 compares how well the selected user profile 1320 matches a given item.

The storing process 1370 may include an instrumentation comparison and/or a range comparison. In an instrumentation comparison, the selected user profile 1320 contains a list of one or more instruments and their respective ranges. In order to recommend appropriate compositions, the instrumentation must be compared to the instrumentation of each composition. Both the number of instruments as well as the type of each instrument must be considered to make an accurate match. Because instrument names may vary, the instrument names are normalized in during preprocessing 635 and/or are limited to a predefined set of drop down values by the graphical user interface 192 that the user may select when creating their profile. In one example of an instrumental comparison, a user has defined a selected user profile 1320 for a brass quartet. Their profile contains four instruments, with the names "Trumpet 1", "Trumpet 2", "Horn", and "Trombone". The first two instruments have their names normalized to "Trumpet". The user then performs a search. (If the search engine 190 only considers the number of instruments, then the search engine 190 returns results from string quartets or choral music. Such results are irrelevant and should not be returned to the user.) Instead, the search engine 190 takes both the number of instruments and their names into account when performing a search. In another example of an instrumental comparison, a user has defined a selected user profile 1320 for a wind ensemble, but has not included "Bassoon" in the selected user profile 1320 because their ensemble does not have a bassoon. However, virtually all wind ensemble literature includes a bassoon part. The user should still be able to find compositions with very similar instrumentation. The search engine 190 may use, for example, a method to determine the similarity of the instrumentation of the selected user profile 1320 to the composition. Without this comparison, it is possible that this example query 1340 would not return any results. By making this comparison, the example query 1340 can return results, even if the results are inexact matches.

In a range comparison, the search engine 190 returns compositions where the range of a given part of the composition falls within the range of the same part in the selected user profile 1320. For example, the search engine 190 may run two penalty functions to determine how far the range of the composition falls above and below the range of the selected profile 1340. Each function may determine an exponential penalty for each semitone that a given composition goes above or below the range of the selected used profile. For example, if a composition's range exceeds the upper range of the selected user profile 1320 by two semitones, the function may return a 96% match (100−2*2). Such penalties may be more heavily weighted when the composition's range exceeds not only the range of the selected user profile 1320, but also the physical capabilities of the instrument selected in the selected user profile 1320.

Figure 14:
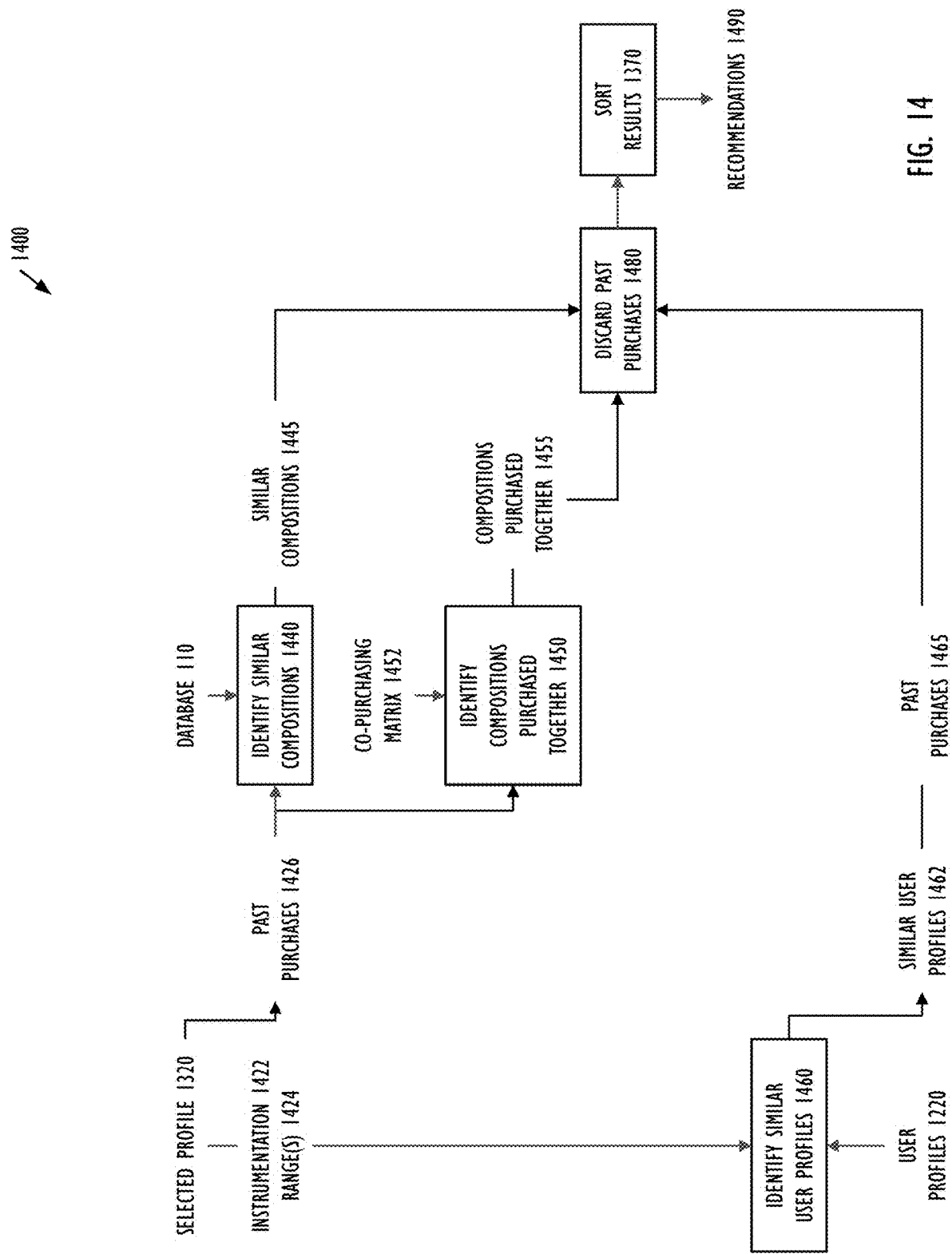
FIG. 14 is a flowchart illustrating a recommendation process according to an exemplary embodiment of the present invention.

The search engine 190 may include a content-based recommendation system that recommends compositions that the user has not yet purchased that are similar to compositions that the user has already purchased. FIG. 14 is a flowchart illustrating a recommendation process 1400 performed by the search engine 190 to identify recommendations 1490 according to an exemplary embodiment of the present invention.

As shown in FIG. 14, the selected user profile 1320 may include an instrumentation 1422 and a range 1424 for each of those instruments, as well as past purchases 1426 of the user. The search engine 190 may identify similar compositions 1445 at 1440 by comparing the metadata 116 describing each of the past purchases 1426 to the metadata 116 of the remaining compositions in the one or more databases 110. In particular, the similar composition process 1440 may identify compositions with similar instrumentations and/or ranges as described above with respect to the storing process 1370. After discarding purchases already made by the user at 1480, the similar compositions 1445 may be sorted for relevance using the sorting process 1370 described above. In one example, for a user that has purchased compositions for middle school orchestra, the search engine 190 may recommend compositions for middle school orchestras, followed by compositions for orchestras that are not specifically targeted for middle school but that match closely to other compositions that the user has already purchased. Compositions for different ensembles (e.g., choir or PVG arrangements), although still related to a user's other previous purchases, may either be listed last or excluded from the recommended compositions entirely because they are not relevant to the ensemble that the user is shopping for. In another example, for a user that has purchased different compositions by Beethoven, the search engine 190 may recommend other compositions by Beethoven regardless of ensemble (e.g., PVG arrangements, orchestral arrangements, compositions for wind ensemble, etc.).

The search engine 190 may also determine compositions that are often purchased together 1455 at 1450. For example, the search engine 190 may store a co-purchasing matrix 1452 identifying compositions that are often purchased by the same user (either at the same time or separately). For example, the items "Guitar Method Book: Beginner", and "Guitar Method Book: Intermediate" are likely to be purchased either at the same time (in the same shopping cart), or at different points in time (a user finished the beginner book and now purchases the intermediate book). Based on historical purchase information of items across all users in the co-purchasing matrix 1452, the search engine 190 can identify compositions 1455 frequently bought with the current compositions on the product page for the current composition. In order to determine compositions that are often purchased by the same user, the search engine 190 may utilize logistic regression, a neural-network based approach, etc. Again, after discarding purchases already made by the user at 1480, the compositions purchased together 1445 may be sorted for relevance using the sorting process 1370 described above.

The search engine 190 may also recommend the past purchases 1465 of users with similar user profiles 1220. Similar user profiles 1462 are identified at 1460. The user profile similarity process 1460 may compare the instrumentation 1422 and range(s) 1424 of the selected user profile 1320 to the instrumentation 1422 and the range(s) 1424 of the other user profiles 1220 using similarity metrics such as Manhattan (L1) distance or Jaccard similarity. (A similar process is used to select a composition for a user as described above. However, unlike when identifying similar user profiles 1462, a composition that is wholly contained within the range 1424 of the selected user profile 1320 may be considered to be a 100 percent match.) Additionally, the search engine 190 may compare the ranges of the two ensembles by determining whether the largest interval difference between the two ranges exceeds a prescribed threshold (e.g., +/−2 semitones). Conventional systems recommend products using collaborative filtering. For example, user ratings are collected into a matrix, which is factored (e.g., using singular value decomposition), and the user is projected onto the new basis. Because the search engine 190 stores user profiles 1220 that include instrumentation 1422 (and, in some cases, a range 1424 for each instrument), the search engine 190 is able to recommend compositions that are more relevant than would be generated using conventional collaborative filtering. For example, a user who made a purchase for a middle school marching band where their trumpets can only play up to F5 may be informed about another purchase made for a different middle school marching band with trumpets that can only play up to F5. Meanwhile, compositions outside that range and compositions for other ensembles can be excluded. Again, after discarding purchases already made by the user at 1480, the past purchases 1465 of users with similar user profiles 1462 may be sorted for relevance using the sorting process 1370 described above. Alternatively, the past purchases 1465 of users with similar user profiles 1462 may be sorted by the similarity of the user profiles 1220.

The search engine 190 may also use the information contained within the user profile 1320 and the ordered recommendations 1490 to market compositions. When new compositions arrive and/or the user modifies his or her profile(s) 1320, new compositions may be electronically marketed specifically to that user. The system 100 may also output email marketing campaigns, electronic ads, push notifications, etc. that include the recommendations 1490. Additionally, existing electronic marketing materials may be customized to include recommendations 1490 based on the user profile 1320 of the user receiving the electronic marketing materials. For example, for a director of a high school marching band that subscribes to a marching band email newsletter, the newsletter may be customized to meet that director's ensemble by highlighting or sorting items that most closely match their ensemble. In another example, the same user may subscribe to new product push notifications. When a new marching band arrangement of a current pop song is released and it matches that ensemble, the director receives a push notification on their phone indicating that new inventory is available that would be appropriate for their ensemble. If the user opens the push notification, they can then view the inventory and its marketing materials directly on their mobile device, allowing them to purchase the item as soon as it becomes available.

Figure 15:
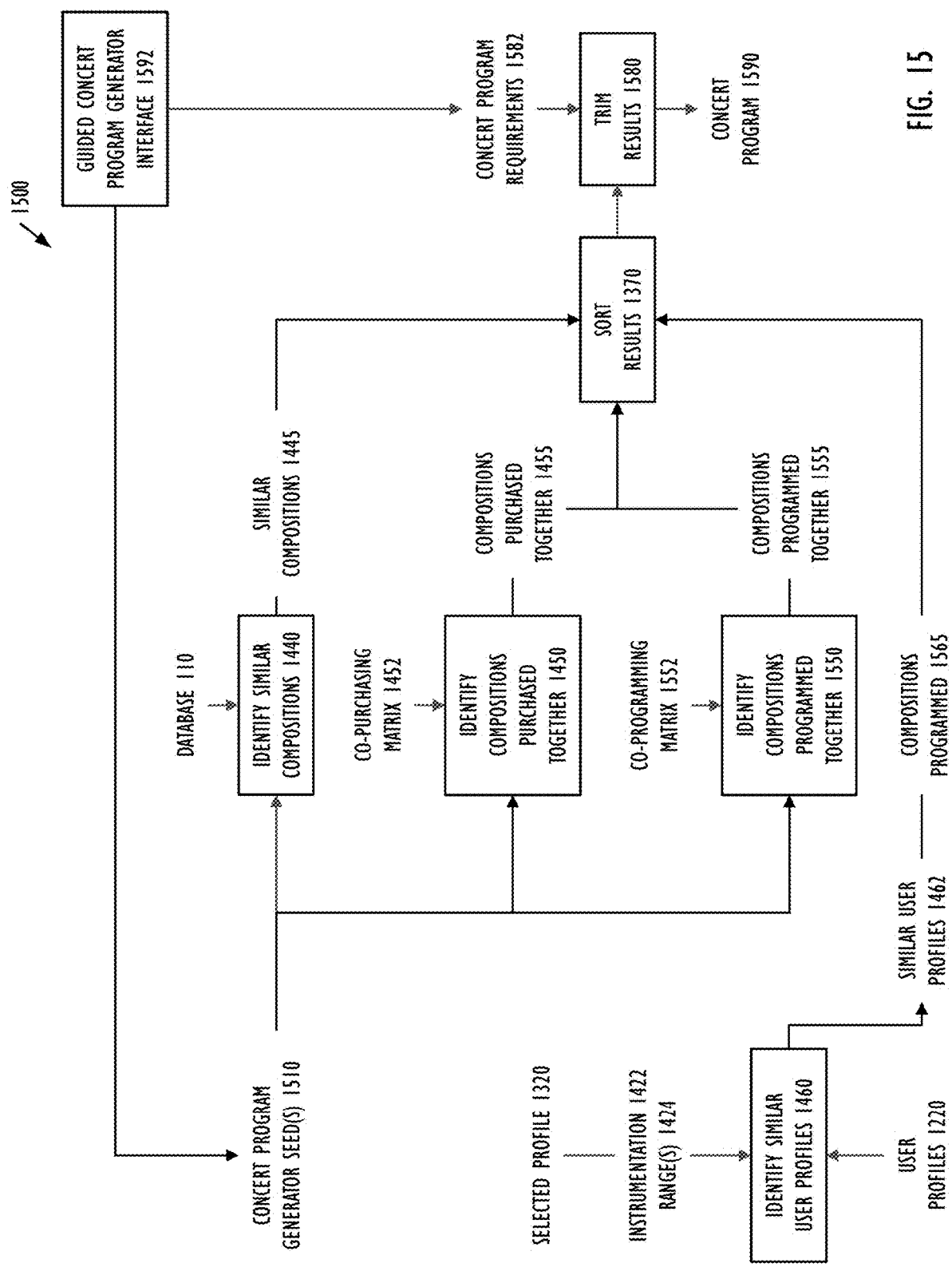
FIG. 15 is a flowchart illustrating a concert program generation process according to an exemplary embodiment of the present invention.

The search engine 190 may also recommend multiple compositions that together form a concert program (or set list). FIG. 15 is a flowchart illustrating concert program generation processes 1500 performed by the search engine 190 according to an exemplary embodiment of the present invention.

The search engine 190 may include an automatic concert program generator that generates a concert program 1590 (for example, within a user-specified length) based on one or more user-specified compositions, referred to as a concert program generator seeds 1510. In order to automatically generate a concert program 1590, the concert generation process 1500 may identify compositions similar compositions 1445 as the concert program generator seed(s) 1510 or compositions previously purchased by the user (identified using the similar composition identification process 1440 described above), compositions programmed 1565 (and past purchases 1465) of users with similar user profiles 1462 (identified using the user profile similarity process 1460 described above), compositions frequently purchased together 1455 with the concert program generator seed(s) 1510 (identified using co-purchasing identification process 1450 and the co-purchasing matrix 1452 described above), compositions frequently programmed together 1555 with the concert program generator seed(s) 1510, etc. To determine compositions frequently programmed together 1555, a co-programming matrix 1552 of compositions frequently programmed together (derived, for example, actual concert programs, CD track listings, etc.) may be stored and a co-occurrence analysis 1550 may be performed to determine compositions frequently programmed with the one or more concert program generator seeds 1510.

The similar compositions 1445, the compositions purchased together 1445, the compositions programmed together 1555, the compositions programmed 1565 by (and/or past purchases 1465 of) users with similar user profiles 1462 may be sorted using the sorting process 1370 described above. The results may be trimmed at 1580 such that the concert program 1590 meets any requirements 1582 set by the user (such as the user-specified length).

In some embodiments, the search engine 190 may provide functionality for a user to automatically generate a concert program 1590 (for example, using a single composition as the concert program generator seed 1510) with minimal input from the user. For example, each page for each composition may include a button (or other input mechanism) to automatically generate a concert program 1590 using that composition as the concert program generator seed 1510. The search engine 190 may infer the ensemble type from the composition's instrumentation, as well as the ranges of similar compositions.

Additionally or alternatively, a user may wish to specify several requirements 1582 for a concert program 1582 (e.g., length, overarching theme, focus on a particular composer, etc.). Accordingly, the search engine 190 may include guided concert program generator interface 1592 that automatically generates a concert program 1590 using all of the specified requirements 1592. The guided concert program generator interface 1592 may provide functionality for the user to specify one or more concert program generator seeds 1510. The guided concert program generator interface 1592 may provide functionality for the user to interact with the search engine 190 and specify each of the requirements 1582 using natural language (e.g., by voice or text). For example, the search engine 190 (S) may interact with a user (U) as follows:

S: Hi, I would like to help you design your concert. First, can you tell me what type of ensemble this is?
    U: High School Wind Ensemble.
    S: Tell me more about your ensemble. Are there any instruments that are not in your ensemble?
    U: I don't have any bassoons or bass clarinets.
    S: Are there any instruments you would like to feature, for example in a solo?
    U: Flute
    S: Now that I know about your ensemble, tell me about the concert you wish to perform. What is the theme of your concert?
    U: The music of Beethoven.
    S: How long would you like the concert to be?
    U: I would like the concert to be 45 minutes long.
    S: Last question: Is there any composition that must be included in this program?
    U: Yes, the concert must include his 5th Symphony.
    S: Ok. Generating concert program.
    S: Here are your results:
    1) Beethoven Symphony #5
    2) Für Elise (Flute Solo)
    . . .
    Estimated concert length: 43 minutes, 20 seconds.

Figure 16:
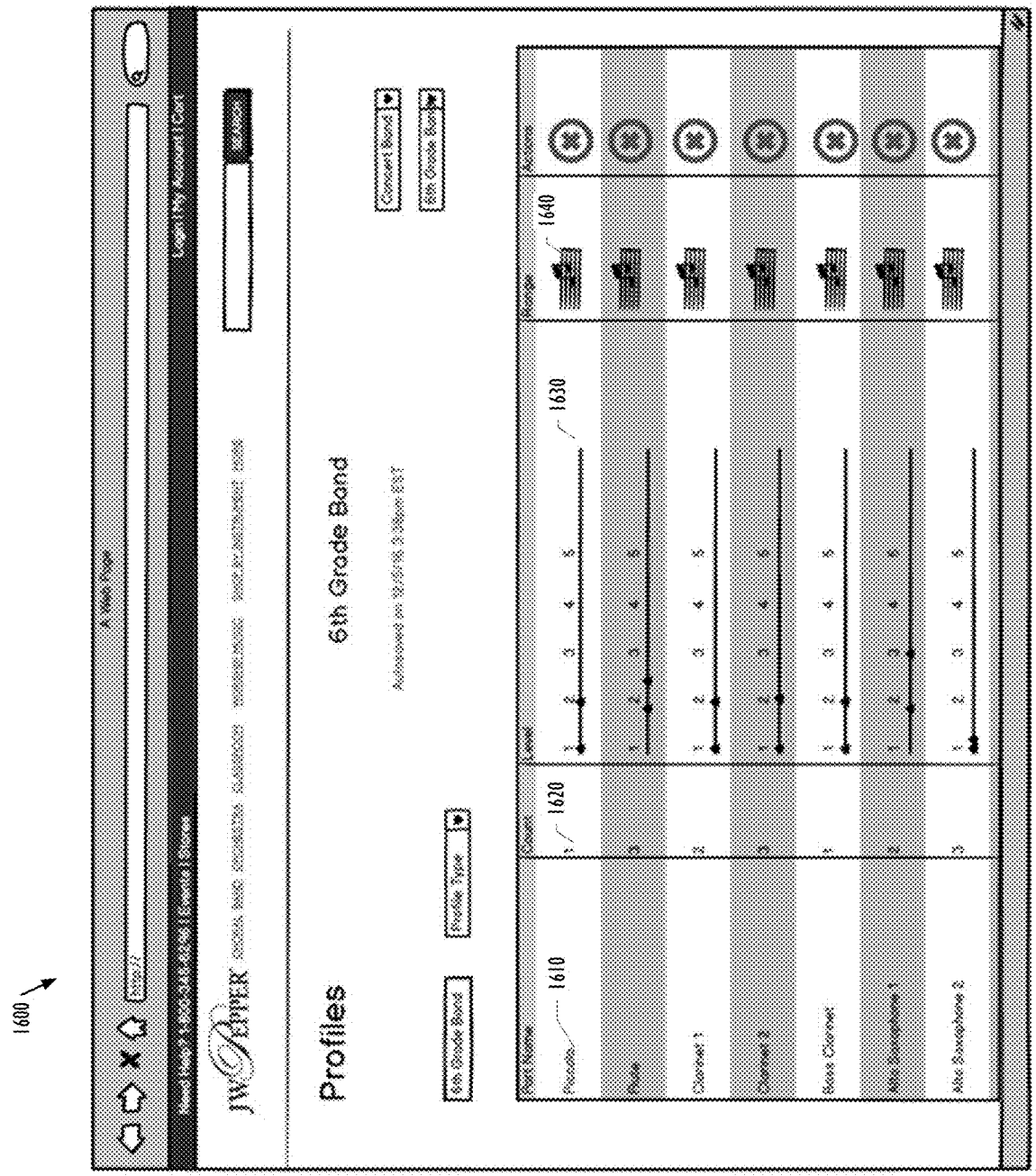
FIG. 16 illustrates a user profile view of a graphical user interface according to an exemplary embodiment of the present invention.

FIG. 16 illustrates a user profile view 1600 of the graphical user interface 192 according to an exemplary embodiment of the present invention.

The user profile view 1600 provides functionality for a user to identify several parameters at once. For each user profile, the graphical user interface 192 may provide functionality for a user to add/edit/delete multiple instruments 1610, a number 1620 of each instrument, a written range 1640 of each instrument with a tolerance in semitones (for example, "C4 to C5+/−2 semitones" would search for compositions with the range of Bb3 to D5, since Bb3 is 2 semitones lower than C4, and D5 is 2 semitones higher than C5), a grade level 1630 (or range of grade levels) for each instrument, whether an instrument should be featured in a solo, etc. (In a preferred embodiment, the written range 1640 is always used for pitched instruments. If searching for a transposing instrument, the graphical user interface 192 may display the written and/or sounding pitch. For unpitched percussion, the graphical user interface 192 may not permit the user to enter this information because range does not apply.) The graphical user interface 192 may allow each user to create multiple user profiles. For example, a user may create one profile for high school marching band (because, e.g., the user is the director of the band), another profile for church choir (because, e.g., the user is the director of the choir), a third profile for a saxophonist (e.g., a student of the user), and a fourth profile for the user (because, e.g., the user is learning to play guitar). In some embodiments, the search engine 190 may provide pre-defined user profiles that users can select and edit. The pre-defined user profiles may include, for example, a sixth grade SAB (soprano, alto, baritone) choir, a community church choir, a high school marching band, etc.

Figure 17:
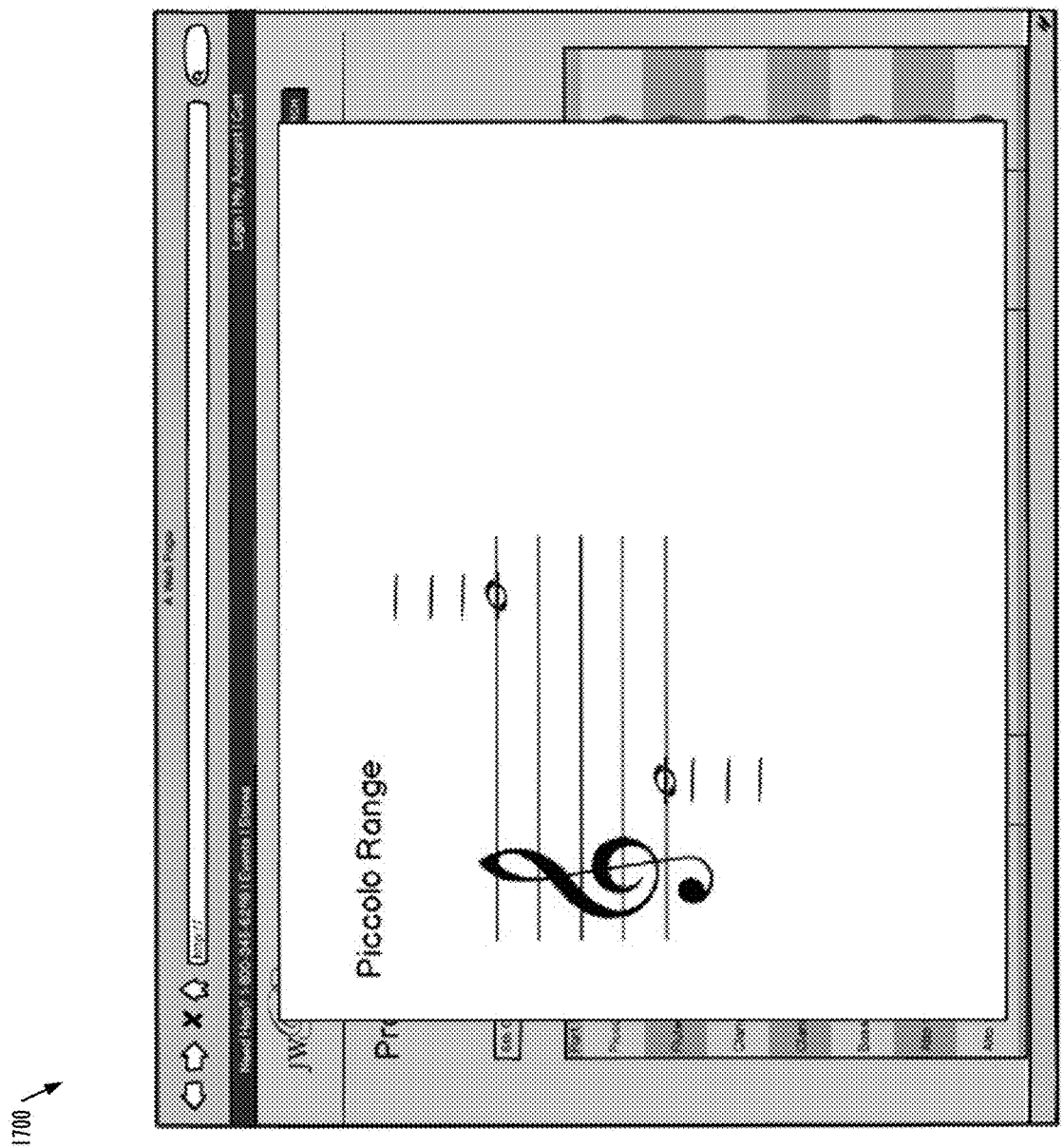
FIG. 17 illustrates an edit range view of the graphical user interface according to an exemplary embodiment of the present invention.

FIG. 17 illustrates an edit range view 1700 of the graphical user interface 192 according to an exemplary embodiment of the present invention. The user interface 192 may provide functionality for a user to edit the range 1640 of each instrument in the user profile.

Figure 18:
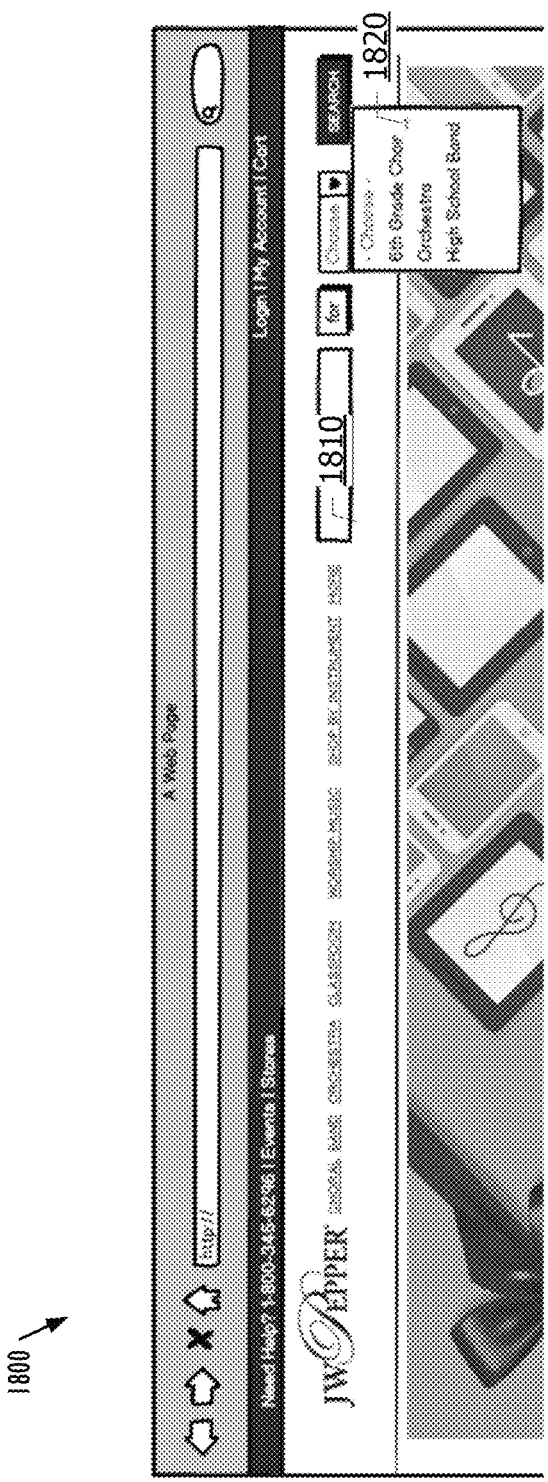
FIG. 18 illustrates a search view of the graphical user interface according to an exemplary embodiment of the present invention.

FIG. 18 illustrates a search view 1800 of the graphical user interface 192 according to an exemplary embodiment of the present invention. As discussed previously, a user may input one or more keywords in field 1810 and indicate a user profile at 1820. In some embodiments, the user profile may be chosen from a drop-down menu listing user profiles.

Figure 19:
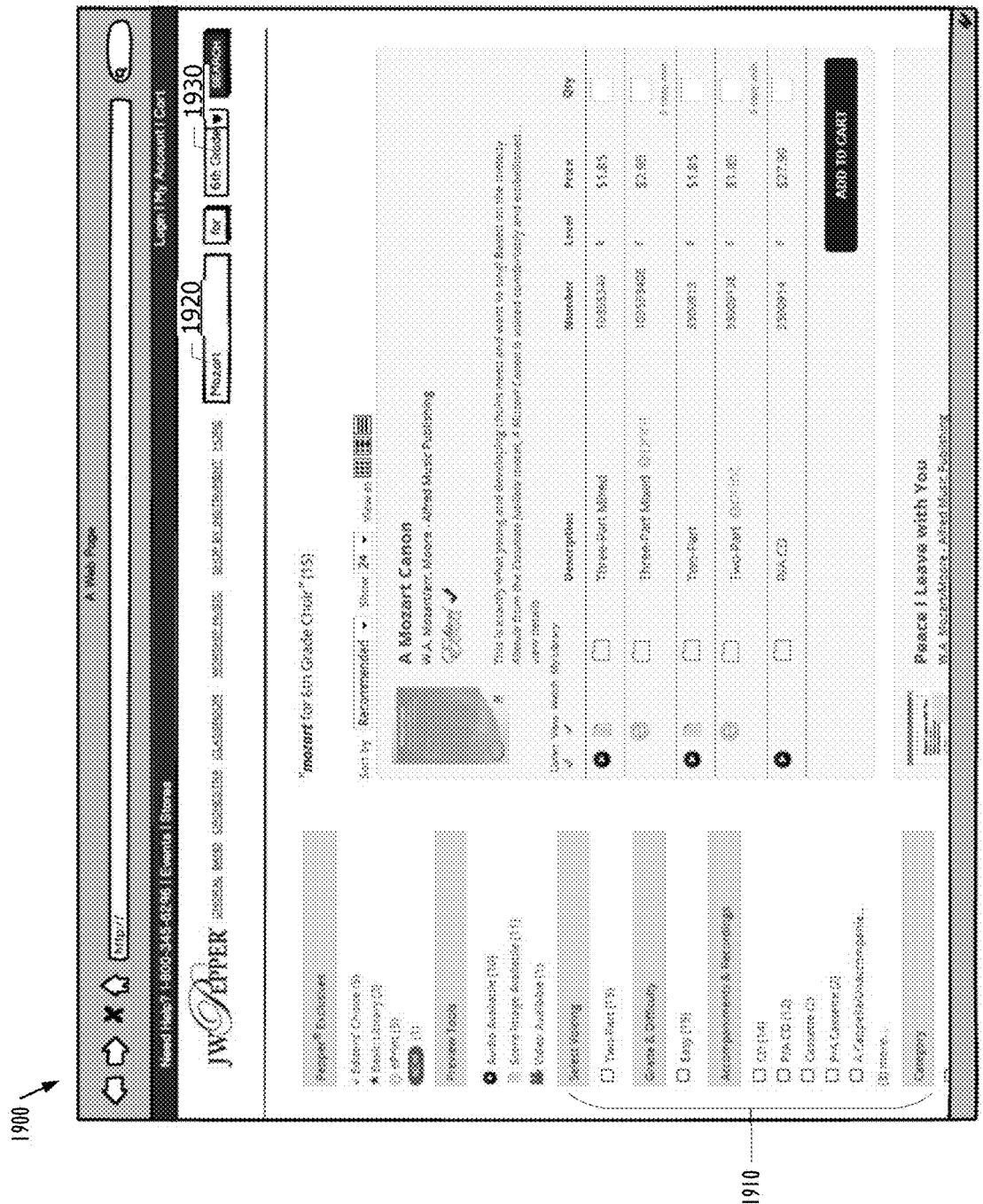
FIG. 19 illustrates a search results view of the graphical user interface according to an exemplary embodiment of the present invention.

FIG. 19 illustrates a search results view 1900 of the graphical user interface 192 according to an exemplary embodiment of the present invention. The search results view 1900 displays the results of a query constructed by the query generator based on the keywords 1920, a user profile 1930, or both. In some embodiments, the search results view 1900 provides functionality for the user to refine the results by selecting one or more filters 1910. The search results may be ranked according to their similarity to the one or more keywords 1920 and parameters stored in the selected profile 1930.

Hardware/Software

Figure 20:
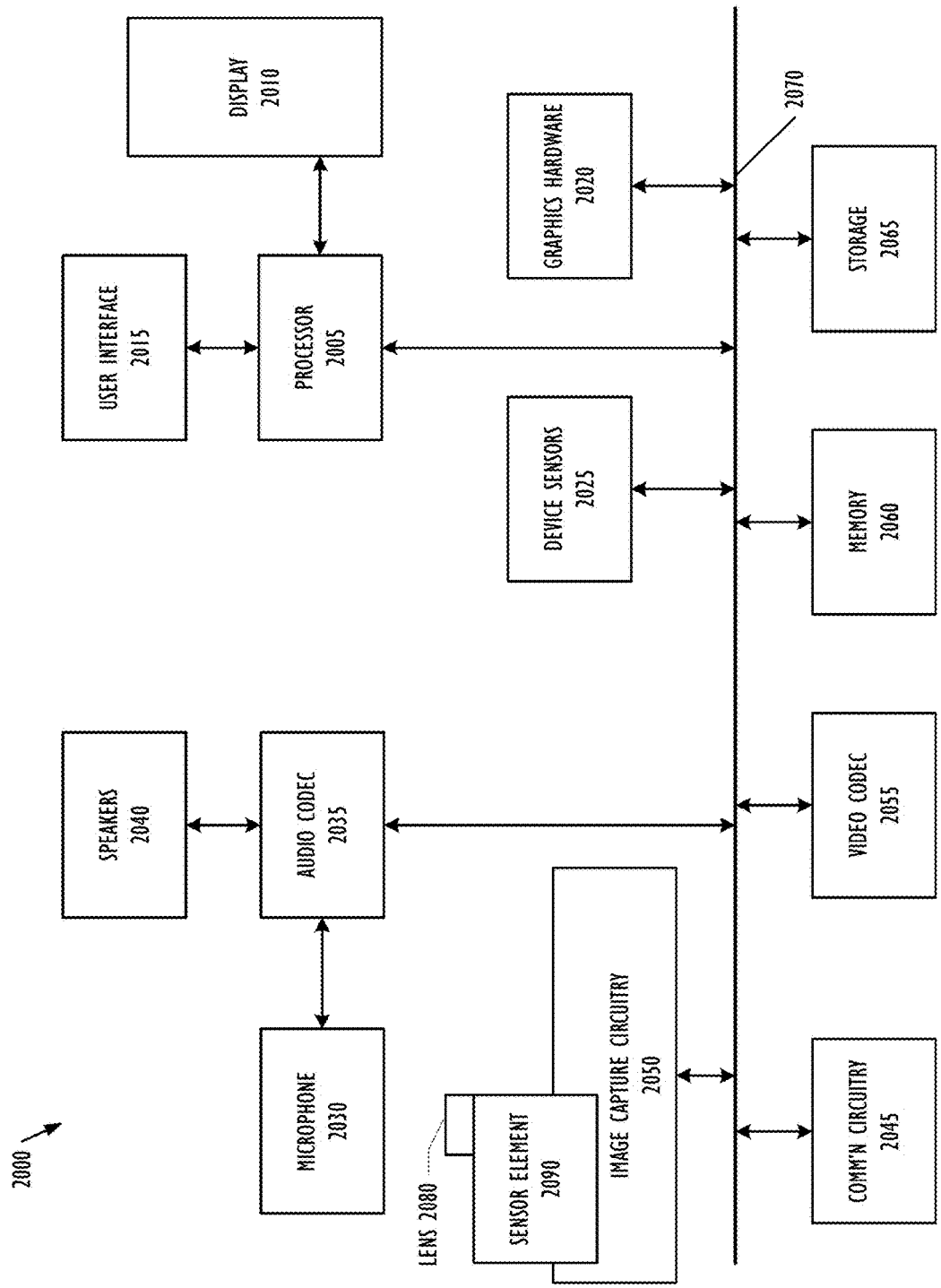
FIG. 20 is a block diagram of a simplified multifunctional electronic device according to an exemplary embodiment of the present invention.

FIG. 20 is a block diagram of a simplified multifunctional electronic device 2000 according to an exemplary embodiment of the present invention. Multifunction electronic device 2000 may include processor 2005, display 2010, user interface 2015, graphics hardware 2020, device sensors 2025 (e.g., proximity sensor/ambient light sensor, accelerometer and/or gyroscope), microphone 2030, audio codec(s) 2035, speaker(s) 2040, communications circuitry 2045, digital image capture circuitry 2050, video codec(s) 2055 (e.g., in support of digital image capture unit 2050), memory 2060, storage device 2065, and communications bus 2070. Multifunction electronic device 2000 may be, for example, a personal electronic device such as a personal digital assistant (PDA), mobile telephone, or a tablet computer. Processor 2005 may execute instructions necessary to carry out or control the operation of many functions performed by device 2000. Processor 2005 may, for instance, drive display 2010 and receive user input from user interface 2015. User interface 2015 may allow a user to interact with device 2000. For example, user interface 2015 can take a variety of forms, such as a button, keypad, dial, a click wheel, keyboard, display screen and/or a touch screen. Processor 2005 may also, for example, be a system-on-chip such as those found in mobile devices and include a dedicated graphics processing unit (GPU). Processor 2005 may be based on reduced instruction-set computer (RISC) or complex instruction-set computer (CISC) architectures or any other suitable architecture and may include one or more processing cores. Graphics hardware 2020 may be special purpose computational hardware for processing graphics and/or assisting processor 2005 to process graphics information. In one embodiment, graphics hardware 2020 may include a programmable GPU. Image capture circuitry 2050 may include lens 2080. Lens assembly may have an associated sensor element 2090. Image capture circuitry 2050 may capture still and/or video images. Output from image capture circuitry 2050 may be processed, at least in part, by video codec(s) 2055 and/or processor 2005 and/or graphics hardware 2020, and/or a dedicated image processing unit or pipeline incorporated within circuitry 2055. Images so captured may be stored in memory 2060 and/or storage 2065. Sensor and camera circuitry 2050 may capture still and video images that may be processed in accordance with this disclosure, at least in part, by video codec(s) 2055 and/or processor 2005 and/or graphics hardware 2020, and/or a dedicated image processing unit incorporated within circuitry 2050. Images so captured may be stored in memory 2060 and/or storage 2065. Microphone 2030 may capture audio recordings that may be processed in accordance with this disclosure, at least in part, by audio codec(s) 2035 and/or processor 2005. Audio recordings so captured may be stored in memory 2060 and/or storage 2065. Memory 2060 may include one or more different types of media used by processor 2005 and graphics hardware 2020 to perform device functions. For example, memory 2060 may include memory cache, read-only memory (ROM), and/or random access memory (RAM). Storage 2065 may store media (e.g., audio, image and video files), computer program instructions or software, preference information, device profile information, and any other suitable data. Storage 2065 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 2060 and storage 2065 may be used to tangibly retain computer program instructions or code organized into one or more modules and written in any desired computer programming language. When executed by, for example, processor 2005 such computer program code may implement one or more of the methods described herein.

While a preferred embodiment has been set forth above, those skilled in the art who have reviewed the present disclosure will readily appreciate that other embodiments can be realized within the scope of the present invention.

What is claimed is:

1. A system, comprising:
    non-transitory computer readable storage media that stores:
        structured sheet music data comprising compositions, each composition comprising elements;
        a multi-dimensional vector space; and
        vectors, with the multi-dimensional vector space, representing elements extracted from a corpus of structured music data, wherein musically similar elements extracted from the corpus are represented by vectors that are clustered together in the multi-dimensional vector space;
    a structured sheet music analysis engine, executed by a hardware processor, that:
        extracts elements from the structured sheet music data;
        identifies the vectors within the multi-dimensional space representing the extracted elements;
        generates vectors representing each composition by averaging the vectors representing each element in the composition;
        compares the compositions included in the structured sheet music data by comparing the vectors representing each composition; and
        generates metadata characterizing each composition based on the comparisons of the vectors representing each composition;
    a graphical user interface that provides functionality for a user to search the structured sheet music data for compositions; and
    a search engine that generates search results based at least in part on the metadata characterizing each composition and returns the search results to the user via the graphical user interface.

2. The system of claim 1, wherein at least some of the compositions comprise multiple parts and the structured sheet music analysis engine:
    generates vectors representing each part by averaging the vectors representing each element in the part;
    compares the parts included in the structured sheet music data by comparing the vectors representing each part; and
    generates metadata characterizing each part based on the comparisons of the vectors representing each part.

3. The system of claim 1, wherein the structured sheet music analysis engine computes metadata characterizing each composition using a deterministic mathematical function or algorithm.

4. The system of claim 1, wherein the structured sheet music analysis engine:
    stores rules or heuristics for characterizing compositions; and
    generates metadata characterizing each composition by applying the rules or heuristics to each composition.

5. The system of claim 1, wherein the structured sheet music analysis engine:
    extracts phrases from each composition; and
    generates metadata characterizing each composition by analyzing each phrase extracted from the composition and using sequence labeling to generate keyword descriptions of each phrase extracted from the composition.

6. The system of claim 5, wherein the sequence labeling is performed by:
    a first neural network that transforms each input phrase into a numerical representation; and
    a second neural network that transforms the numerical representations into keyword descriptions of the phrases.

7. The system of claim 1, wherein the structured sheet music analysis engine:
    stores one or more machine learning algorithms for characterizing compositions; and
    generates metadata characterizing each composition by using one or more machine learning algorithms to analyze each composition.

8. The system of claim 7, wherein metadata characterizing each composition includes the difficulty of the composition.

9. The system of claim 8, wherein the structured sheet music analysis engine determines the difficulty of each composition by:
    storing a corpus of compositions with metadata indicating the difficulty of each composition;
    using one or more supervised learning algorithms to:
        compare each composition in the structured sheet music data with each composition in the corpus; and
        generate metadata indicative of the difficulty of each composition in the structured sheet music data based on the comparison.

10. The system of claim 9, wherein:
    the structured sheet music analysis engine generates vectors representing each composition in the corpus; and
    the one or more supervised learning algorithms compare the vectors representing each composition in the structured sheet music data with the vectors representing each composition in the corpus.

11. A method, comprising:
    storing structured sheet music data comprising compositions, each composition comprising elements;
    storing a multi-dimensional vector space comprising vectors representing elements extracted from a corpus of structured music data, wherein musically similar elements extracted from the corpus are clustered together in the multi-dimensional vector space;
    extracting elements from the structured sheet music data;

identifying the vectors within the multi-dimensional vector space representing the extracted elements;

generating vectors representing each composition by averaging the vectors representing each element in the composition;

comparing the compositions included in the structured sheet music data by comparing the vectors representing each composition;

generating metadata characterizing each composition based on the comparisons of the vectors representing each composition;

providing a graphical user interface that provides functionality for a user to search the structured sheet music data for compositions;

generating search results based at least in part on the metadata characterizing each composition; and returning the search results to the user via the graphical user interface.

12. The method of claim 11, wherein at least some of the compositions comprise multiple parts, the method further comprising:

generating vectors representing each part by averaging the vectors representing each element in the part;

comparing the parts included in the structured sheet music data by comparing the vectors representing each part; and generating metadata characterizing each part based on the comparisons of the vectors representing each part.

13. The method of claim 11, further comprising:
computing metadata characterizing each composition using a deterministic mathematical function or algorithm.

14. The method of claim 11, further comprising:
storing rules or heuristics for characterizing compositions; and
generating metadata characterizing each composition by applying the rules or heuristics to each composition.

15. The method of claim 11, further comprising:
extracting phrases from each composition; and
generating metadata characterizing each composition by analyzing each phrase extracted from the composition and using sequence labeling to generate keyword descriptions of each phrase extracted from the composition.

16. The method of claim 15, wherein using sequence labeling to generate keyword descriptions of each phrase extracted from the composition comprises:

transforming each input phrase into a numerical representation by a first neural network; and transforming the numerical representations into keyword descriptions of the phrases by a second neural network.

17. The method of claim 11, further comprising:
storing one or more machine learning algorithms for characterizing compositions; and
generating metadata characterizing each composition by using one or more machine learning algorithms to analyze each composition.

18. The method of claim 17, wherein the metadata characterizing each composition includes the difficulty of the composition.

19. The method of claim 18, wherein determining the difficulty of each composition comprises:

storing a corpus of compositions with metadata indicating the difficulty of each composition;

using one or more supervised learning algorithms to:
compare each composition in the structured sheet music data with each composition in the corpus; and generate metadata indicative of the difficulty of each composition in the structured sheet music data based on the comparison.

20. The method of claim 19, further comprising:
generating vectors representing each composition in the corpus; and comparing the vectors representing each composition in the structured sheet music data with the vectors representing each composition in the corpus.

* * * * *